US012485747B2

(12) United States Patent
Matsui et al.

(10) Patent No.: US 12,485,747 B2
(45) Date of Patent: Dec. 2, 2025

(54) SWIVEL WORKING MACHINE

(71) Applicant: KUBOTA CORPORATION, Osaka (JP)

(72) Inventors: Kiyoshi Matsui, Osaka (JP); Koji Nagahama, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 646 days.

(21) Appl. No.: 17/991,227

(22) Filed: Nov. 21, 2022

(65) Prior Publication Data

US 2023/0102511 A1 Mar. 30, 2023

Related U.S. Application Data

(63) Continuation of application No. PCT/JP2021/047610, filed on Dec. 22, 2021.

(30) Foreign Application Priority Data

Dec. 29, 2020 (JP) ................................ 2020-219796
Dec. 29, 2020 (JP) ................................ 2020-219797

(51) Int. Cl.
*B60K 15/07* (2006.01)
*B60K 15/063* (2006.01)
*E02F 3/32* (2006.01)
*E02F 9/08* (2006.01)

(52) U.S. Cl.
CPC ............ *B60K 15/07* (2013.01); *E02F 9/0883* (2013.01); *B60K 2015/0638* (2013.01); *E02F 3/325* (2013.01)

(58) Field of Classification Search
CPC ............. B60K 15/07; B60K 2015/0638; E02F 9/0883; E02F 3/325
See application file for complete search history.

(56) References Cited

U.S. PATENT DOCUMENTS

2022/0018092 A1 1/2022 Kunizawa et al.

FOREIGN PATENT DOCUMENTS

| | | | |
|---|---|---|---|
| JP | 2005-211996 | A | 8/2005 |
| JP | 2007-90964 | A | 4/2007 |
| JP | 2011-94414 | A | 5/2011 |
| JP | 2020-165285 | A | 10/2020 |

OTHER PUBLICATIONS

International Search Report issued in International Patent Application No. PCT/JP2021/047610, dated Mar. 22, 2022, along with an English translation thereof.

*Primary Examiner* — Jacob B Meyer
(74) *Attorney, Agent, or Firm* — Greenblum & Bernstein, P.L.C.

(57) ABSTRACT

A swivel working machine includes a swivel base, a prime mover installed in the swivel base, a working device provided at the swivel base, and a support mechanism that supports a fuel cylinder in a rotatable manner around a pivot shaft. The fuel cylinder contains fuel for the prime mover. The support mechanism includes a support rotating body that supports the fuel cylinder and that rotates around the pivot shaft, a rotational-position defining mechanism including a pin that defines a rotational position of the support rotating body around the pivot shaft, and an adjustment mechanism that adjusts a position of the pivot shaft relative to the pin.

19 Claims, 35 Drawing Sheets

SWIVEL WORKING MACHINE

CROSS REFERENCE TO RELATED APPLICATIONS

This application is a continuation application of International Application No. PCT/JP2021/047610, filed on Dec. 22, 2021, which claims the benefit of priority to Japanese Patent Application No. 2020-219796, filed on Dec. 29, 2020, and to Japanese Patent Application No. 2020-219797, filed on Dec. 29, 2020. The entire contents of each of these applications are hereby incorporated herein by reference.

BACKGROUND OF THE INVENTION

1. Field of the Invention

The present invention relates to swivel working machines, such as backhoes.

2. Description of the Related Art

A known swivel working machine in the related art is disclosed in Japanese Unexamined Patent Application Publication No. 2020-165285.

The swivel working machine disclosed in Japanese Unexamined Patent Application Publication No. 2020-165285 includes a swivel base, a prime mover provided on the swivel base, a hood that covers the prime mover, and a support mechanism supporting a fuel cylinder that contains fuel for the prime mover. The support mechanism supports the fuel cylinder in a rotatable manner around a pivot shaft.

SUMMARY OF THE INVENTION

The aforementioned swivel working machine includes a pin for defining the rotational position of the fuel cylinder around the pivot shaft. However, when the relative position between the pivot shaft and the pin changes due to, for example, variations in the component dimensions, a deviation may occur between the rotational position that should originally be defined and the rotational position to be actually defined. In particular, if the pin is disposed near the pivot shaft, a problem in which the deviation may increase at a position located away from the pivot shaft may occur.

Furthermore, in the aforementioned swivel working machine, when the fuel cylinder is rotated downward around the pivot shaft, the weight of the fuel cylinder is received in accordance with a resilient repulsive force of a bias member (gas damper). However, in order to reliably receive the weight of the fuel cylinder, which is a heavy object, a plurality of bias members are required. Thus, in order to ensure the installation space for the bias members, the accommodation space for the fuel cylinder is limited.

The present invention has been made to solve such a problem in the related art, and an object thereof is to provide a swivel working machine that can adjust the relative position between the pin for defining the rotational position of the fuel cylinder around the pivot shaft and the pivot shaft.

Another object of the present invention is to provide a swivel working machine that can reduce the number of bias members that receive the weight of the fuel cylinder when the fuel cylinder is rotated downward so that a large installation space can be ensured for the fuel cylinder.

A swivel working machine according to a first aspect of the present invention includes a swivel base, a prime mover provided on the swivel base, a working device provided on the swivel base, and a support mechanism to support a fuel cylinder in a rotatable manner around a pivot shaft. The fuel cylinder contains fuel for the prime mover. The support mechanism includes a support rotating body to support the fuel cylinder and rotate around the pivot shaft, a rotational-position defining mechanism including a pin to define a rotational position of the support rotating body around the pivot shaft, and an adjustment mechanism to adjust a position of the pivot shaft relative to the pin.

Preferably, in the first aspect, the adjustment mechanism may include an adjustment member attached to the pivot shaft in a rotatable manner around an axis of the pivot shaft. The adjustment member may have an outer peripheral surface whose distance from the axis of the pivot shaft varies in accordance with a position in a circumferential direction thereof. The support rotating body may include an abutment surface on which the outer peripheral surface of the adjustment member abuts. A position of the outer peripheral surface that abuts on the abutment surface may be changeable in accordance with rotation of the adjustment member around the axis.

Preferably, in the first aspect, the outer peripheral surface may include a plurality of flat surfaces with different distances from the axis of the pivot shaft. The adjustment member, by rotating, may be capable of changing the flat surface to abut on the abutment surface.

Preferably, in the first aspect, the adjustment member may include a tubular section fitted around an outer peripheral face of the pivot shaft and a flange section having the outer peripheral surface.

Preferably, in the first aspect, the support rotating body may include a hole in which the pivot shaft is fitted. The hole may be a noncircular hole into which the tubular section is inserted and that is larger than an outer diameter of the tubular section.

Preferably, in the first aspect, the adjustment mechanism may include a fixation member to fix a rotational position of the adjustment member around the axis of the pivot shaft.

Preferably, in the first aspect, the adjustment mechanism may be located near the pivot shaft and the pin.

Preferably, in the first aspect, the rotational-position defining mechanism may include a locking hole provided in the support rotating body and a lock hole provided in a fixation body whose relative position with respect to the pivot shaft is fixed. The pin may define the rotational position by being inserted into the locking hole and the lock hole. The adjustment mechanism may adjust the position of the pivot shaft relative to the lock hole.

Preferably, in the first aspect, the pivot shaft may include a first pivot shaft to pivotally support the support rotating body in a rotatable manner in a horizontal direction from a predetermined installation position to a predetermined retracted position, and a second pivot shaft to pivotally support the support rotating body in a rotatable manner from the retracted position to a lowered position located therebelow. The pin may define a rotational position of the support rotating body around the second pivot shaft. The adjustment mechanism may adjust a position of the second pivot shaft relative to the pin.

Preferably, in the first aspect, the support rotating body may support the fuel cylinder in a rotatable manner in an up-down direction. The support mechanism may include a bias member to receive a weight of the fuel cylinder and apply a resilient repulsive force in a direction such as to inhibit downward rotation of the support rotating body, and an assist mechanism to increase the resilient repulsive force acting on the support rotating body.

A swivel working machine according to a second aspect of the present invention includes a swivel base, a prime mover provided on the swivel base, a working device provided on the swivel base, and a support mechanism including a support rotating body to support a fuel cylinder in a rotatable manner in an up-down direction. The fuel cylinder contains fuel for the prime mover. The support mechanism includes a bias member to receive a weight of the fuel cylinder and apply a resilient repulsive force in a direction such as to inhibit downward rotation of the support rotating body, and an assist mechanism to increase the resilient repulsive force acting on the support rotating body.

Preferably, in the second aspect, the support mechanism may include a first pivot shaft to pivotally support the support rotating body in a rotatable manner in a horizontal direction from a predetermined installation position to a predetermined retracted position, and a second pivot shaft to pivotally support the support rotating body in a rotatable manner from the retracted position to a lowered position located therebelow. The bias member may apply the resilient repulsive force when the support rotating body is to be rotated around the second pivot shaft.

Preferably, in the second aspect, the installation position may be where at least a part of the fuel cylinder overlaps the swivel base in plan view. The retracted position may be where the fuel cylinder does not overlap the swivel base in plan view.

Preferably, in the second aspect, the swivel working machine may further include an openable-closable hood defining an engine room to accommodate the prime mover. The installation position may be where the fuel cylinder is located above the hood in a closed state. The retracted position may be where the support rotating body does not interfere with the hood in the closed state even when the support rotating body is rotated in the up-down direction.

Preferably, in the second aspect, the assist mechanism may be a link mechanism connected to the support rotating body, the bias member, and a support member whose relative position with respect to a second pivot shaft that pivotally supports the support rotating body in a rotatable manner in the up-down direction is fixed. The bias member may have one end coupled to the link mechanism and another end coupled to the support rotating body.

Preferably, in the second aspect, the link mechanism may be a toggle mechanism.

Preferably, in the second aspect, the toggle mechanism may include a first shaft whose relative position with respect to the second pivot shaft is fixed, a first link member whose one end is attached to the first shaft in a rotatable manner, a second shaft attached to another end of the first link member, a third shaft attached to the support rotating body, and a second link member to couple the second shaft and the third shaft to each other. The one end of the bias member is coupled to the second link member.

Preferably, in the second aspect, the bias member and the assist mechanism may be positioned below the fuel cylinder when the fuel cylinder is in the installation position.

Preferably, in the second aspect, the bias member may be a gas spring. The gas spring may be located substantially parallel to the fuel cylinder below the fuel cylinder when the fuel cylinder is in the installation position.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1A:
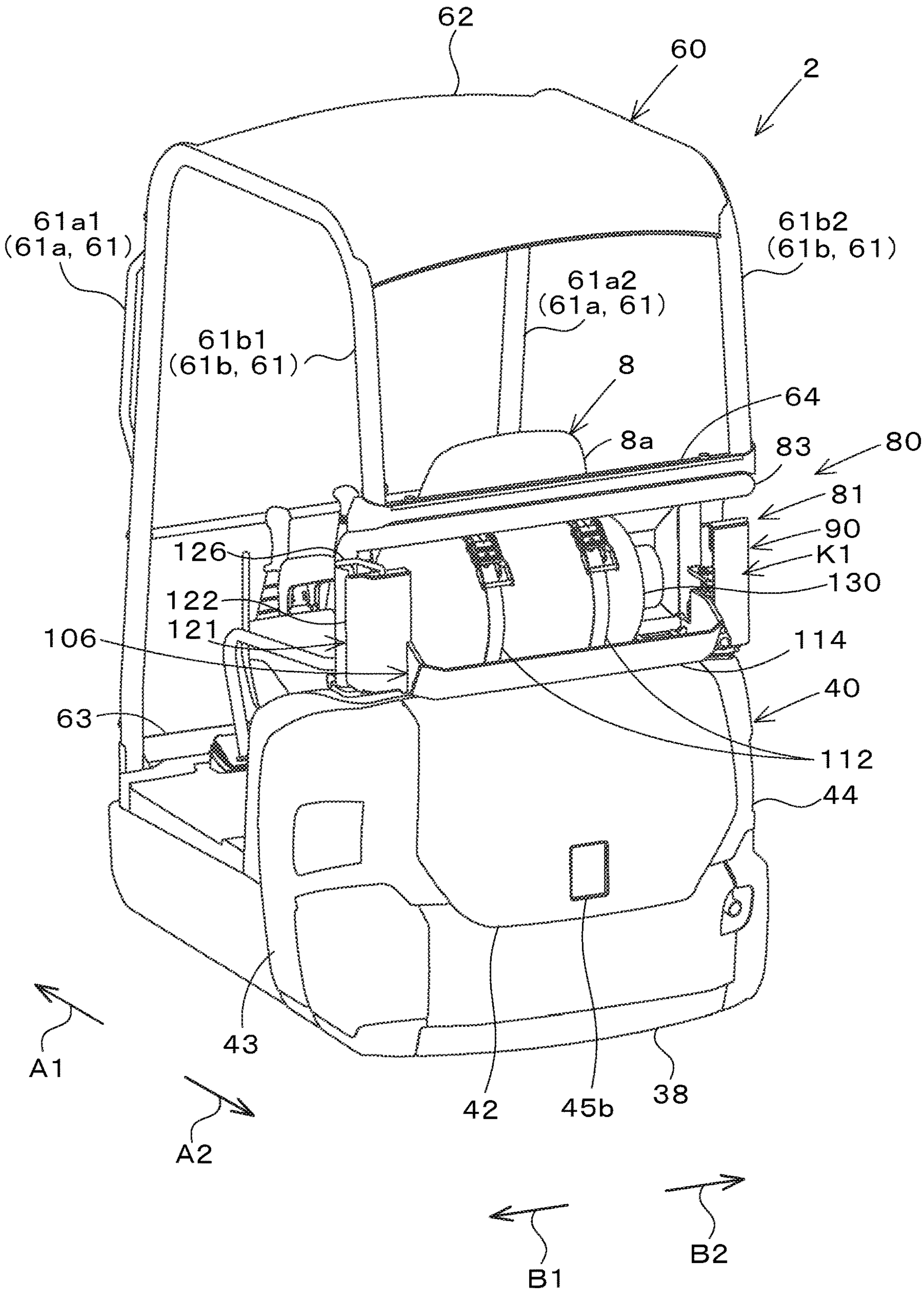
FIG. 1A is a left-rear perspective view illustrating a swivel base, a hood, and a protection mechanism.

The preferred embodiments will now be described with reference to the accompanying drawings, wherein like reference numerals designate corresponding or identical elements throughout the various drawings. The drawings are to be viewed in an orientation in which the reference numerals are viewed correctly.

Figure 16:
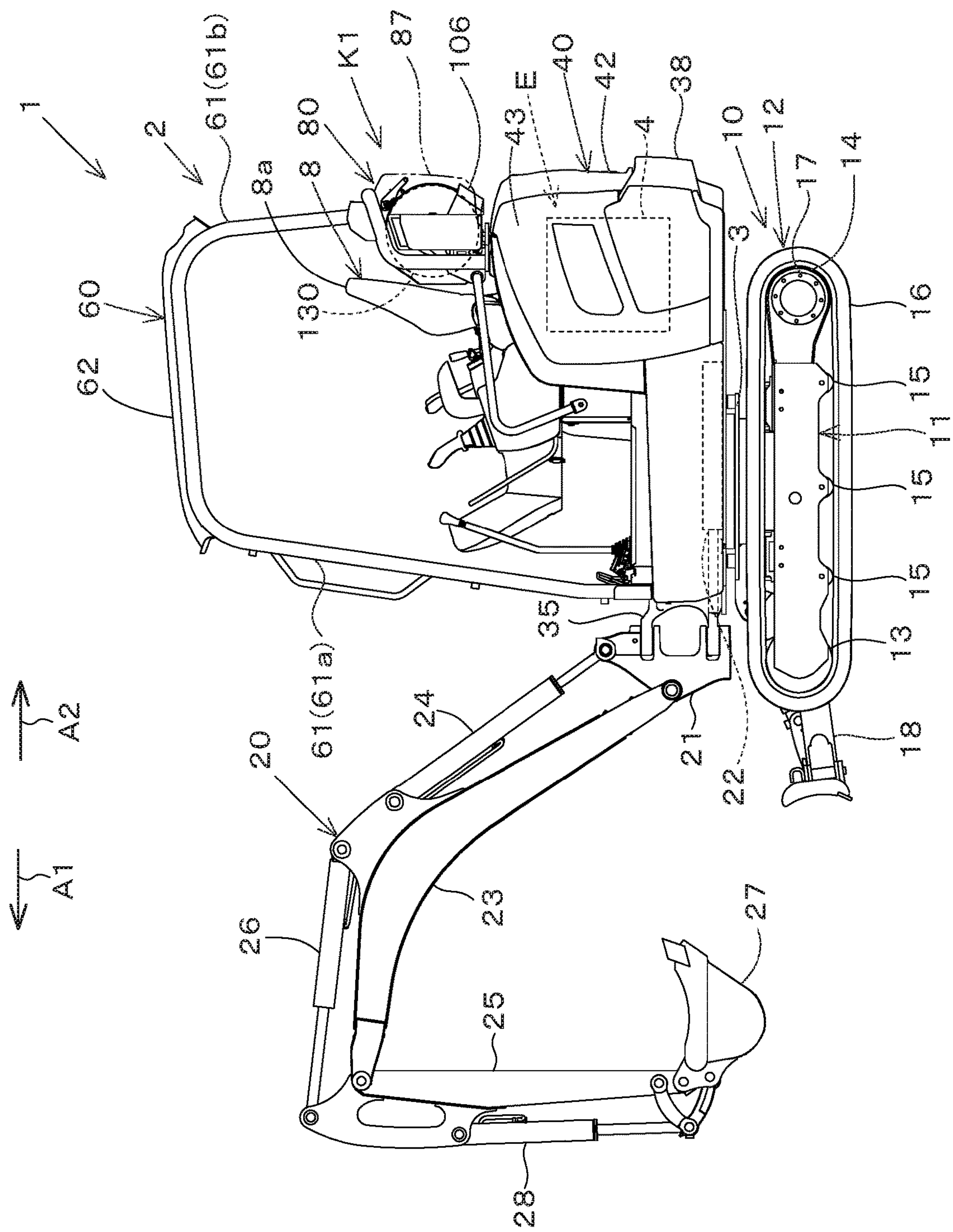
FIG. 16 is a side view schematically illustrating a swivel working machine.
Figure 17:
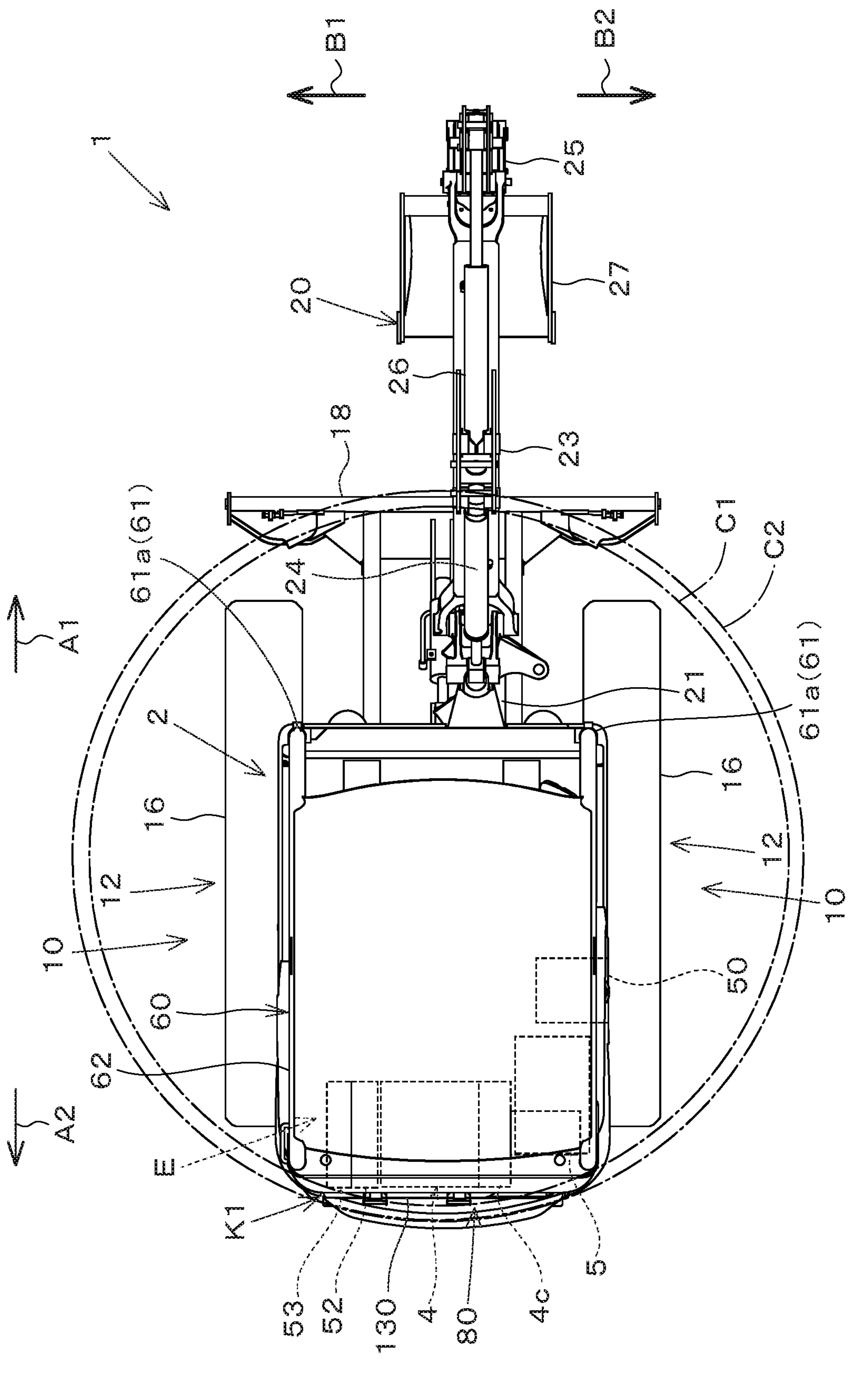
FIG. 17 is a plan view schematically illustrating the swivel working machine.

An embodiment of the present invention will be described below with reference to the drawings. FIG. 16 is a schematic side view illustrating the overall configuration of a backhoe serving as a swivel working machine (working machine) 1 according to this embodiment. FIG. 17 is a schematic plan view illustrating the overall configuration of the swivel working machine 1.

As shown in FIG. 16, the swivel working machine 1 includes a swivel base (machine body) 2, a traveling device 10, and a working device 20. An operator's seat 8 is provided on the swivel base 2, and the periphery of the operator's seat 8 is covered by a protection mechanism 60. In this embodiment, a direction (indicated by an arrow A1 in FIG. 16 and FIG. 17) extending forward from an operator sitting in the operator's seat 8 of the swivel working machine 1 will be described as a forward direction, a direction (indicated by an arrow A2 in FIG. 16 and FIG. 17) extending rearward from the operator will be described as a rearward direction, a direction (toward the near side in FIG. 16 and indicated by an arrow B1 in FIG. 17) extending leftward from the operator will be described as a leftward direction, and a direction (toward the far side in FIG. 16 and indicated by an arrow B2 in FIG. 17) extending rightward from the operator will be described as a rightward direction.

Furthermore, the horizontal direction extending orthogonally to the front-rear direction will be described as a machine-body width direction (see FIG. 17). A direction extending rightward or leftward from the center of the swivel base 2 in the machine-body width direction will be described as an outward direction. In other words, the outward direction extends parallel to the machine-body width direction and away from the center of the swivel base 2 in the machine-body width direction. A direction extending opposite from the outward direction will be described as an inward direction (inner side). In other words, the inward direction extends parallel to the machine-body width direction and toward the center of the swivel base 2 in the machine-body width direction.

As shown in FIG. 16, the swivel base 2 is supported above a traveling frame 11 in such a manner as to be rotatable (swivelable leftward and rightward) around a vertical axis (axis extending in the up-down direction) via a swivel bearing 3. The center of the swivel bearing 3 serves as a swivel axis (swivel center). A swivel motor (not shown) formed of a hydraulic motor is attached to the swivel base 2. This swivel motor rotationally drives the swivel base 2 around the swivel axis. The swivel motor is attached to a swivel substrate 32, to be described later.

As shown in FIG. 17, the swivel base 2 is provided with a prime mover 4 and a hydraulic pump 5. In other words, the prime mover 4 is installed in the swivel base 2, and is specifically disposed in an engine room E provided at the rear section of the swivel base 2. The prime mover 4 is a spark-ignition engine that can be driven by using fuel. Another section (right section) of the prime mover 4 in the machine-body width direction is a flywheel 4*c*, and the hydraulic pump 5 is provided at the right of the flywheel 4*c*. The hydraulic pump 5 is driven by a driving force of the prime mover 4 and delivers a hydraulic fluid (hydraulic pressure) for driving hydraulic actuators, such as a hydraulic motor and a hydraulic cylinder, equipped in the swivel working machine 1.

As shown in FIG. 16, the traveling device 10 has the traveling frame 11 and traveling mechanisms 12. For example, the traveling mechanisms 12 are of a crawler type. As shown in FIG. 17, the traveling mechanisms 12 are respectively provided at one (left) side and the other (right) side of the traveling frame 11 in the machine-body width direction. As shown in FIG. 16, each traveling mechanism 12 has an idler 13, a driving wheel 14, a plurality of track rollers 15, an endless crawler belt 16, and a traveling motor 17 formed of a hydraulic motor. The idler 13 is disposed at the front section of the traveling frame 11, whereas the driving wheel 14 is disposed at the rear section of the traveling frame 11. The plurality of track rollers 15 are provided between the idler 13 and the driving wheel 14. The crawler belt 16 is wrapped around the idler 13, the driving wheel 14, and the track rollers 15. The traveling motor 17 drives the driving wheel 14 so as to cause the crawler belt 16 to circulate in the circumferential direction. A dozer 18 is attached to the front of the traveling device 10.

The working device 20 is provided at the swivel base 2. Specifically, the working device 20 is provided at the front section of the swivel base 2 and is actuated by being driven by the prime mover 4. As shown in FIG. 16 and FIG. 17, the working device 20 has a boom 23, an arm 25, and a bucket (working tool) 27. The base end of the boom 23 is pivotally attached to the swing bracket 21 in such a manner as to be rotatable around a lateral axis (axis extending in the machine-body width direction). Accordingly, the boom 23 is swingable in the up-down direction (vertical direction). The arm 25 is pivotally attached to the distal end of the boom 23 in such a manner as to be rotatable around the lateral axis. Accordingly, the arm 25 is swingable in the front-rear direction or the up-down direction. The bucket 27 is provided at the distal end of the arm 25 in such a manner as to be capable of moving in a shoveling motion and a dumping motion. In place of or in addition to the bucket 27, another working tool (hydraulic attachment) that can be driven by the hydraulic actuators may be attached to the swivel working machine 1. Examples of such another working tool include a hydraulic breaker, a hydraulic crusher, an angle broom, an earth auger, a pallet fork, a sweeper, a mower, and a snow blower.

As shown in FIG. 16, the swing bracket 21 is swingable in accordance with extension and retraction of a swing cylinder 22 provided at the right of the swivel base 2. The boom 23 is swingable in accordance with extension and retraction of a boom cylinder 24. The arm 25 is swingable in accordance with extension and retraction of an arm cylinder 26. The bucket 27 is capable of moving in a shoveling motion and a dumping motion in accordance with extension and retraction of a bucket cylinder (working-tool cylinder) 28. The swing cylinder 22, the boom cylinder 24, the arm cylinder 26, and the bucket cylinder 28 are hydraulic cylinders (hydraulic actuators) and are driven by using the hydraulic fluid delivered by the hydraulic pump 5, that is, by the driving of the prime mover 4.

Figure 2A:
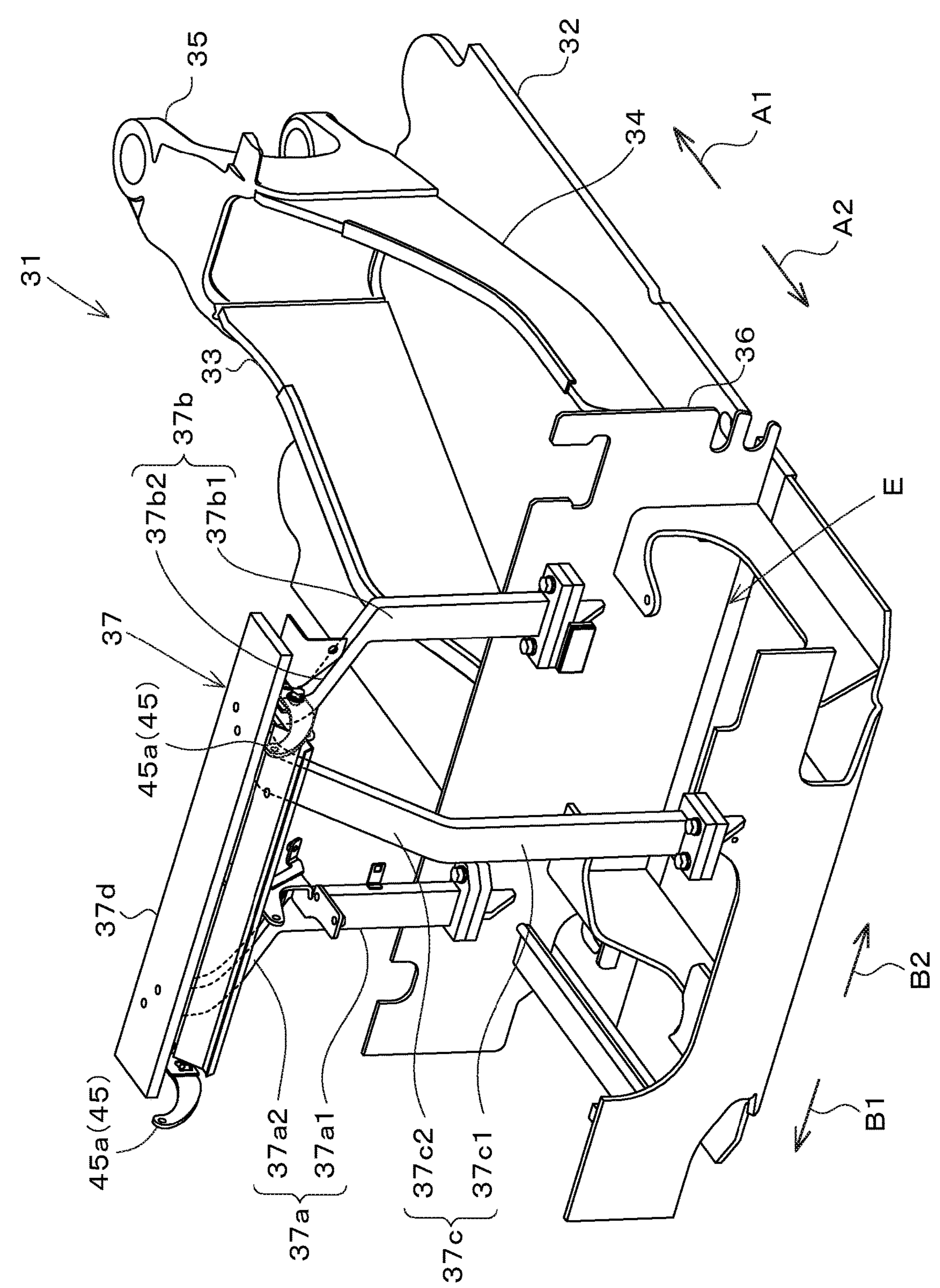
FIG. 2A is a right-rear perspective view illustrating a swivel frame.
Figure 2B:
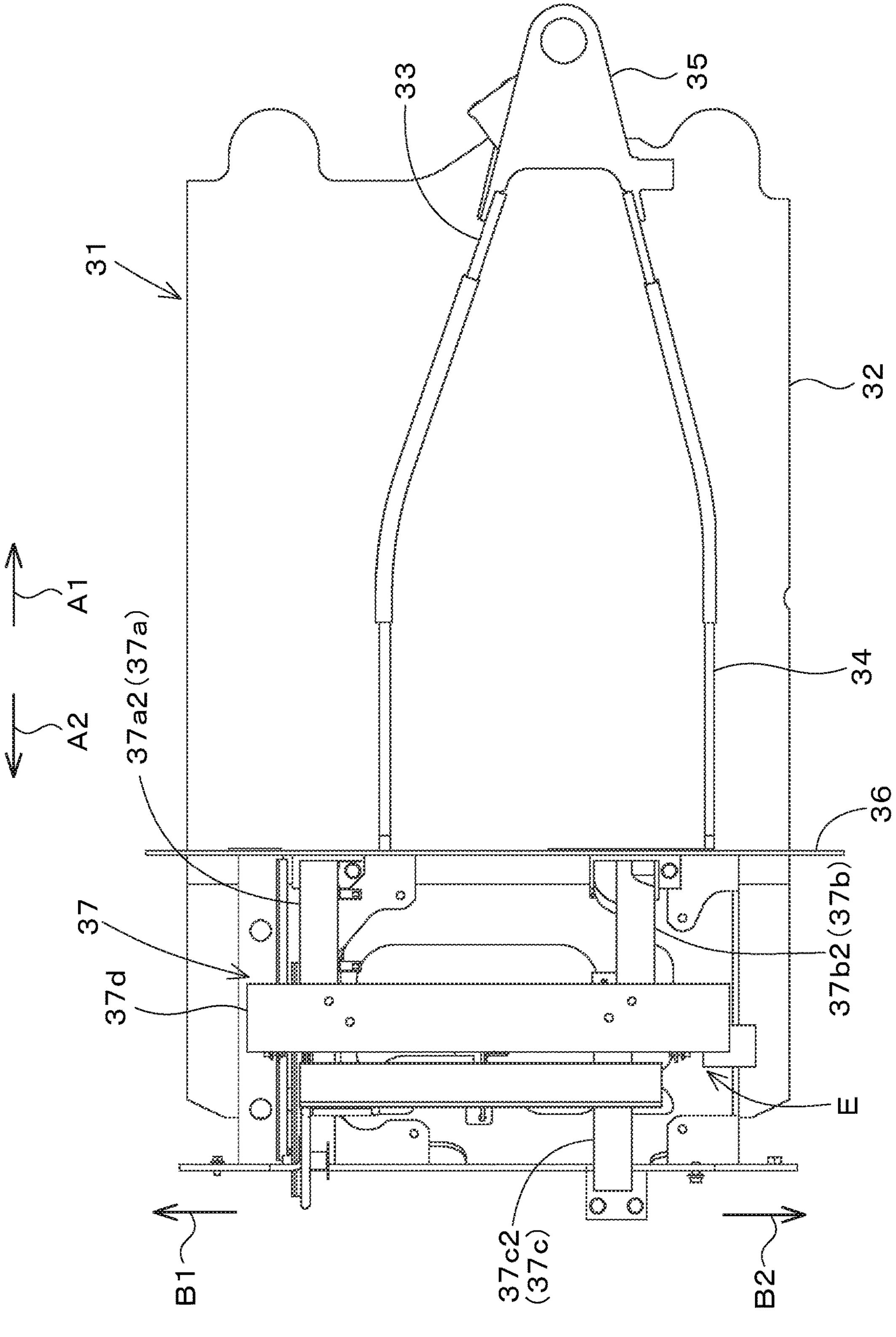
FIG. 2B is a plan view illustrating the swivel frame.

The swivel base 2 will now be described. The swivel base 2 has a swivel frame 31 and a weight 38 attached to the rear section of the swivel frame 31. As shown in FIG. 2A and FIG. 2B, the swivel frame 31 has the swivel substrate (substrate) 32, a plurality of vertical ribs (a first vertical rib 33 and a second vertical rib 34), a support bracket 35, a partition 36, and a support frame 37. The swivel frame 31 is also provided with, for example, brackets and stays for attaching devices, tanks, and other components to be installed in the swivel base 2.

The swivel substrate 32 is formed of a thick steel plate whose plate surfaces are oriented in the up-down direction. The swivel substrate 32 is supported on the traveling device 10 in such a manner as to be rotatable around the swivel axis via the swivel bearing 3.

As shown in FIG. 2A and FIG. 2B, the first vertical rib 33 and the second vertical rib 34 reinforce the swivel substrate 32 and extend from the front toward the rear of the swivel substrate 32. The first vertical rib 33 and the second vertical rib 34 stand upright on the swivel substrate 32 and are arranged apart from each other in the machine-body width direction. The first vertical rib 33 is disposed at the left of the swivel substrate 32, whereas the second vertical rib 34 is disposed at the right of the swivel substrate 32.

As shown in FIG. 2A and FIG. 2B, the support bracket 35 is provided in front of the first vertical rib 33 and the second vertical rib 34. The support bracket 35 and front sections of the first vertical rib 33 and the second vertical rib 34 are provided at a position offset rightward from the center of the swivel substrate 32 in the machine-body width direction. As shown in FIG. 16, the swing bracket 21 is attached to the support bracket 35 in such a manner as to be swingable around the vertical axis (axis extending in the up-down direction), and the working device 20 is attached to the swing bracket 21.

The partition 36 defines a front lower end of the engine room E. As shown in FIG. 2A and FIG. 2B, the partition 36 has plate surfaces oriented in the front-rear direction, and is disposed to extend across the rear section of the swivel substrate 32 from one (left) side to the other (right) side in the machine-body width direction.

As shown in FIG. 2A and FIG. 2B, the support frame 37 stands upright behind the partition 36 at the rear section of the swivel substrate 32. The support frame 37 is disposed within a hood 40 (engine room E) and supports the hood 40 and peripheral components of the prime mover 4. The support frame 37 has a plurality of leg members (a first leg 37*a*, a second leg 37*b*, and a third leg 37*c*) standing upright on the swivel substrate 32, and a rod member 37*d* fixed to the top of the plurality of leg members.

The first leg 37*a* has a first pillar segment 37*a*1 and a first extending segment 37*a*2. As shown in FIG. 2A and FIG. 2B, the first pillar segment 37*a*1 stands upright in the front left area of the engine room E and extends in the up-down direction. In detail, the lower end of the first pillar segment 37*a*1 is attached to the left area on the rear surface of the partition 36. The first extending segment 37*a*2 extends rearward and upward from the upper end of the first pillar segment 37*a*1, bends at an intermediate point, and then extends substantially upward.

The second leg 37*b* has a second pillar segment 37*b*1 and a second extending segment 37*b*2. As shown in FIG. 2A and FIG. 2B, the second pillar segment 37*b*1 stands upright in the front right area of the engine room E and extends in the up-down direction. In detail, the lower end of the second pillar segment 37*b*1 is attached to the right area on the rear surface of the partition 36. The second extending segment 37*b*2 extends rearward and upward from the upper end of the second pillar segment 37*b*1, bends at an intermediate point, and then extends substantially upward.

The third leg 37*c* has a third pillar segment 37*c*1 and a third extending segment 37*c*2. As shown in FIG. 2A and FIG. 2B, the third pillar segment 37*c*1 stands upright in the rear area of the engine room E and extends in the up-down direction. The third extending segment 37*c*2 extends forward and upward from the upper end of the third pillar segment 37*c*1, bends at an intermediate point, and then extends forward.

As shown in FIG. 2A, the rod member 37*d* extends in the machine-body width direction such that the plate surfaces thereof are oriented in the up-down direction, is disposed on the upper end of the first extending segment 37*a*2, the upper end of the second extending segment 37*b*2, and the upper end of the third extending segment 37*c*2, and is fixed to these extending segments.

The swivel base 2 is provided with an exterior cover. The exterior cover covers the prime mover 4, the hydraulic pump 5, a fuel tank 50, a battery, a hydraulic fluid tank, a radiator 52, and an oil cooler 53.

Figure 3A:
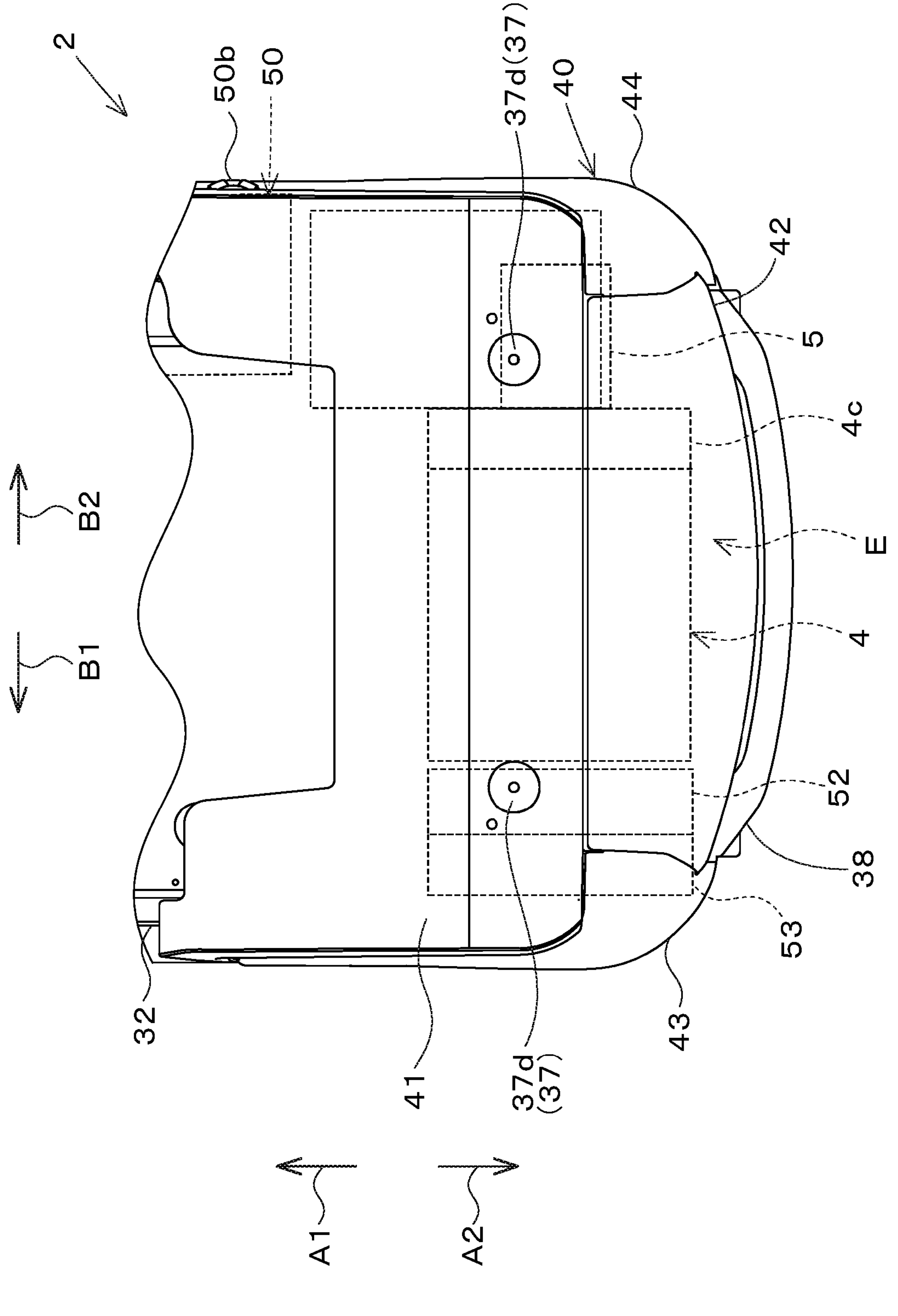
FIG. 3A is a plan view illustrating the hood.
Figure 3B:
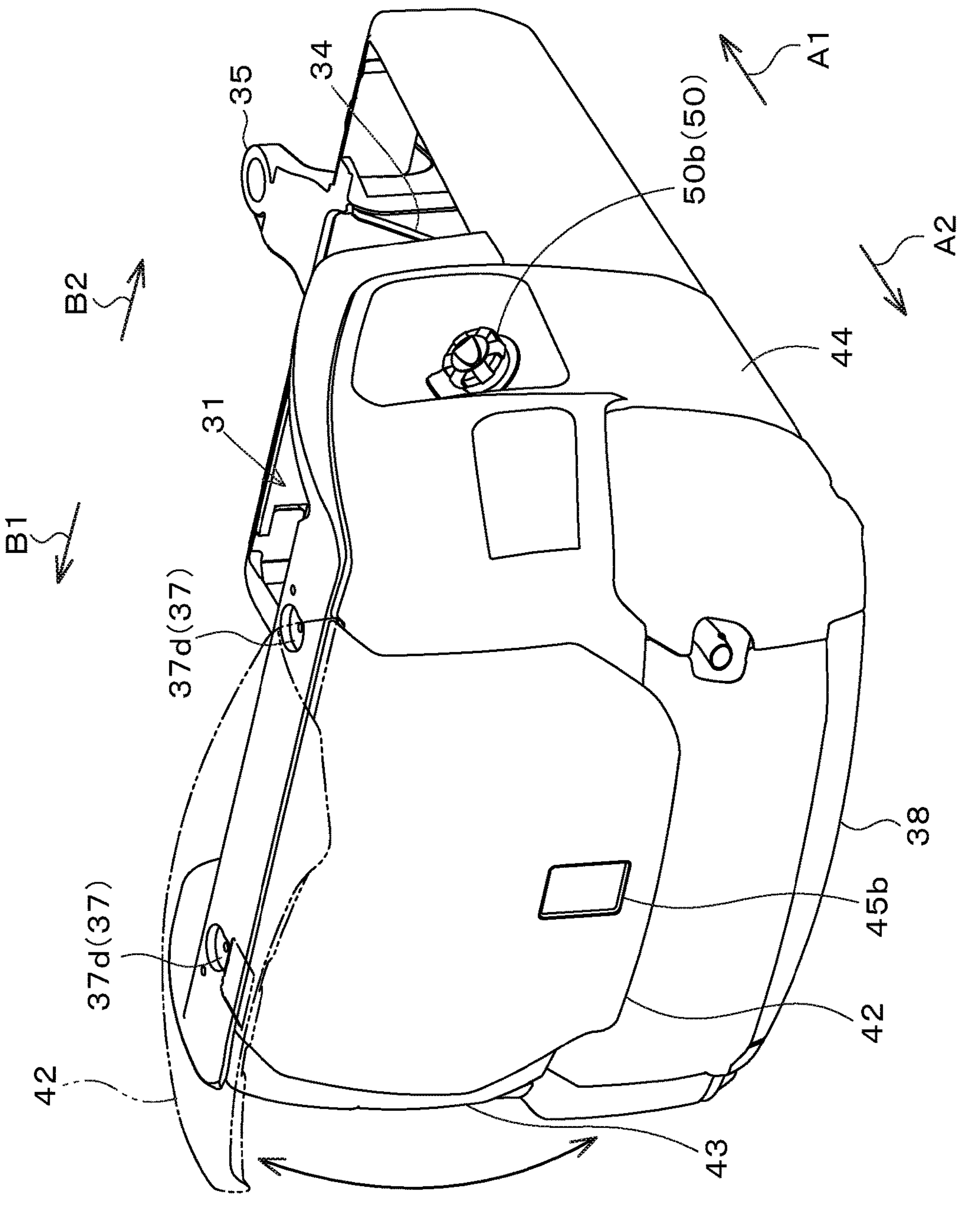
FIG. 3B is a left-rear perspective view of the swivel base and illustrates opening and closing of the hood.

The exterior cover has the hood 40. As shown in FIG. 3A and FIG. 3B, the hood 40 is a cover that mainly covers the prime mover 4 and forms the engine room E that accommodates the prime mover 4. The hood 40 includes a hood center 41, a rear hood 42, a first lateral hood 43, and a second lateral hood 44.

As shown in FIG. 3A, the hood center 41 is a cover member that covers the upper and front areas of the prime mover 4 and blocks the interior of the protection mechanism 60 and the engine room E from each other. The hood center 41 is fastened to the upper section of the rod member 37*d* by using a fastening member, such as a bolt, and the lower section of the hood center 41 is attached to the upper section of the partition 36.

The rear hood 42 is a cover member that covers the rear area of the prime mover 4, is coupled to the support frame 37 in a swingable manner, and is openable and closable, as shown in FIG. 3B. Specifically, the front section of the rear hood 42 is coupled to the support frame 37 in a swingable manner by a hinge structure 45, and is openable and closable around a swing axis of the hinge. In other words, the hood 40 is openable and closable.

As shown in FIG. 3B, the first lateral hood 43 is a cover member that covers the left area of the prime mover 4 and the hydraulic pump 5. The second lateral hood 44 is a cover member that covers the right area of the prime mover 4, the radiator 52, and the oil cooler 53. The second lateral hood 44 is provided with an opening for taking air into the engine room E (hood 40).

The hinge structure 45 that supports the rear hood 42 will now be described. The hinge structure 45 is disposed within the rear hood 42 in the machine-body width direction. The hinge structure 45 includes fixed hinges 45*a*. As shown in FIG. 2A, the fixed hinges 45*a* are fixed to the support frame 37 fixed to the upper section of the rod member 37*d*. The fixed hinges 45*a* are each formed of a thick steel plate and are fixed to one (left) side and the other (right) side within the support frame 37 in the machine-body width direction. The fixed hinges 45*a* extend rearward from lower sections of the support frame 37. The distal (rear) ends of the fixed hinges 45*a* are provided with a hinge shaft (not shown) extending in the machine-body width direction. The fixed hinges 45*a* support the rear hood 42 in a swingable manner via the hinge shaft. Specifically, the rear hood 42 is switchable between an open state where the rear hood 42 is swung upward around the hinge shaft to allow the inside and the outside of the engine room E to communicate with each other and a closed state where the rear hood 42 is swung downward around the hinge shaft to block the inside and the outside of the engine room E from each other.

Figure 1B:
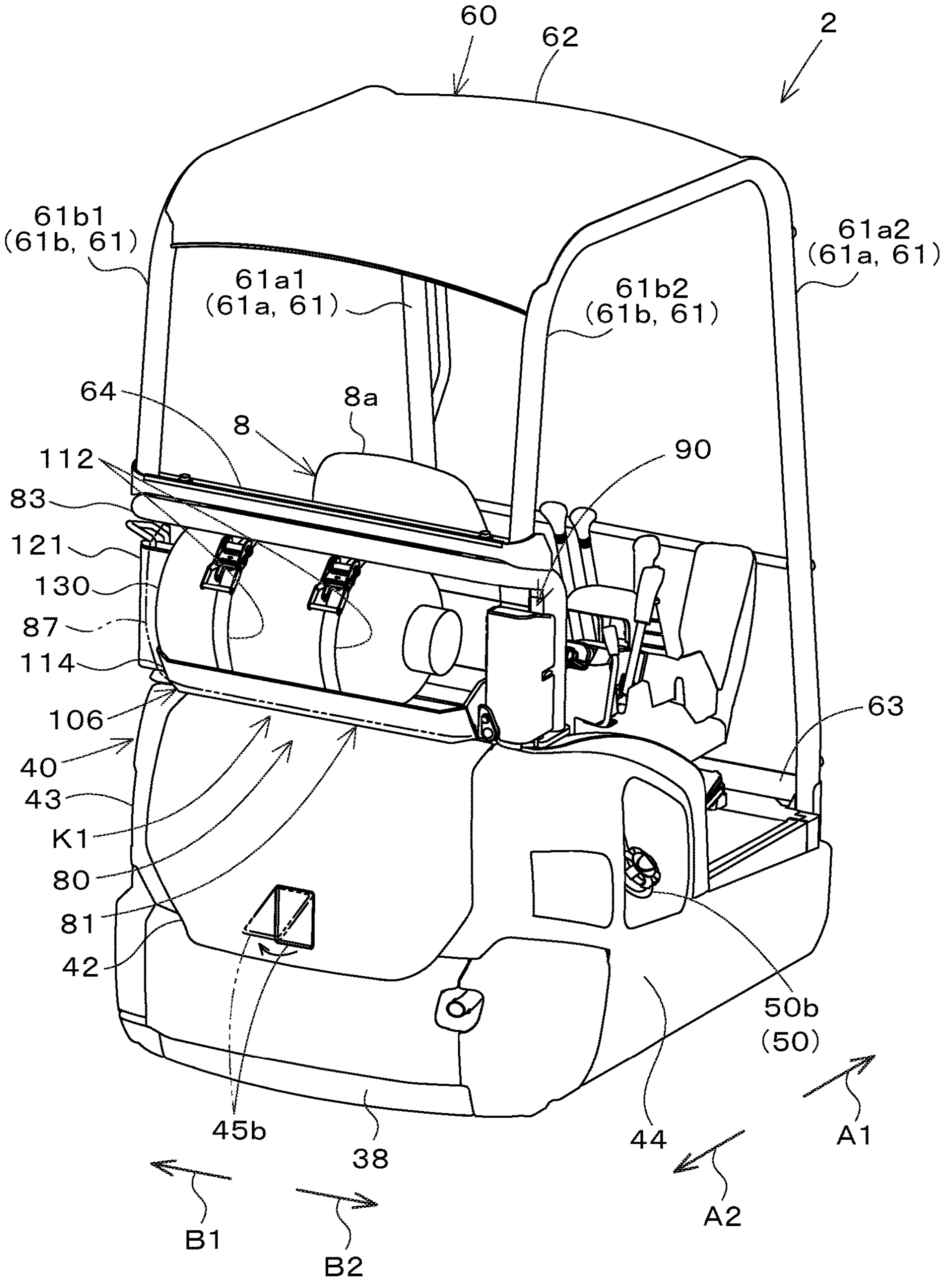
FIG. 1B is a right-rear perspective view illustrating the swivel base, the hood, and the protection mechanism.

As shown in FIG. 1A, FIG. 1B, and FIG. 3B, the rear hood 42 is provided with a locking lever 45*b*. In detail, for example, the locking lever 45*b* is provided at the lower section of the rear hood 42 and maintains the rear hood 42 in the closed state. The locking lever 45*b* is operable in a tiltable manner in the up-down direction and can be used for switching a lock member (not shown), such as a striker, provided inside the engine room E to a locked state and an unlocked state. Specifically, when the rear hood 42 is to be set to the open state, an operator lifts the locking lever 45*b* upward, unlocks the locking lever 45*b* and the lock member from each other, and lifts the rear hood 42 upward.

The protection mechanism 60 that is provided at the swivel base 2 and that covers the operator's seat 8 will be described below. As shown in FIG. 1A, FIG. 1B, FIG. 16, and FIG. 17, the protection mechanism 60 is installed toward the rear of the swivel base 2 and protects the operator's seat 8. As shown in FIG. 1A and FIG. 1B, the protection mechanism 60 has pillars 61 and a roof 62. The pillars 61 are disposed at least above the hood 40 and are spaced apart from each other in the machine-body width direction. In this embodiment, the protection mechanism 60 is a four-pillar canopy having a pair of pillars 61 disposed at the front section of the swivel base 2 and a pair of pillars 61 provided above the hood 40. The protection mechanism 60 may be a two-pillar or three-pillar canopy, or may be a cabin. The pillars 61 include a pair of front pillars 61*a* that support the front section of the roof 62 and a pair of rear pillars 61*b* that support the rear section of the roof 62.

As shown in FIG. 1A and FIG. 1B, the pair of front pillars 61*a* include a first front pillar 61*a*1 and a second front pillar 61*a*2 that are disposed at one (left) side and the other (right) side, respectively, of the swivel base 2 in the machine-body width direction. The first front pillar 61*a*1 and the second front pillar 61*a*2 are spaced apart from each other in the machine-body width direction at the front section of the swivel base 2, and extend in the up-down direction. Furthermore, the first front pillar 61*a*1 and the second front pillar 61*a*2 are located at front corners of the protection mechanism 60 and support front corners of the roof 62.

As shown in FIG. 1A and FIG. 1B, the pair of rear pillars 61*b* include a first rear pillar 61*b*1 and a second rear pillar 61*b*2 that are disposed at one (left) side and the other (right) side, respectively, of the swivel base 2 in the machine-body width direction. The first rear pillar 61*b*1 and the second rear pillar 61*b*2 are spaced apart from each other in the machine-body width direction at the rear section of the swivel base 2, and extend in the up-down direction. Furthermore, the first rear pillar 61*b*1 and the second rear pillar 61*b*2 are located at rear corners of the protection mechanism 60 and support rear corners of the roof 62.

As shown in FIG. 1A, FIG. 1B, FIG. 16, and FIG. 17, the roof 62 is a substantially-tabular structural body that covers the space above the operator's seat 8, and is supported by the upper sections of the pillars 61 such that plate surfaces of the roof 62 are oriented in the up-down direction. The roof 62 extends rearward from the front section of the swivel base 2 and extends from one (left) side toward the other (right) side of the swivel base 2 in the machine-body width direction.

Figure 4:
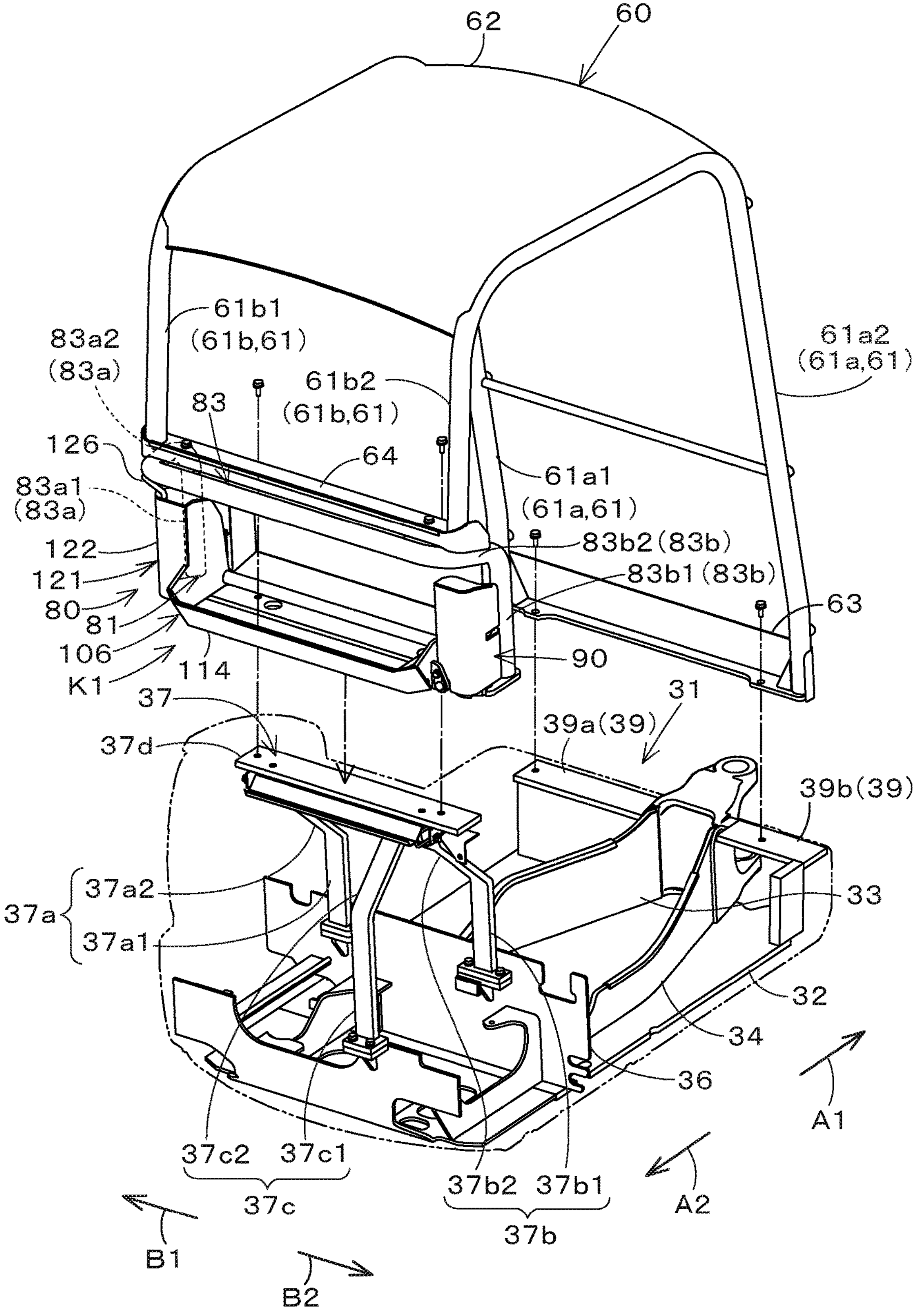
FIG. 4 is a right-rear perspective view illustrating how the protection mechanism is attached.

As shown in FIG. 1A, FIG. 1B, and FIG. 4, a front lower end of the protection mechanism 60 is provided with a front lower frame 63. The front lower frame 63 is provided between the lower end of the first front pillar 61*a*1 and the lower end of the second front pillar 61*a*2. Specifically, the front lower frame 63 extends in the machine-body width direction, and the first front pillar 61*a*1, the second front pillar 61*a*2, the roof 62, and the front lower frame 63 form a front window of the protection mechanism 60 through which the interior of the protection mechanism 60 and the space in front of the protection mechanism 60 communicate with each other.

Furthermore, as shown in FIG. 1A, FIG. 1B, and FIG. 4, a rear lower end of the protection mechanism 60 is provided with a rear lower frame 64. The rear lower frame 64 is provided between the lower end of the first rear pillar 61*b*1 and the lower end of the second rear pillar 61*b*2. The rear lower frame 64 is provided at a position higher than that of the front lower frame 63. The rear lower frame 64 extends in the machine-body width direction, and the first rear pillar 61*b*1, the second rear pillar 61*b*2, the roof 62, and the rear lower frame 64 form a rear window of the protection mechanism 60 through which the interior of the protection mechanism 60 and the space behind the protection mechanism 60 communicate with each other.

The following description relates to front support of the protection mechanism 60. As shown in FIG. 4, the swivel base 2 includes front mount members 39 (a first front mount member 39*a* and a second front mount member 39*b*) that support the front lower frame 63. The first front mount member 39*a* is provided at one (left) side, in the machine-body width direction, of the front section of the swivel base 2. Specifically, the first front mount member 39*a* is disposed at the left of the swing bracket 21. The first front mount member 39*a* is attached to the left of the front lower frame 63 by using a fastening member, such as a bolt.

On the other hand, the second front mount member 39*b* is provided at the other (right) side, in the machine-body width direction, of the front section of the swivel base 2. Specifically, the second front mount member 39*b* is disposed at the right of the swing bracket 21. The second front mount member 39*b* is attached to the right of the front lower frame 63 by using a fastening member, such as a bolt.

As shown in FIG. IA, FIG. 1B, FIG. 2A, FIG. 2B, FIG. 10, and FIG. 16, the swivel working machine 1 includes a fuel cylinder (accommodated object) 130 that contains fuel (gaseous fuel, second fuel). The fuel cylinder 130 is, for example, a closed-end cylindrical container and contains compressed second fuel therein as compressed gas or liquid. The fuel cylinder 130 is, for example, a high-pressure gas container. The second fuel is fuel used for driving the prime mover 4. Examples include compressed natural gas (CNG), liquefied natural gas (LNG), compressed petroleum gas (CPG), and liquefied petroleum gas (LPG). The second fuel contained in the fuel cylinder 130 is supplied to the prime mover 4 via a hose connected to the fuel cylinder 130.

As shown in FIG. 1A, FIG. 1B, and FIG. 4, the swivel working machine 1 includes a container 81 that is provided between the hood 40 and the pillars 61 and that accommodates the fuel cylinder 130 (accommodated object). Accordingly, the swivel working machine 1 can effectively utilize the space between the hood 40 and the pillars 61 so as to ensure an accommodation space for the fuel cylinder 130. The swivel working machine 1 also includes a support body 80 that supports the pillars 61 and that forms the container 81. The support body 80 is provided at the swivel base 2 and supports the pillars 61 disposed above the hood 40 among the pillars 61 of the protection mechanism 60. For example, the support body 80 is disposed at the rear section of the swivel base 2 and supports the rear pillars 61*b*.

Figure 5A:
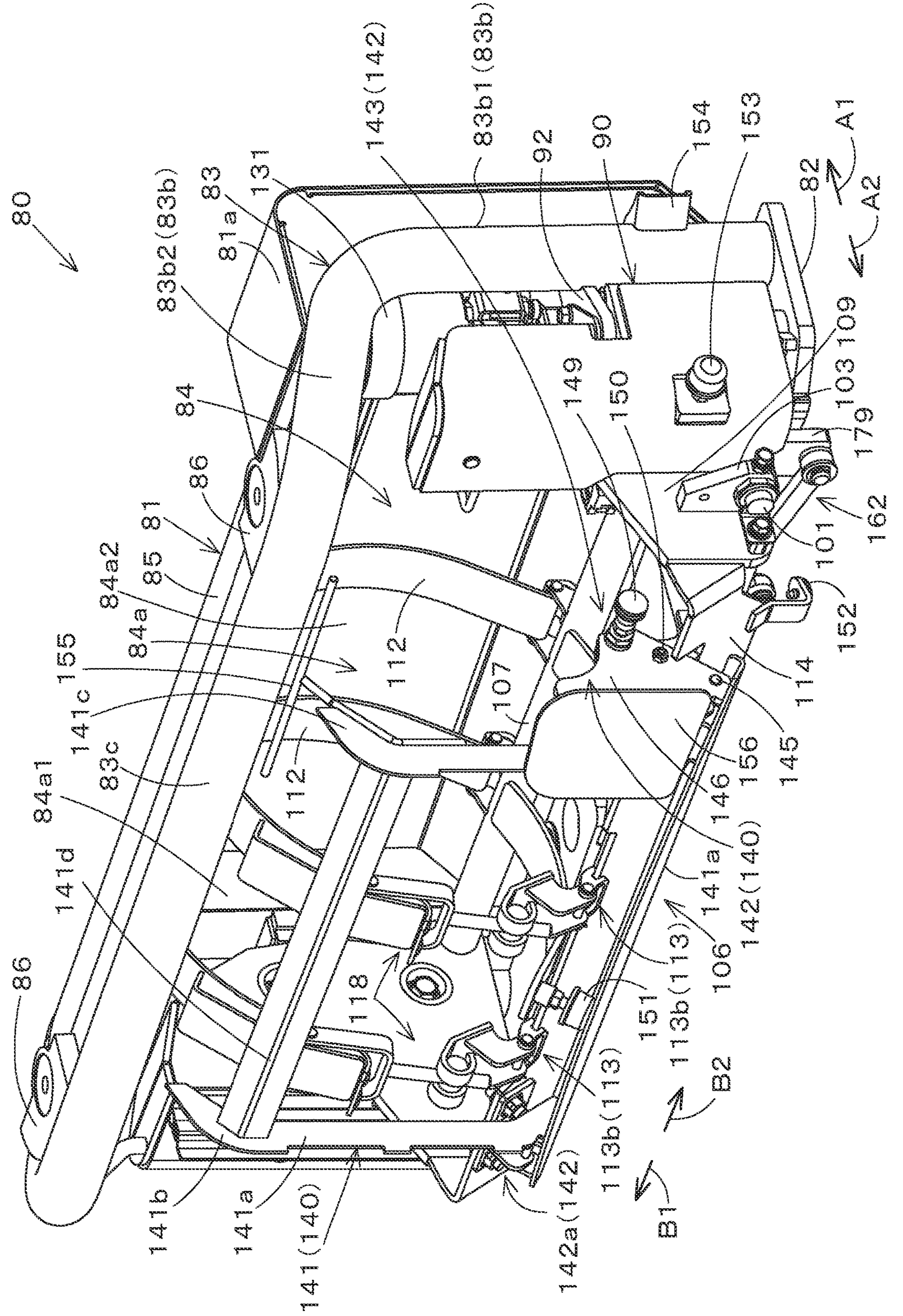
FIG. 5A is a right-rear perspective view illustrating a support body.

As shown in FIG. 5A, the support body 80 has a base member 82, a frame body 83, a vertical member 84, and an upper member 85. The base member 82 serves as the lower section of the support body 80, is disposed such that plate surfaces thereof are oriented in the up-down direction, and is a tabular member whose length in the machine-body width direction and length in the front-rear direction are larger than the length in the up-down direction. The base member 82 is located above the hood center 41 (hood 40) and is fastened to the upper section of the rod member 37*d* (support frame 37) via the hood center 41 by using a fastening member, such as a bolt.

Figure 5B:
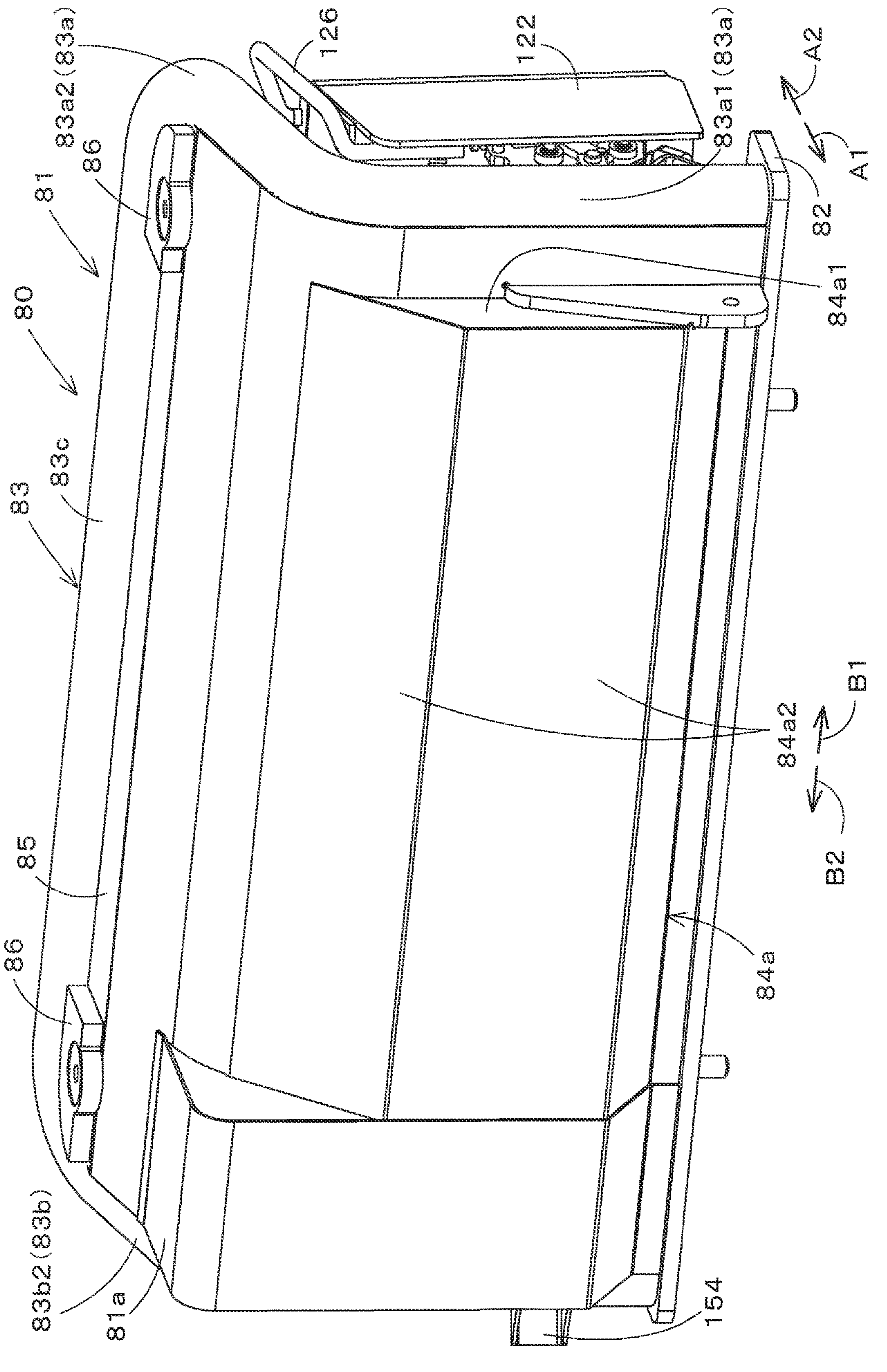
FIG. 5B is a left-front perspective view illustrating the support body.
Figure 6A:
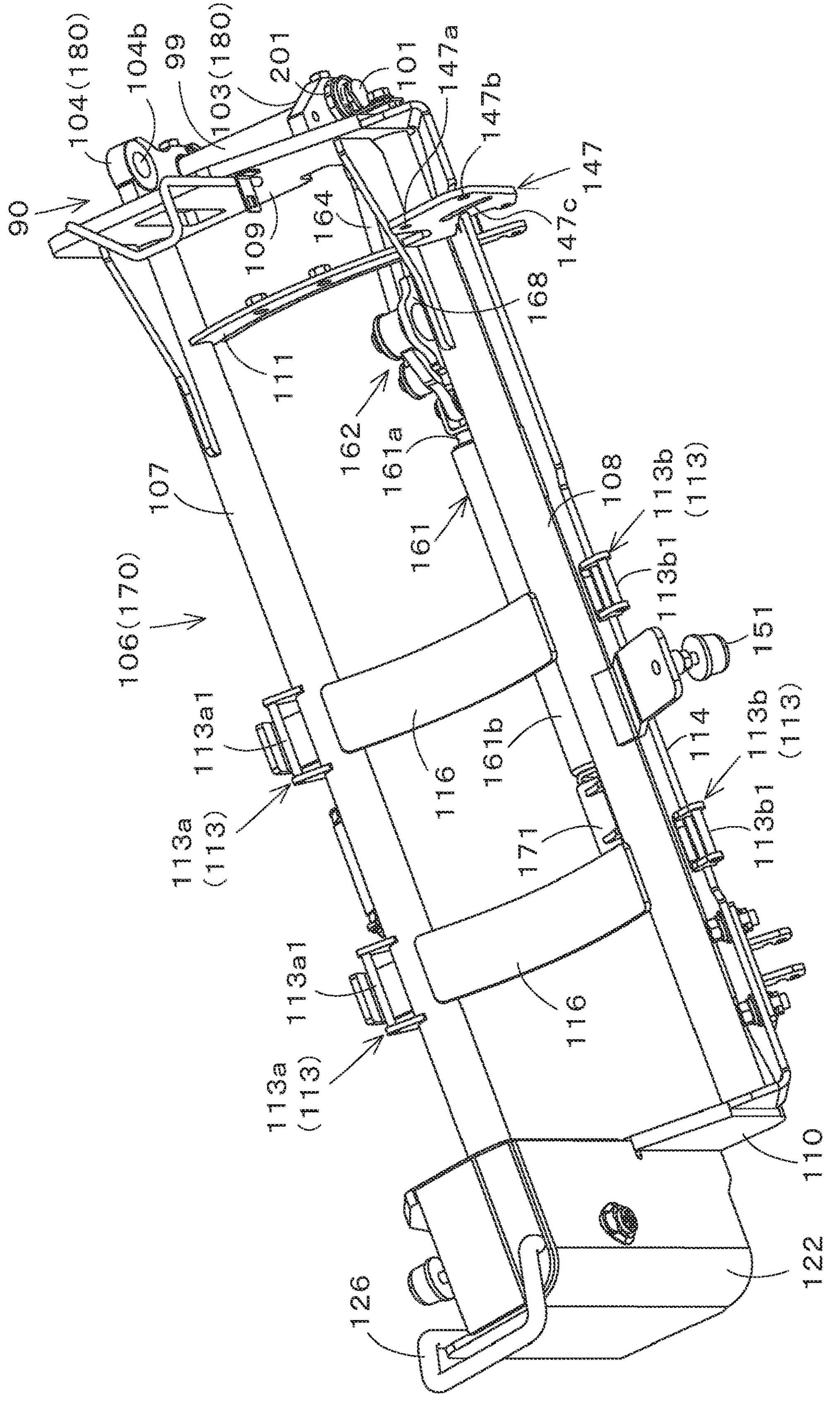
FIG. 6A is a left-rear perspective view illustrating an installation section.

As shown in FIG. 5A, FIG. 5B, and FIG. 6A, the frame body 83 is provided above the base member 82 and supports an attachment section 86, to be described later, relative to the swivel base 2. For example, the frame body 83 is formed by bending a hollow pipe, and includes a first pillar 83*a*, a second pillar 83*b*, and a connection rod 83*c*. The first pillar 83*a* serves as one (left) side of the frame body 83, whereas the second pillar 83*b* serves as the other (right) side of the frame body 83. The first pillar 83*a* and the second pillar 83*b* stand upright at the upper section of the base member 82 and are disposed apart from each other in the machine-body width direction.

As shown in FIG. 5B and FIG. 6A, the first pillar 83*a* has a first segment 83*a*1 and a second segment 83*a*2 bent rearward from the upper end of the first segment 83*a*1. The first segment 83*a*1 extends upward from the upper section of the left end of the base member 82 and extends upward from the front of the hood 40. The rear end of the second segment 83*a*2 bends rightward. The second pillar segment 83*b* has a first segment 83*b*1 extending upward from the front of the hood 40 and a second segment 83*b*2 bent rearward from the upper end of the first segment 83*b*1. The first segment 83*b*1 extends upward from the upper section of the left end of the base member 82. The rear end of the second segment 83*b*2 bends leftward. Specifically, the hood 40 (rear hood 42), the first segments 83*a*1 and 83*b*1, and the second segments 83*a*2 and 83*b*2 surround a space above the hood 40 to form the container 81.

As shown in FIG. 5A, FIG. 5B, and FIG. 6A, the connection rod 83*c* extends between the upper end of the first pillar 83*a* and the upper end of the second pillar 83*b* and couples the first pillar 83*a* and the second pillar 83*b* to each other.

As shown in FIG. 5A, FIG. 5B, and FIG. 6A, the vertical member 84 extends upward from the upper section of the base member 82. The vertical member 84 extends upward from the front of the hood 40. Specifically, the vertical member 84 is disposed between the front of the hood 40 and the rear of a backrest 8*a* of the operator's seat 8 and separates the operator's seat 8 and the fuel cylinder 130 from each other. The vertical member 84 is a tabular member that connects the front section of the lower end of the first pillar 83*a* of the frame body 83 and the front section of the lower end of the second pillar 83*b* to each other, has a length in the up-down direction and a length in the machine-body width direction that are larger than the length in the front-rear direction, and is disposed such that plate surfaces thereof are oriented in the front-rear direction.

As shown in FIG. 5A, FIG. 5B, and FIG. 6A, the vertical member 84 includes a recess 84*a* recessed forward from the center thereof. The recess 84*a* has a pair of lateral portions 84*a*1 and an inclined portion 84*a*2. The lateral portions 84*a*1 are tabular portions that are disposed apart from each other in the machine-body width direction, have a length in the front-rear direction and a length in the up-down direction that are larger than the length in the machine-body width direction, and have, for example, a substantially trapezoidal shape in side view.

As shown in FIG. 5B, the inclined portion 84*a*2 is bent along the front edges of the pair of lateral portions 84*a*1. Specifically, one (left) edge of the inclined portion 84*a*2 is coupled to the edge of the left lateral portion 84*a*1, whereas the other (right) edge is coupled to the edge of the right lateral portion 84*a*1. The upper member 85 extends rearward from the upper section of the vertical member 84, extends from one (left) side toward the other (right) side in the machine-body width direction, and is located above the hood 40. As shown in FIG. 5B, the upper member 85 connects the upper end of the first pillar 83*a* and the upper end of the second pillar 83*b* to each other, extends to the connection rod 83*c*, and bends rearward and upward from the upper end of the vertical member 84 along an intermediate section of the first pillar 83*a* and an intermediate section of the second pillar 83*b*. Furthermore, the upper member 85 covers the space above the hood 40 together with the vertical member 84. Accordingly, the hood 40, the vertical member 84, and the upper member 85 surround the space above the hood 40 to form the container 81.

The attachment section 86 is where the rear pillars 61*b* of the protection mechanism 60 are to be attached. As shown in FIG. 5A and FIG. 5B, the attachment section 86 is a tabular member that is coupled to the upper section of the support body 80, that is, the frame body 83, and whose plate surfaces are oriented toward one (left) side and the other (right) side of the upper member 85 in the machine-body width direction. In other words, the attachment section 86 supports the rear pillars 61*b* by being coupled to the rear lower frame 64 of the protection mechanism 60, and the rear pillars 61*b* (pillars 61) are attached to the first pillar 83*a*, the second pillar 83*b*, and one (left) side and the other (right) side of the upper member 85 in the machine-body width direction via the attachment section 86. The attachment section 86 and the rear lower frame 64 are fastened to each other by using a fastening member, such as a bolt. Thus, the protection mechanism 60 is supported by the swivel base 2 via the attachment section 86, that is, the support body 80. Accordingly, the weight from the roof 62 can be distributed to one (left) side and the other (right) side of the upper member 85 in the machine-body width direction.

Figure 5C:
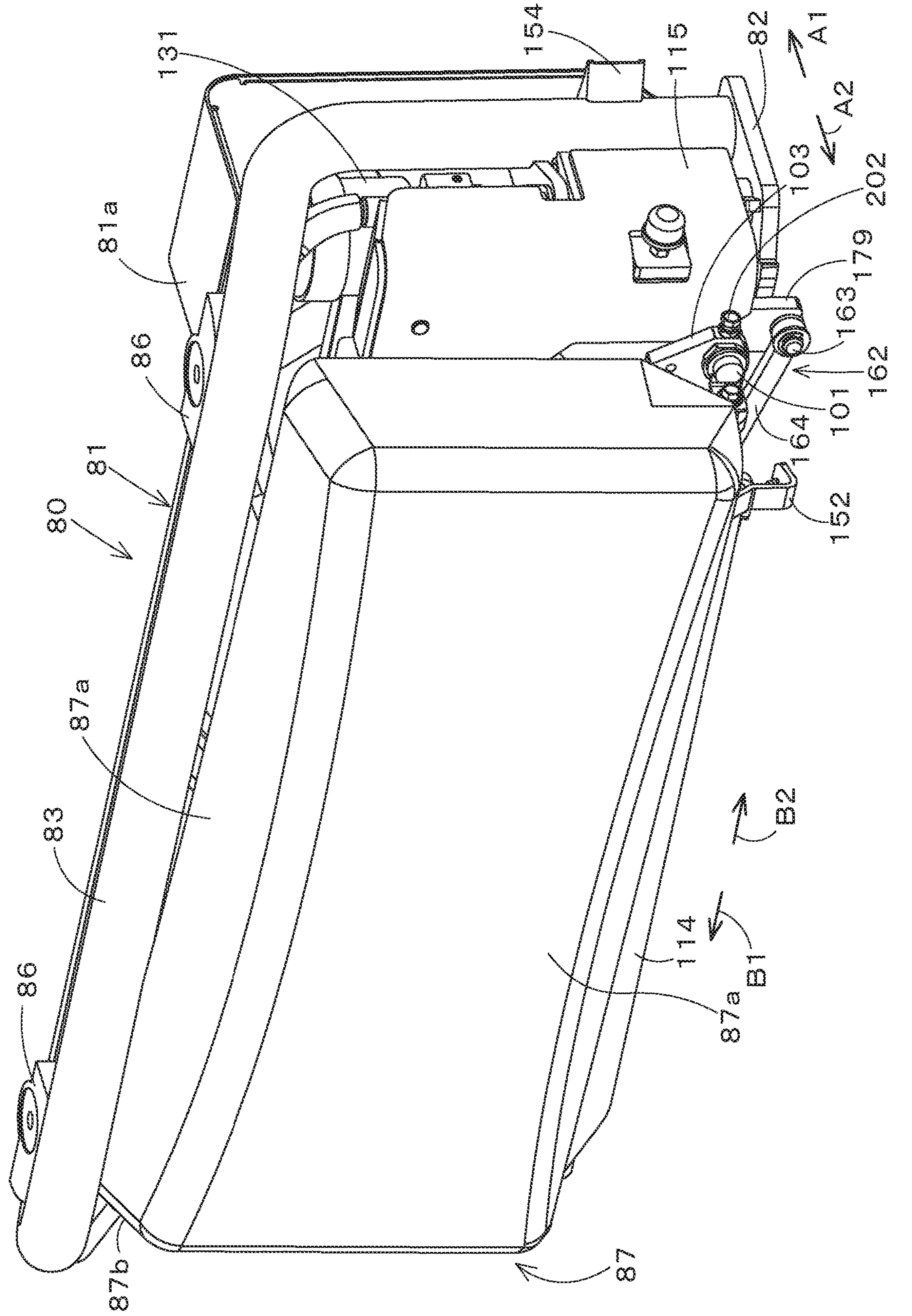
FIG. 5C illustrates a state where a cover is attached to the support body.

As shown in FIG. 1B, FIG. 5C, and FIG. 16, the container 81 may include a cover 87 that covers the rear of the accommodation space. As shown in FIG. 5C, the cover 87 has a rear wall 87*a* and a peripheral wall 87*b*. The rear wall

87*a* is disposed such that plate surfaces thereof are oriented in the front-rear direction, has a length in the machine-body width direction that is larger than the length in the up-down direction, and has a length in the front-rear direction that is smaller than the length in the machine-body width direction and the length in the up-down direction. The peripheral wall 87*b* extends forward from at least a part of the outer periphery of the rear wall 87*a* and surrounds a space in front of the rear wall 87*a*. For example, the peripheral wall 87*b* extends upward from the rear wall 87*a* as well as laterally from one (left) side and the other (right) side thereof. The attachment method of the cover 87 is not limited, such that the cover 87 may be attached to the frame body 83 by using a fastening member, such as a bolt, or may be attached to the frame body 83 by being fitted thereto. The cover 87 may be attached to the support body 80 in an openable-closable manner. For example, the cover 87 may be attached to an extending segment 114, to be described later, or to a hinge provided at the connection rod 83*c*.

As shown in FIG. 5A and FIG. 5B, the container 81 preferably has an extension 81*a* for accommodating a reserve tank (reserve cylinder) 131. The reserve tank 131 is a tank for storing reserve fuel. If the fuel cylinder 130 runs out of fuel and cannot be refilled immediately while the swivel working machine 1 is traveling or operating, the swivel working machine 1 can continue traveling or operating by using the fuel stored in the reserve tank 131. The extension 81*a* is provided at the right of the container 81. The extension 81*a* is extended forward from the accommodation space of the container 81. Alternatively, the extension 81*a* may be provided at a different location (e.g., the left) of the container 81.

As shown in FIG. 1A, FIG. 1B, and FIG. 5A, the support body 80 includes a support mechanism 90 that supports the fuel cylinder 130. In other words, the swivel working machine 1 includes the support mechanism 90. The support mechanism 90 can support the fuel cylinder 130 above the hood 40. A state where the support mechanism 90 is supporting the fuel cylinder 130 above the hood 40 (rear hood 42), that is, a state where the fuel cylinder 130 is accommodated in the container 81, will be described as an installation position (accommodation position) K1, and the support mechanism 90 will be described with reference to an example where the support mechanism 90 is in the installation position K1. The installation position K1 is a position in which at least a part of the fuel cylinder 130 overlaps the swivel base 2 in plan view. Moreover, the installation position K1 is a position in which the fuel cylinder 130 is disposed above the hood 40 in a closed state.

Figure 6B:
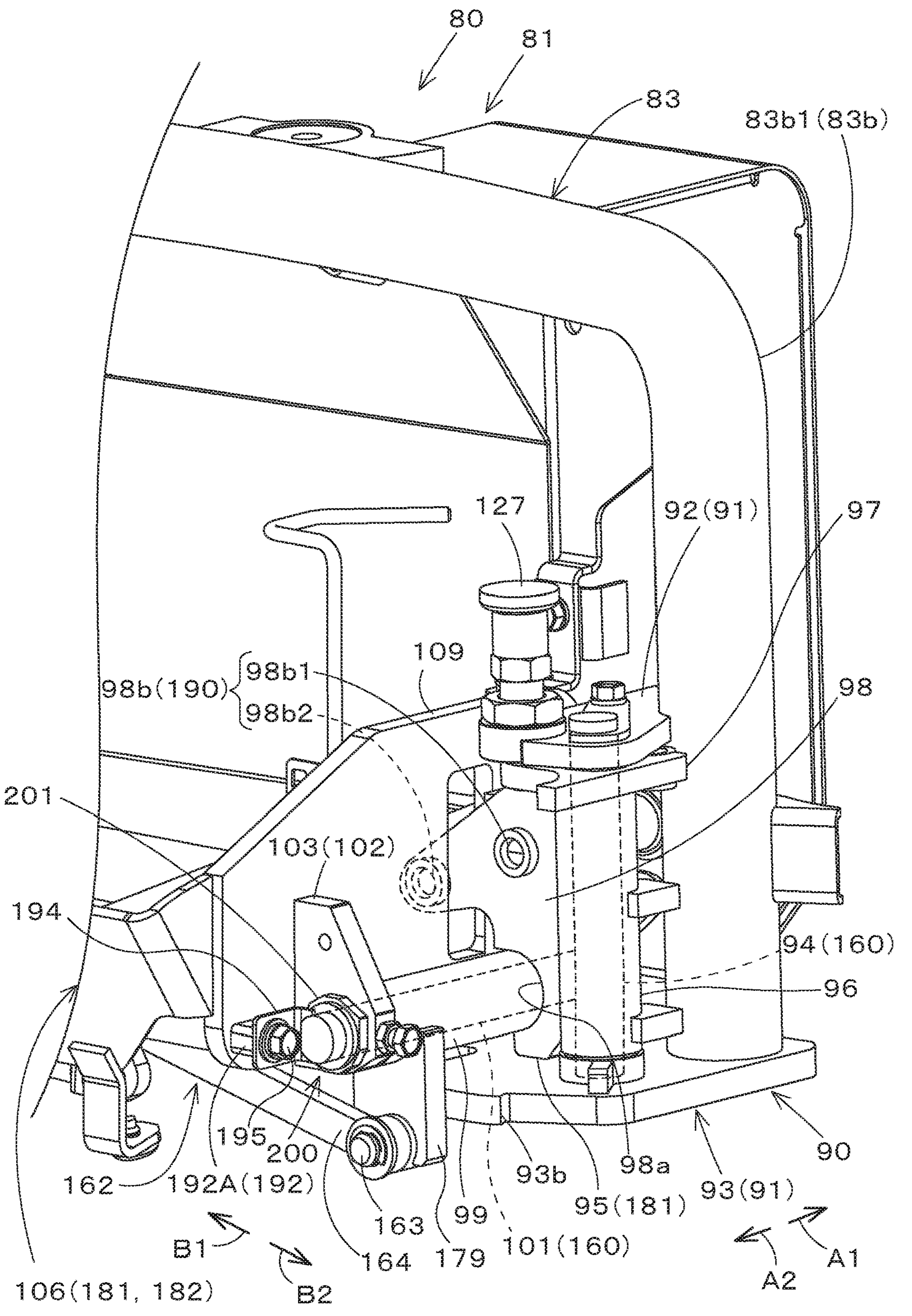
FIG. 6B is a right-rear perspective view illustrating a base, a first pivot bracket, a first pivot shaft, a second pivot bracket, and a second pivot shaft.
Figure 6C:
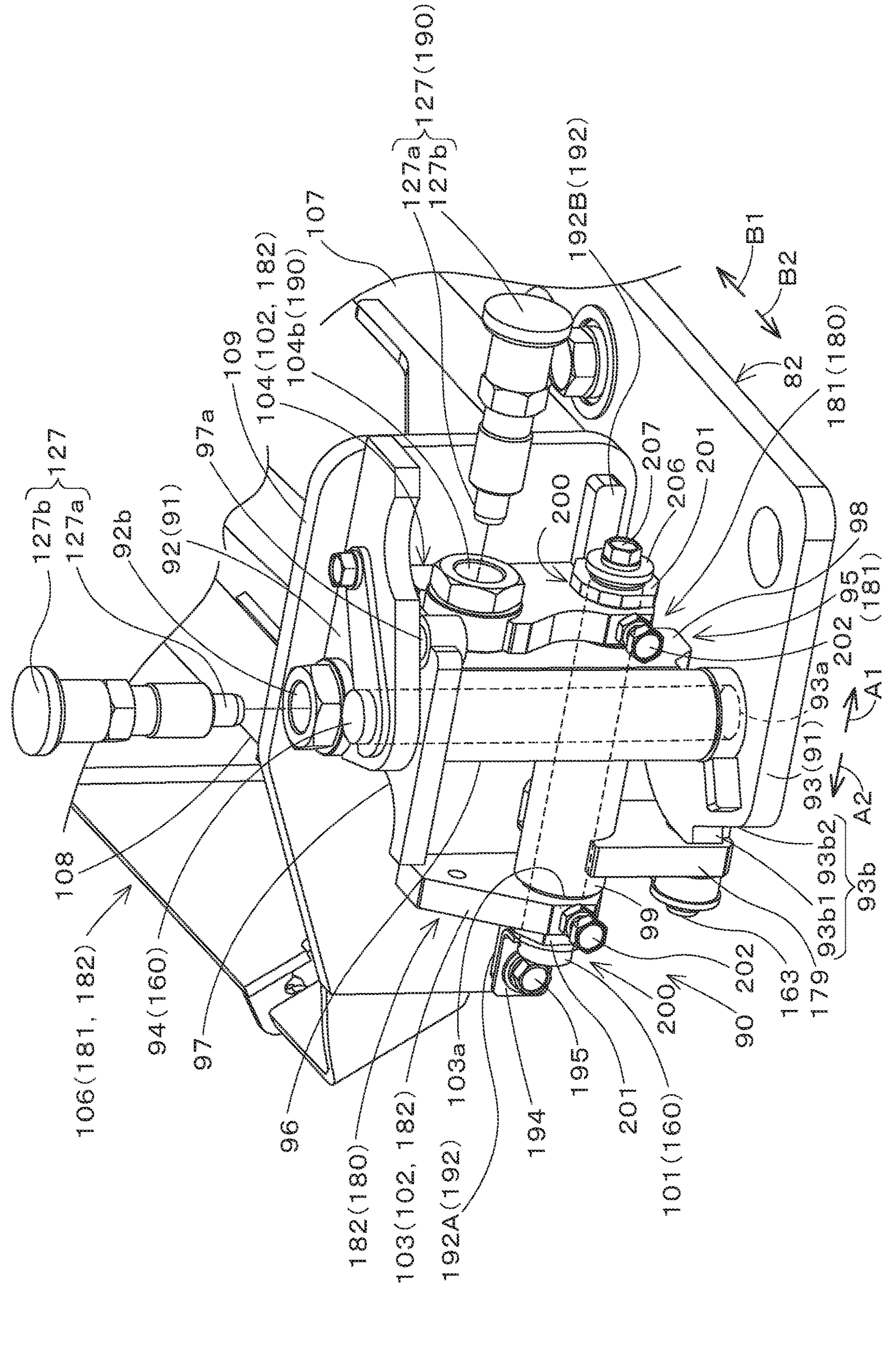
FIG. 6C is a right-front perspective view illustrating the base, the first pivot bracket, the first pivot shaft, the second pivot bracket, and the second pivot shaft.

As shown in FIG. 6A, FIG. 6B, and FIG. 6C, the support mechanism 90 includes a base 91, a first pivot shaft 94, a first pivot bracket 95, a second pivot shaft 101, a second pivot bracket 102, an installation section 106, and a support rotating body 180. In the following description, the first pivot shaft 94 and the second pivot shaft 101 may sometimes be collectively referred to as pivot shafts 160. The support mechanism 90 supports the fuel cylinder 130 in a rotatable manner around the pivot shafts 160 (the first pivot shaft 94 and the second pivot shaft 101).

The base 91 supports the first pivot shaft 94. The first pivot shaft 94 extends in the up-down direction and pivotally supports the fuel cylinder 130 in a rotatable manner in the horizontal direction. The first pivot bracket 95 couples the first pivot shaft 94 and the second pivot shaft 101 to each other and rotates around the first pivot shaft 94. The second pivot shaft 101 pivotally supports the fuel cylinder 130 in a rotatable manner in the up-down direction and specifically extends in a direction orthogonal to the first pivot shaft 94. The second pivot bracket 102 couples the second pivot shaft 101 and the installation section 106 to each other and rotates around the second pivot shaft 101. The installation section 106 is where the fuel cylinder 130 is installed. The base 91, the first pivot shaft 94, the first pivot bracket 95, the second pivot shaft 101, and the installation section 106 will be described in detail below.

Figure 6D:
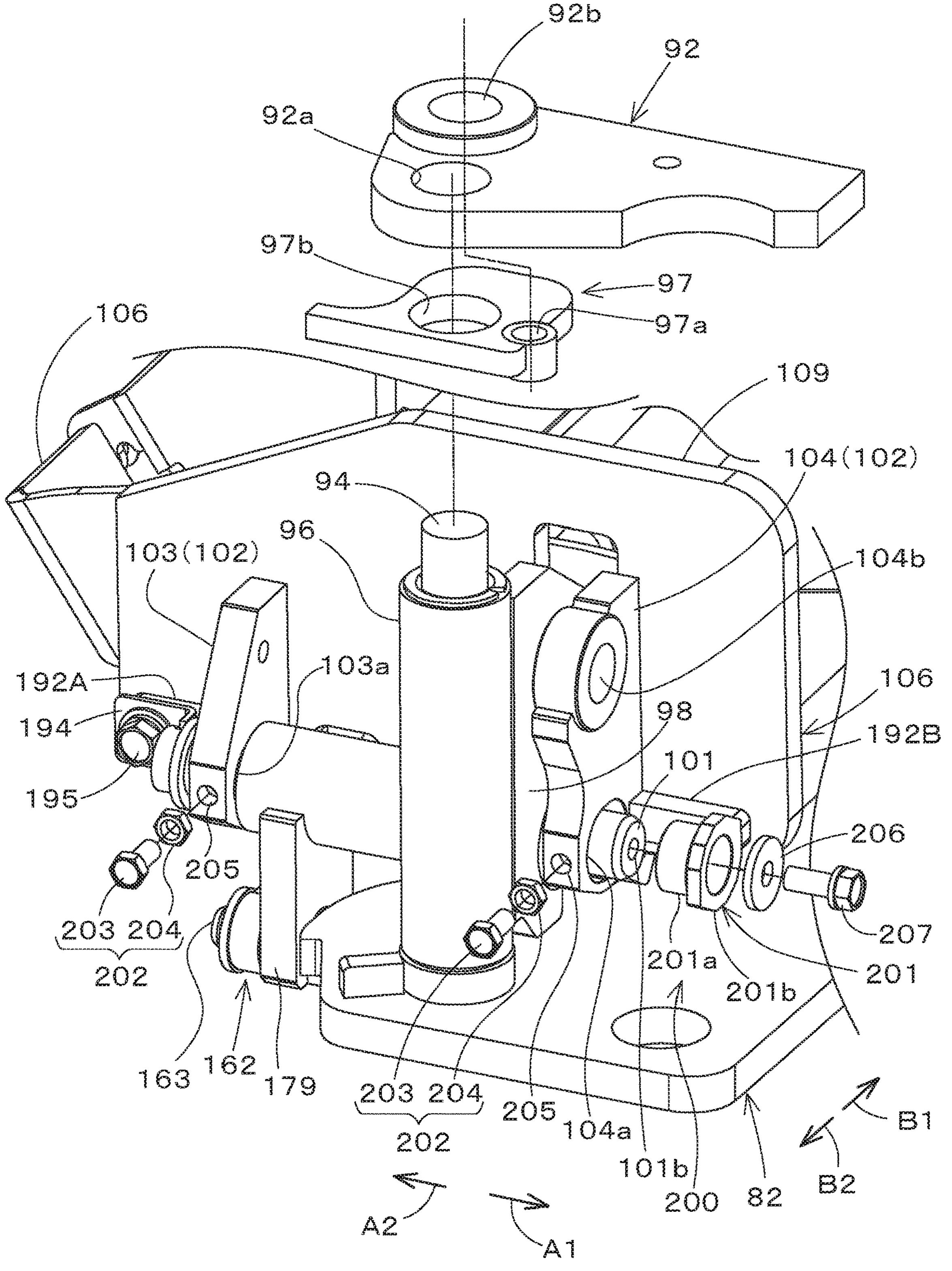
FIG. 6D is a partially exploded view of FIG. 6C.

As shown in FIG. 6B, the base 91 couples one (upper) end and the other (lower) end of the first pivot shaft 94 in the up-down direction to each other so as to support the first pivot shaft 94. As shown in FIG. 6B and FIG. 6C, the base 91 includes an upper pivotal support 92 that supports the upper end of the first pivot shaft 94 and a lower pivotal support 93 that supports the lower end of the first pivot shaft 94. As shown in FIG. 6B, the upper pivotal support 92 protrudes rearward from an intermediate section of the second pillar 83*b* in the up-down direction. The upper pivotal support 92 is a tabular member that is disposed such that plate surfaces thereof are oriented in the up-down direction, has a length in the front-rear direction that is larger than the length in the machine-body width direction, and has a length in the up-down direction that is larger than the lengths in the machine-body width direction and the front-rear direction. The rear section of the upper pivotal support 92 has a hole 92*a* extending therethrough in the up-down direction. The hole 92*a* has the first pivot shaft 94 fitted therein and is fixed to the upper end of the first pivot shaft 94 by, for example, welding. As shown in FIG. 6D, one (left) side of the first pivot shaft 94 in the upper pivotal support 92 has a first locking hole 92*b* extending therethrough in the up-down direction.

As shown in FIG. 6B and FIG. 6C, the lower pivotal support 93 extends rearward from the other (right) end of the base member 82 in the machine-body width direction. The lower pivotal support 93 is a tabular member that is disposed such that plate surfaces thereof are oriented in the up-down direction, has a length in the front-rear direction that is larger than the length in the machine-body width direction, and has a length (thickness) in the up-down direction that is smaller than the length in the machine-body width direction and the length in the front-rear direction. As shown in FIG. 6C, the lower pivotal support 93 has a hole 93*a* extending therethrough in the up-down direction, and the center of the hole 93*a* is aligned with the center of the hole 92*a* in the upper pivotal support 92 in the horizontal direction. The hole 93*a* in the lower pivotal support 93 has the first pivot shaft 94 fitted therein. The lower end of the first pivot shaft 94 and the hole 93*a* are fixed to each other by, for example, welding. The edge (rear edge) at the rear of the lower pivotal support 93 has a substantially circular-arc shape that is concentric with the center of the hole 93*a* in plan view. The other (right) side of the rear edge of the lower pivotal support 93 has a cutout 93*b*. The cutout 93*b* includes a first end surface 93*b*1 and a second end surface 93*b*2. The first end surface 93*b*1 is a rightward-oriented surface of the cutout 93*b*, and the second end surface 93*b*2 is a rearward-oriented surface of the cutout 93*b*.

As shown in FIG. 6C, the first pivot shaft 94 is supported by the upper pivotal support 92 and the lower pivotal support 93 of the base 91. The first pivot shaft 94 pivotally supports the first pivot bracket 95 in a rotatable manner around the axis. Accordingly, the first pivot shaft 94 pivotally supports the fuel cylinder 130 installed in the installation section 106 in a rotatable manner in the horizontal direction.

As shown in FIGS. 6B and 6C, the first pivot bracket 95 includes a first tube 96, an upper pivotal support piece 97, a lower pivotal support piece 98, and a second tube 99. The first tube 96 is a tubular member that has an inner diameter smaller than the outer diameter of the first pivot shaft 94 and in which the first pivot shaft 94 is fitted. The first tube 96 extends from the lower end of the upper pivotal support 92 to the upper end of the lower pivotal support 93. The length of the first tube 96 in the up-down direction is smaller than the length of the first pivot shaft 94 in the up-down direction. The upper end of the first pivot shaft 94 protrudes from the upper end of the first tube 96, and the lower end of the first pivot shaft 94 protrudes from the lower end of the first tube 96.

As shown in FIG. 6B and FIG. 6C, the upper pivotal support piece 97 is a tabular piece that extends radially outward of the first tube 96 from the upper section of the first tube 96. The upper pivotal support piece 97 is disposed such that plate surfaces thereof are oriented in the up-down direction. As shown in FIG. 6D, the upper pivotal support piece 97 has a first lock hole 97*a* and a shaft through-hole 97*b*. The shaft through-hole 97*b* has the upper section of the first pivot shaft 94 fitted therein. The first lock hole 97*a* is provided near the shaft through-hole 97*b* and has the upper pivotal support piece 97 extending therethrough in the up-down direction. The first lock hole 97*a* is disposed on the periphery of an imaginary circle concentric with the axis of the first pivot shaft 94.

Figure 6E:
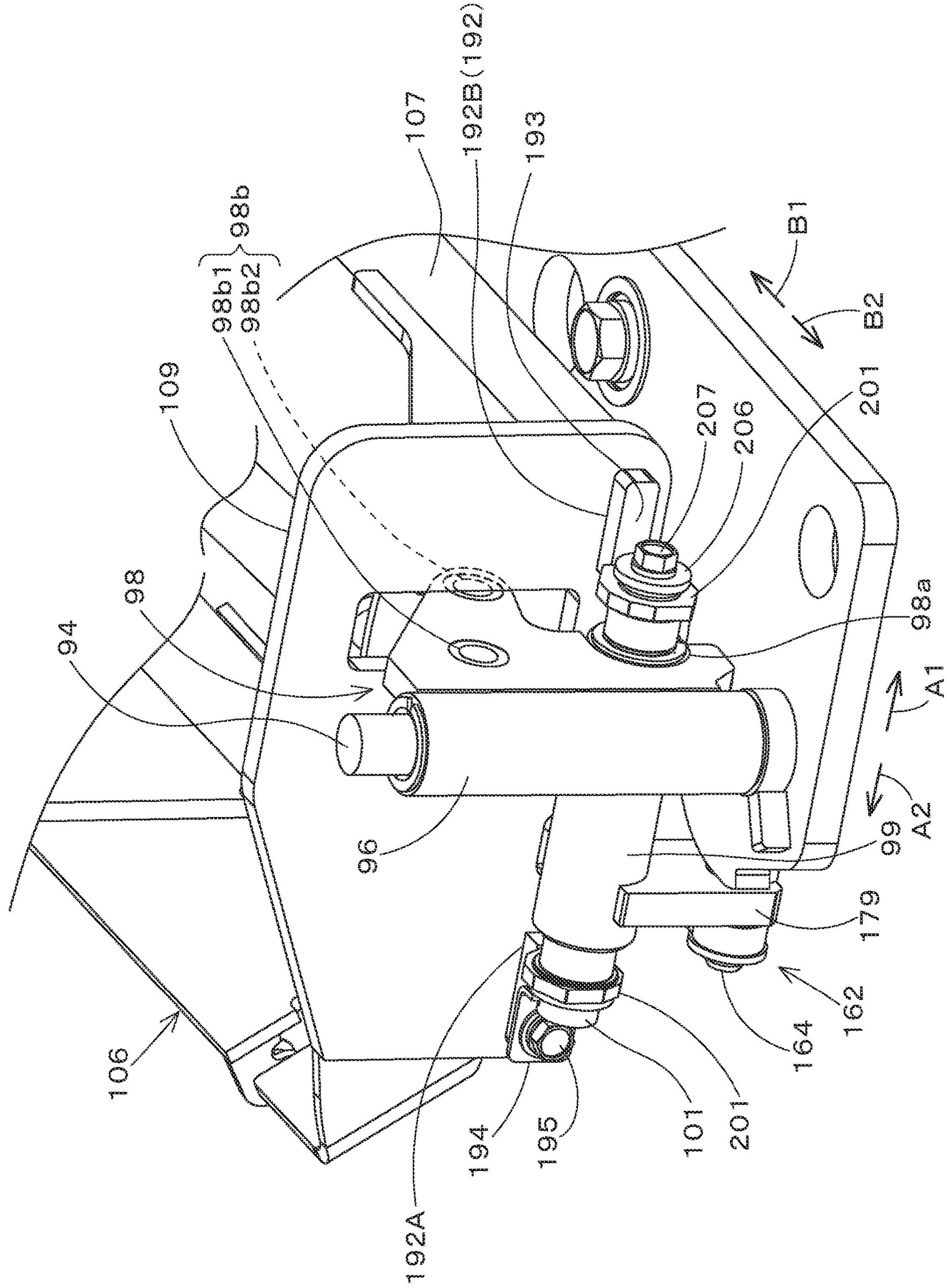
FIG. 6E illustrates a second lock hole in a lower pivotal support piece.

As shown in FIG. 6B, FIG. 6C, and FIG. 6E, the lower pivotal support piece 98 is a tabular piece that is disposed such that plate surfaces thereof are oriented in the front-rear direction and that extends radially outward of the first tube 96 from the lower surface of the upper pivotal support piece 97 to the lower section of the first tube 96. The upper end of the lower pivotal support piece 98 and the lower surface of the upper pivotal support piece 97 are coupled to each other. A tube support 98*a* that supports the second tube 99 extending in the front-rear direction is provided in the lower area of the lower pivotal support piece 98. The tube support 98*a* is formed by cutting out the left edge of the lower pivotal support piece 98 into a circular-arc shape. As shown in FIG. 6E, a plurality of second lock holes 98*b* extend in a direction (front-rear direction) parallel to the second pivot shaft 101 through the upper area of the tube support 98*a* of the lower pivotal support piece 98. The plurality of second lock holes 98*b* are arranged on the periphery of an imaginary circle concentric with the axis of the second pivot shaft 101. In this embodiment, two second lock holes 98*b* are provided in the lower pivotal support piece 98. Of the two second lock holes 98*b*, the upper second lock hole 98*b* is referred to as a second lock hole 98*b*1, and the lower second lock hole 98*b* is referred to as a second lock hole 98*b*2.

The second tube 99 is a tubular member that is oriented in the front-rear direction, is supported by the tube support 98*a* of the lower pivotal support piece 98, and has the second pivot shaft 101 fitted therein. The inner diameter of the second tube 99 is smaller than the outer diameter of the second pivot shaft 101. The front end of the second tube 99 is supported by the tube support 98*a* of the lower pivotal support piece 98.

As shown in FIG. 6B, the second pivot shaft 101 is supported by the second tube 99 of the first pivot bracket 95 and pivotally supports the installation section 106 in a rotatable manner around the axis. Accordingly, the second pivot shaft 101 pivotally supports the fuel cylinder 130 installed in the installation section 106 in a rotatable manner (around the second pivot shaft 101) in the up-down direction. The second pivot shaft 101 has a length in the front-rear direction that is larger than the length of the second tube 99 in the front-rear direction. The front end of the second pivot shaft 101 protrudes from the front end of the second tube 99, and the rear end of the second pivot shaft 101 protrudes from the rear end of the second tube 99.

As shown in FIG. 6A and FIG. 6C, the second pivot bracket 102 includes a first coupling plate 103 and a second coupling plate 104. The first coupling plate 103 and the second coupling plate 104 are disposed apart from each other in the front-rear direction, are coupled to the other (right) side of the installation section 106 in the machine-body width direction, and support the right area of the installation section 106. The first coupling plate 103 is a tabular member that protrudes rightward from the rear section at the right of the installation section 106 and that extends rightward and downward. As shown in FIG. 6C, the lower section of the first coupling plate 103 has a hole 103*a* extending therethrough in the front-rear direction. The hole 103*a* has the rear section of the second pivot shaft 101 fitted therein.

As shown in FIG. 6A and FIG. 6C, the second coupling plate 104 is a tabular member that protrudes rightward from the front section at the right of the installation section 106 and that extends rightward and downward. As shown in FIG. 6D, the lower section of the second coupling plate 104 has a hole 104*a* extending therethrough in the front-rear direction. The hole 104*a* has the front section of the second pivot shaft 101 fitted therein. Accordingly, the installation section 106 is supported in a swingable manner around the axis of the second pivot shaft 101 by the first coupling plate 103 and the second coupling plate 104. Furthermore, as shown in FIG. 6C, the upper section of the second coupling plate 104 has a second locking hole 104*b* extending therethrough in a direction (front-rear direction) orthogonal to the second pivot shaft 101.

The installation section 106 supports the fuel cylinder 130 in a detachable manner. As shown in FIG. 6A, the installation section 106 has a first installation rod 107, a second installation rod 108, a right coupling wall 109, a left coupling wall 110, and a coupling section 111. The first installation rod 107 and the second installation rod 108 are rod-like members extending in the machine-body width direction and are disposed apart from each other in the front-rear direction. In detail, the first installation rod 107 serves as the front portion of the installation section 106, and the second installation rod 108 serves as the rear portion of the installation section 106. The first installation rod 107 and the second installation rod 108 support the fuel cylinder 130 thereabove.

As shown in FIG. 6A, the right coupling wall 109 and the left coupling wall 110 are tabular members that are disposed such that plate surfaces thereof are oriented in the machine-body width direction, have a length in the front-rear direction that are larger than the length in the up-down direction, and have a length in the machine-body width direction that are larger than the length in the front-rear direction and the length in the up-down direction. The right coupling wall 109 and the left coupling wall 110 couple the first installation rod 107 and the second installation rod 108 to each other. In detail, the right coupling wall 109 serves as the right portion of the installation section 106 and couples the right end of the first installation rod 107 and the right end of the second installation rod 108 to each other. On the other hand, the left coupling wall 110 serves as the left portion of the installation section 106 and couples the left end of the first installation rod 107 and the left end of the second installation rod 108 to each other.

As shown in FIG. 6A, in addition to the right coupling wall 109 and the left coupling wall 110, the coupling section 111 couples the first installation rod 107 and the second installation rod 108 to each other. The coupling section 111 is, for example, a rod-like member that extends in the front-rear direction and whose front is coupled to the rear section of the first installation rod 107 and whose rear is coupled to the front section of the second installation rod 108.

As shown in FIG. 6A, the installation section 106 has a pair of receivers 116. The receivers 116 receive the fuel cylinder 130 from below. The receivers 116 couple the first installation rod 107 and the second installation rod 108 to each other. The receivers 116 are bent to conform to the outer peripheral surface of the fuel cylinder 130.

Figure 5D:
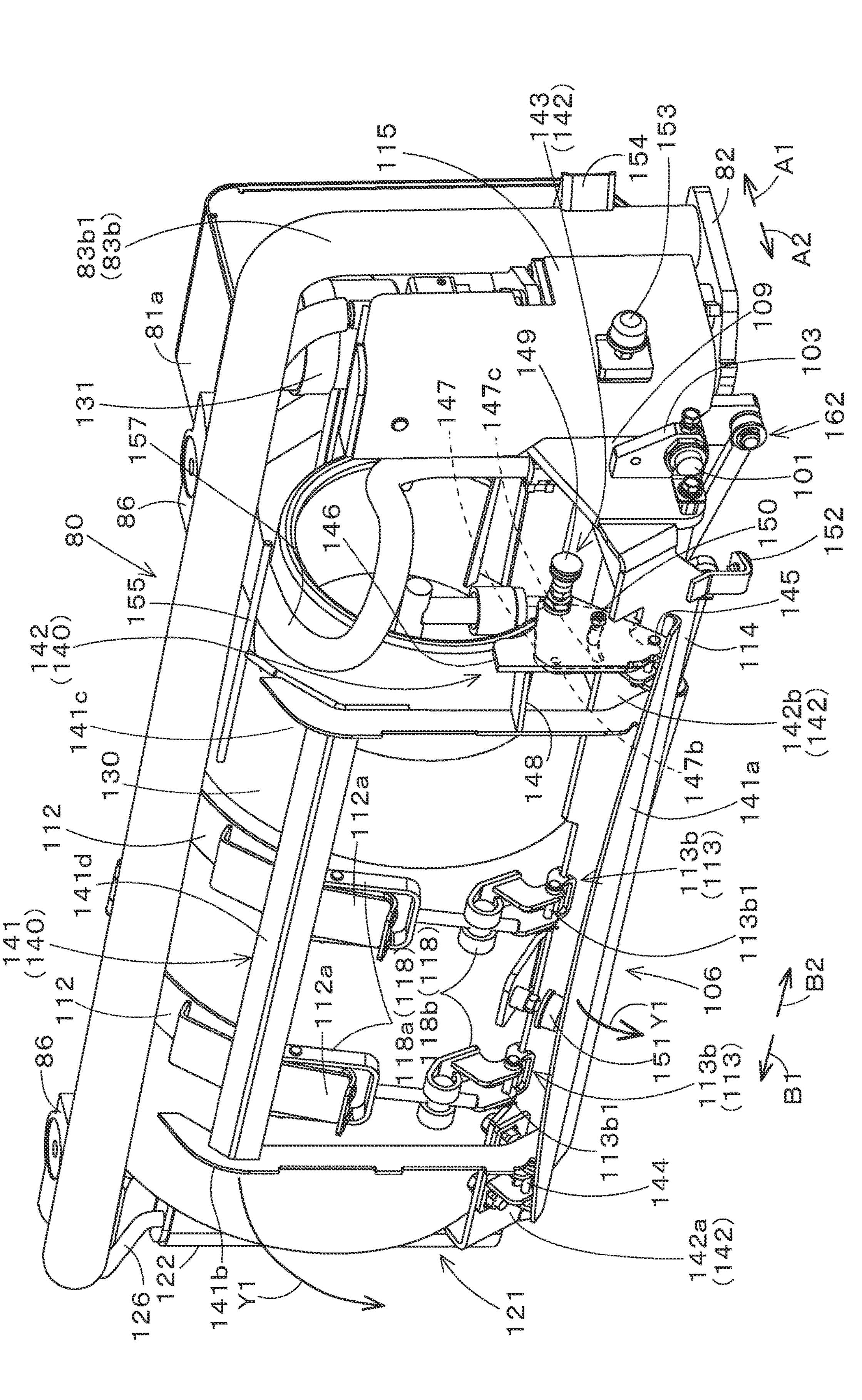
FIG. 5D illustrates a state where the rear section of the fuel cylinder is guarded by using a guard mechanism at a guard position.

Furthermore, as shown in FIG. 5A and FIG. 5D, the installation section 106 has fasteners 112. The fasteners 112 are used for fixing the fuel cylinder 130 installed in the installation section 106. Accordingly, the support mechanism 90 securely support and fix the fuel cylinder 130 by using the fasteners 112. For example, the fasteners 112 are belts wrapped around the fuel cylinder 130 from the rear section to the front section thereof so as to fix the fuel cylinder 130 to the first installation rod 107 and the second installation rod 108. One end of each fastener 112 is provided with a hook, whereas the other end has an endless ring into which a shaft **113*b*1, to be described later, is to be inserted. An intermediate section of each fastener 112 is provided with, for example, a buckle, so that the fastener 112** is adjustable in length.

As shown in FIG. 6A, the installation section 106 has a plurality of belt attachment sections 113. The belt attachment sections 113 are where the fasteners 112 are to be attached. Two belt attachment sections 113 are provided apart from each other in the machine-body width direction at each of the front of the first installation rod 107 and the rear of the second installation rod 108. Belt attachment sections **113*a* at the front extend forward and upward from the front of the first installation rod 107, and each have a shaft 113*a*1 to which an end of the corresponding fastener 112 is to be secured. The one end of the fastener 112 is to be attached to the shaft 113*a*1. On the other hand, belt attachment sections 113*b* at the rear extend rearward and upward from the extending segment 114, to be described later. As shown in FIG. 5D, each belt attachment section 113*b* has a shaft 113*b*1. A retaining mechanism 118 capable of retaining a retaining segment 112*a* provided at the other end of the fastener 112 is attached to the shaft 113*b*1. The retaining mechanism 118 has a retainer 118*a* capable of retaining the retaining segment 112*a* at the other end of the fastener 112 and a coupler 118*b* that couples the shaft 113*b*1 and the retainer 118*a*** to each other.

As shown in FIG. 5C, FIG. 6A, and FIG. 6B, the installation section 106 has the extending segment 114. The extending segment 114 faces, in a machine-body outward direction (front-rear direction), the lower section of the fuel cylinder 130 set in the installation position K1. The extending segment 114 connects the rear edge of the left coupling wall 110 and the rear edge of the right coupling wall 109 to each other. The extending segment 114 is a long tabular segment that is disposed such that plate surfaces thereof are oriented in the forward-upward direction and the rearward-downward direction and whose length in the machine-body width direction is larger than the lengths in the up-down direction and the front-rear direction. When the support mechanism 90 is in the installation position K1, the extending segment 114 surrounds the fuel cylinder 130 from the front and the rear together with the upper member 85. The upper member 85 and the extending segment 114 surround the fuel cylinder 130 so that the fuel cylinder 130 can be fixed above the hood 40.

As shown in FIG. 5A and FIG. 5D, the installation section 106 preferably has a guard mechanism 140 that guards the rear section of the fuel cylinder 130. The guard mechanism 140 prevents the fuel cylinder 130 from falling rearward as a result of the fasteners 112 being detached due to a problem, and also prevents an object from colliding against the fuel cylinder 130 from the rear.

The guard mechanism 140 has a guard body 141 and a position changing mechanism 142.

The guard body 141 has a lower guard member **141*a*, a left guard member 141*b*, a right guard member 141*c*, and an upper guard member 141*d*. The lower guard member 141*a* is disposed rearward of the extending segment 114 and extends in the machine-body width direction. The left guard member 141*b* extends upward from the left section of the lower guard member 141*a*. The right guard member 141*c* extends upward from the right section of the lower guard member 141*a*. The upper guard member 141*d* couples the upper section of the left guard member 141*b* and the upper section of the right guard member 141*c* to each other. A holding member 155 that holds a hose 157 for retrieving fuel from the fuel cylinder 130 is attached to the left guard member 141*b***.

The position changing mechanism 142 is a mechanism for changing the position of the guard body 141. As shown in FIG. 5D, the position changing mechanism 142 has a left pivotal support **142*a*, a right pivotal support 142*b*, and a position setter 143. The left pivotal support 142*a* pivotally supports the left section of the lower guard member 141*a* in a rotatable manner around a first lateral shaft 144 attached to the left section of the extending segment 114. The right pivotal support 142*b* pivotally supports the right section of the lower guard member 141*a* in a rotatable manner around a second lateral shaft 145 attached to the right section of the extending segment 114. The first lateral shaft 144 and the second lateral shaft 145 extend in the machine-body width direction. Accordingly, the guard body 141 is rotatable downward around the first lateral shaft 144 and the second lateral shaft 145 (see an arrow Y1). With regard to the guard body 141, the left guard member 141*b*, the right guard member 141*c*, and the upper guard member 141*d* are positionally changeable between a guard position located rearward of the fuel cylinder 130** and a non-guard position to which the members are rotated downward and rearward from the guard position.

The position setter 143 secures the guard body 141 in the guard position or the non-guard position. As shown in FIG. 5D, the position setter 143 secures the guard body 141 in position by fixing a first plate 146 fixed to the guard body 141 to a second plate 147 (see also FIG. 6A) fixed to the extending segment 114. The first plate 146 and the second plate 147 have the second lateral shaft 145 fitted therein. The first plate 146 is connected to the right guard member **141*c* via a connection member 148. As shown in FIG. 5A, the rear sections of the first plate 146, the right guard member 141*c*, and the connection member 148 are coupled to one another by a coupling plate 156**.

A positioning pin 149, such as a plunger pin, is attached to the upper section of the first plate 146. The second plate 147 has through-holes **147*a* and 147*b* (see FIG. 6A) into which the tip of the positioning pin 149 is insertable. The through-hole 147*a* and the through-hole 147*b* are arranged on a circular arc centered on the second lateral shaft 145 (see FIG. 6A). In FIG. 5A and FIG. 5D, the tip of the positioning pin 149 is fitted in the front through-hole 147***a* of the two through-holes 147*a* and 147*b*. The second plate 147 has a long hole 147*c* having a circular-arc shape centered on the second lateral shaft 145. A shaft body 150 extending through the first plate 146 is fitted in the long hole 147*c*. The shaft body 150 is formed of a bolt shaft.

As shown in FIG. 5A, the tip of the positioning pin 149 is inserted into the front through-hole 147*a* so that the guard body 141 can be secured in the guard position. In this case, the shaft body 150 is positioned at the front end of the long hole 147*c*. By pulling the tip of the positioning pin 149 out of the front through-hole 147*a*, the guard body 141 can be rotated downward, as indicated by the arrow Y1 (see FIG. 5D). When the guard body 141 is rotated and the shaft body 150 reaches the rear end of the long hole 147*c*, the tip of the positioning pin 149 can be inserted into the rear through-hole 147*b*. Accordingly, the guard body 141 can be secured in the non-guard position.

The extending segment 114 is provided with a first stopper 151 that abuts on the lower guard member 141*a* when the guard body 141 is in the guard position. The extending segment 114 is also provided with an abutment section 152 that abuts on the upper surface of the rod member 37*d* of the support frame 37 when the support mechanism 90 is in the installation position K1.

As shown in FIG. 5D, the first pivot shaft 94, the first pivot bracket 95, the second pivot shaft 101, and the second pivot bracket 102 are covered by a cover member 115 from the rear. A second stopper 153 is provided at a side surface (right side surface) of the cover member 115. The second stopper 153 abuts on a stopper plate 154 provided at the second pillar 83*b* of the frame body 83 when the fuel cylinder 130 is moved from the installation position K1 to a retracted position K2, to be described below. Accordingly, the retracted position K2 of the fuel cylinder 130 is defined. The retracted position K2 is a position in which the fuel cylinder 130 does not overlap the swivel base 2 in plan view. Furthermore, the retracted position K2 is a position in which the support rotating body 180 does not interfere with the hood 40 in the closed position even when the support rotating body 180 is rotated in the up-down direction.

The support mechanism 90 includes a structural body that restricts rotation around the first pivot shaft 94 and the second pivot shaft 101. In detail, the support mechanism 90 includes a lock section 120, a locking mechanism 121, and a plurality of pin mechanisms 127. As shown in FIG. 6F, FIG. 8A, FIG. 8C, and FIG. 9A, the lock section 120 is provided at one (left) side of the container 81 in the machine-body width direction. In detail, the lock section 120 protrudes rearward from the rear area of an intermediate section, in the up-down direction, of the first pillar 83*a* and the rear wall 87*a* and is where the locking mechanism 121 is to be locked. The lock section 120 has a lock shaft 120*a* extending in the machine-body width direction and a support member 120*b* that supports the opposite ends of the lock shaft 120*a*, and substantially has a gate-like shape in plan view.

Figure 6F:
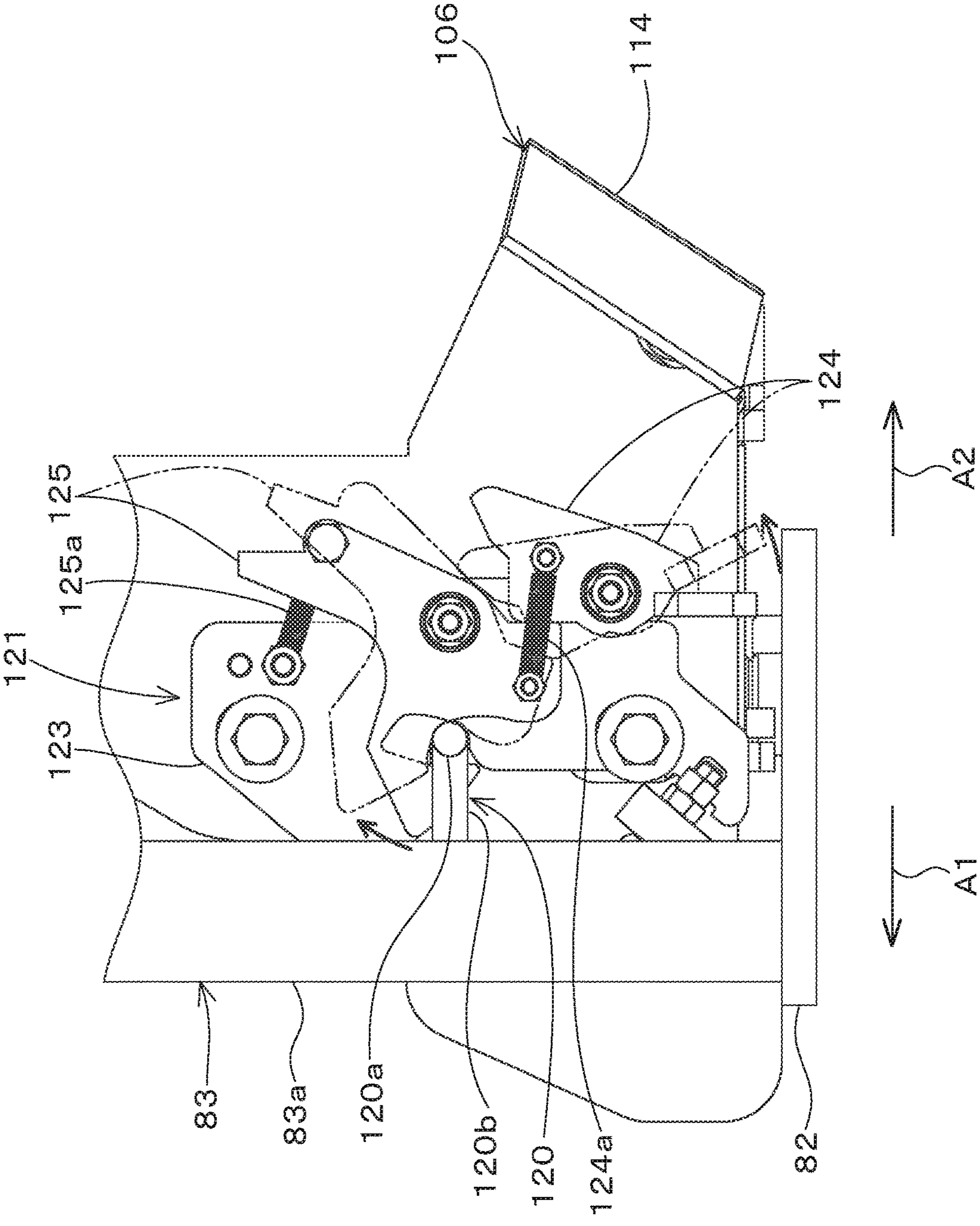
FIG. 6F is a left side view illustrating the movement of a retaining mechanism.

As shown in FIG. 6F, the locking mechanism 121 can be locked onto and unlocked from the lock section 120. The locking mechanism 121 is provided at one (left) side of the installation section 106 in the machine-body width direction and has a housing 122, a rotational support plate 123, a rotation lever 124, a locking claw 125, and a handle 126. The housing 122 is a cover body that is formed by folding a thick steel plate and that covers the rotational support plate 123, the rotation lever 124, and the locking claw 125.

As shown in FIG. 6F, the rotational support plate 123 supports the rotation lever 124 and the locking claw 125 in a rotatable manner. The rotational support plate 123 is a tabular member that is disposed such that plate surfaces thereof are oriented in the machine-body width direction, extends in the up-down direction, and has a length in the front-rear direction and a length in the up-down direction that are larger than the length in the machine-body width direction.

As shown in FIG. 6F, the rotation lever 124 is a rotationally operable member. The locking claw 125 is a claw member that is disposed such that plate surfaces thereof are oriented in the machine-body width direction and whose intermediate section in the up-down direction locks onto the lock section 120. The lower section of the locking claw 125 is coupled to the rotation lever 124 by a resilient member 124*a*, such as a spring. The upper section of the locking claw 125 rotates downward as a result of a resilient member 125*a*, such as a spring, applying a rotational force in the locking direction (counterclockwise in left side view), thereby locking onto the lock section 120. Furthermore, the locking claw 125 rotates upward by rotating in the opposite direction (clockwise in left side view, i.e., unlocking direction) from the locking direction in which the rotation lever 124 is operated, whereby the locking claw 125 is unlockable from the lock section 120.

As shown in FIG. 5B and FIG. 6A, the handle 126 substantially has a gate-like shape and is provided at the upper section of the housing 122. The handle 126 extends upward from the upper section of the housing 122 and bends outward, that is, leftward, in the machine-body width direction at an intermediate point thereof. With regard to the locking mechanism 121, known technology is applicable so long as it can restrict rotation of the fuel cylinder 130 (installation section 106) around the first pivot shaft 94.

As shown in FIG. 6C, the plurality of pin mechanisms 127 of the support mechanism 90 restrict rotation around rotation shafts by inserting pins 127*a* into holes and permit rotation by removing the pins 127*a* from the holes, and are, for example, index plungers. With regard to each pin mechanism 127, the pin 127*a* is insertable and retractable by operating a knob 127*b* provided at the base end of the pin 127*a*. Specifically, with regard to each pin mechanism 127, the pin 127*a* pops out in accordance with a resilient member, such as a built-in spring, and the pin 127*a* is stored by pulling the knob 127*b*. The plurality of pin mechanisms 127 are respectively provided in the first locking hole 92*b* and the second locking hole 104*b*.

The pin mechanism 127 provided in the first locking hole 92*b* inserts or removes the pin 127*a* into or from the first lock hole 97*a* (see FIG. 6D) provided in the upper pivotal support piece 97. The pin mechanism 127 inserts the pin 127*a* into the first lock hole 97*a* to restrict rotation of the fuel cylinder 130 (installation section 106) around the first pivot shaft 94. On the other hand, the pin mechanism 127 provided in the second locking hole 104*b* inserts or removes the pin 127*a* into or from one of the second lock holes 98*b* (see FIG. 6E) provided in the lower pivotal support piece 98. Accordingly, by inserting the pin 127*a* of the pin mechanism 127 into one of the second lock holes 98*b* (either one of the second lock hole 98*b*1 and the second lock hole 98*b*2) of the plurality of second lock holes 98*b*, rotation of the fuel cylinder 130 (installation section 106) around the second pivot shaft 101 can be restricted. Furthermore, by inserting the pin 127*a* of the pin mechanism 127 into the other second lock hole 98*b* (the other one of the second lock hole 98*b*1 and the second lock hole 98*b*2), the fuel cylinder 130 can be switched to a different position.

As mentioned above, the pin 127*a* is inserted into the first locking hole 92*b* and the first lock hole 97*a*, so that the rotation of the fuel cylinder 130 (installation section 106) around the first pivot shaft 94 is restricted. Moreover, another pin 127*a* is inserted into the second locking hole 104*b* and one of the second lock holes 98*b*, so that the rotation of the fuel cylinder 130 (installation section 106) around the second pivot shaft 101 is restricted. In the following description, the pin 127*a* to be inserted into the first locking hole 92*b* and the first lock hole 97*a* may be referred to as "first pin", and the pin 127*a* to be inserted into the second locking hole 104*b* and one of the second lock holes 98*b* may be referred to as "second pin".

As shown in FIG. 7A to FIG. 9C, the support mechanism 90 rotates the installation section 106 around the first pivot shaft 94 and the second pivot shaft 101, so that the fuel cylinder 130 can be moved to a position different from the installation position K1 located above the hood 40. In detail, the support mechanism 90 is switchable (movable) to the retracted position K2 and a lowered position K3 in addition to the installation position K1.

The first pivot shaft 94 pivotally supports the support rotating body 180 in a rotatable manner in the horizontal direction from the predetermined installation position K1 to the predetermined retracted position K2. The second pivot shaft 101 pivotally supports the support rotating body 180 in a rotatable manner from the predetermined retracted position K2 to the lowered position K3 located therebelow.

The following description relates to the position of the fuel cylinder 130 when the support mechanism 90 is in any of the installation position K1, the retracted position K2, and the lowered position K3, and the switching among the installation position K1, the retracted position K2, and the lowered position K3.

Figure 7A:
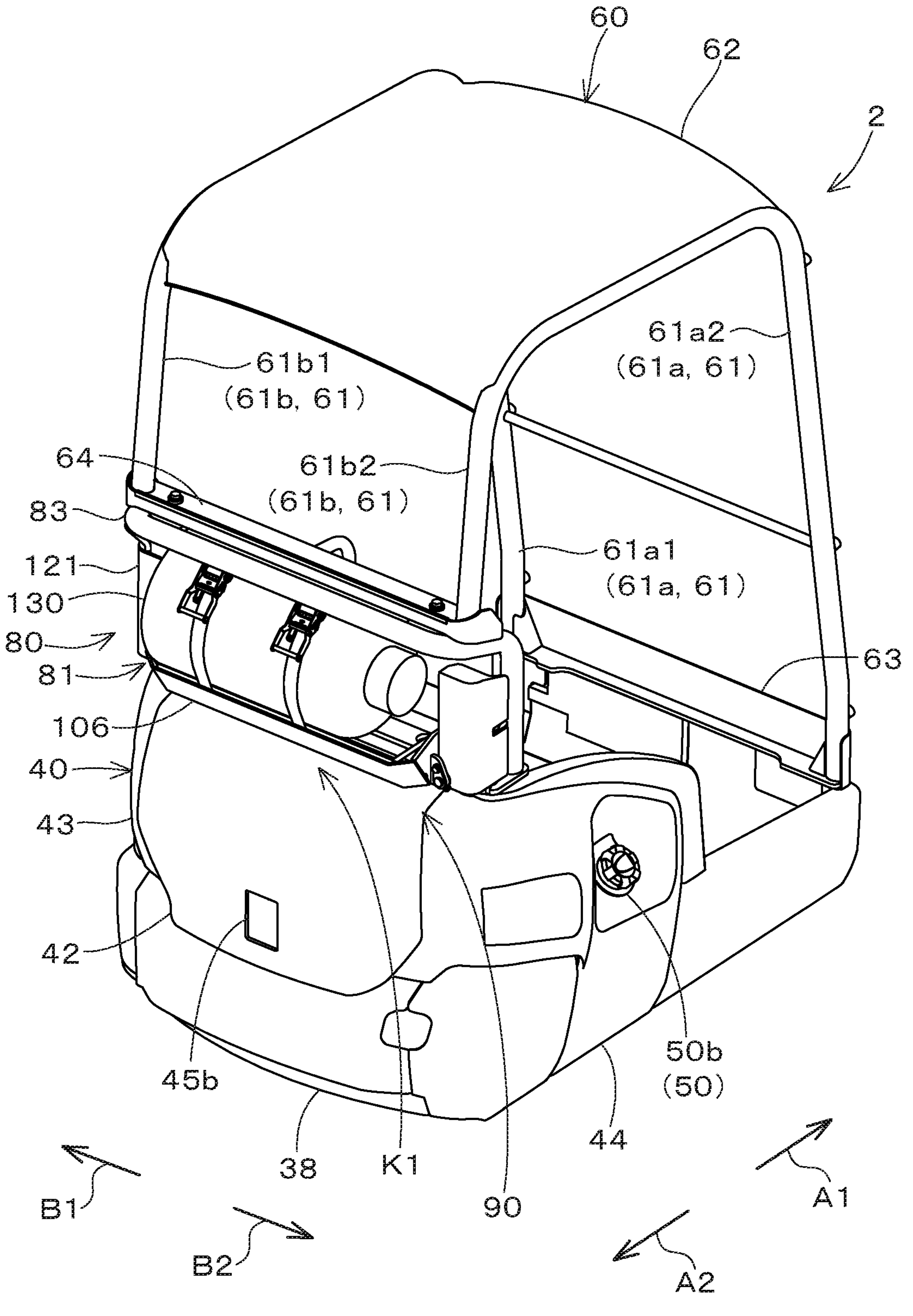
FIG. 7A is a right-rear perspective view illustrating the swivel base and a support mechanism when the support mechanism is in an installation position K1.
Figure 7B:
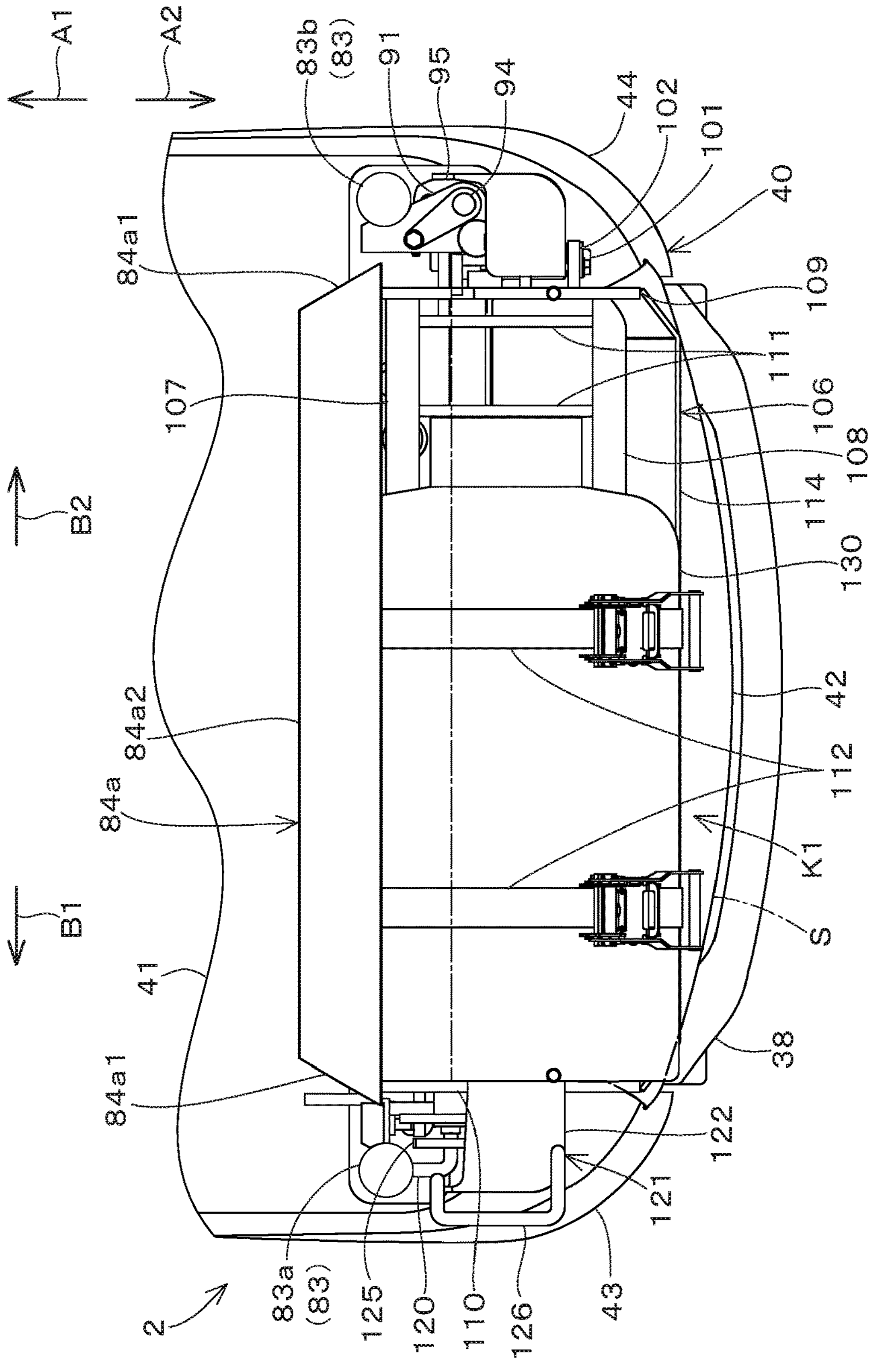
FIG. 7B is a plan view illustrating the hood and the support mechanism when the support mechanism is in the installation position K1.

As shown in FIG. 7A and FIG. 7B, when the support mechanism 90 is in the installation position K1, the fuel cylinder 130 (installation section 106) is disposed above the hood 40 (rear hood 42). In other words, the fuel cylinder 130 is accommodated in the container 81. Therefore, with the fuel cylinder 130 being disposed above the hood 40, the space above the hood 40 can be effectively utilized. Furthermore, as shown in FIG. 17, the support mechanism 90 can support the fuel cylinder 130 in the installation position K1 within a swivel trajectory C2 of the swivel base 2. A swivel trajectory C1 of the fuel cylinder 130 around the swivel axis is inward of the swivel trajectory C2 of the swivel base 2. Therefore, when the swivel base 2 swivels, the fuel cylinder 130 is within the swivel trajectory of the swivel base 2 and can avoid contact with an obstacle around the fuel cylinder 130. In a case where the support mechanism 90 is in the installation position K1, the front section of the fuel cylinder 130 is covered by the vertical member 84, and the upper section of the fuel cylinder 130 is covered by the upper member 85. As shown in FIG. 7B, when the fuel cylinder 130 is located in a movement range S of the hood 40 when being opened and closed, that is, when the support mechanism 90 is in the installation position K1, the installation section 106 limits the opening movement of the hood 40. The support mechanism 90 is switchable from the installation position K1 to the retracted position K2.

Figure 8A:
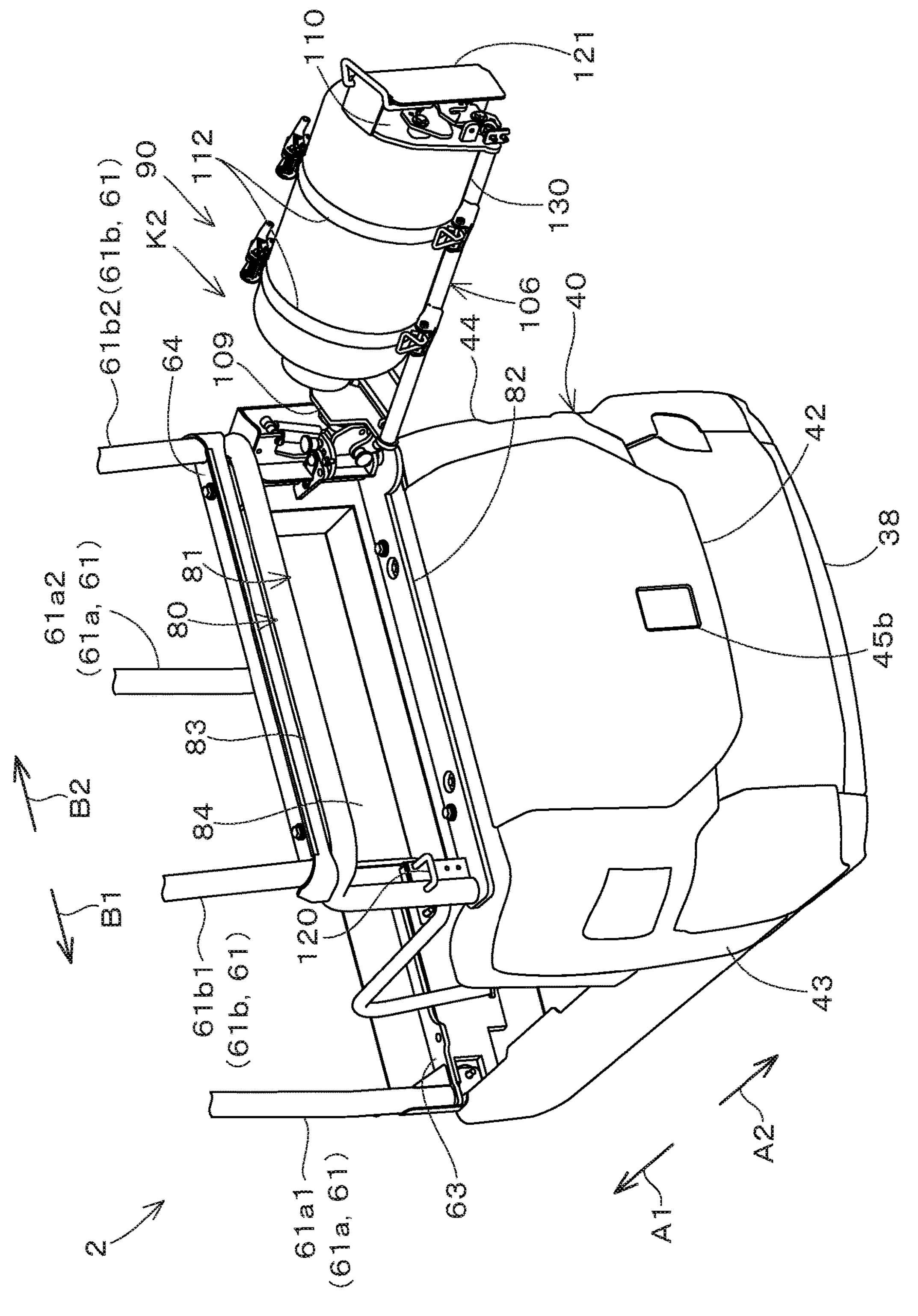
FIG. 8A is a left-rear perspective view illustrating the swivel base and the support mechanism when the support mechanism is in a retracted position K2.
Figure 8B:
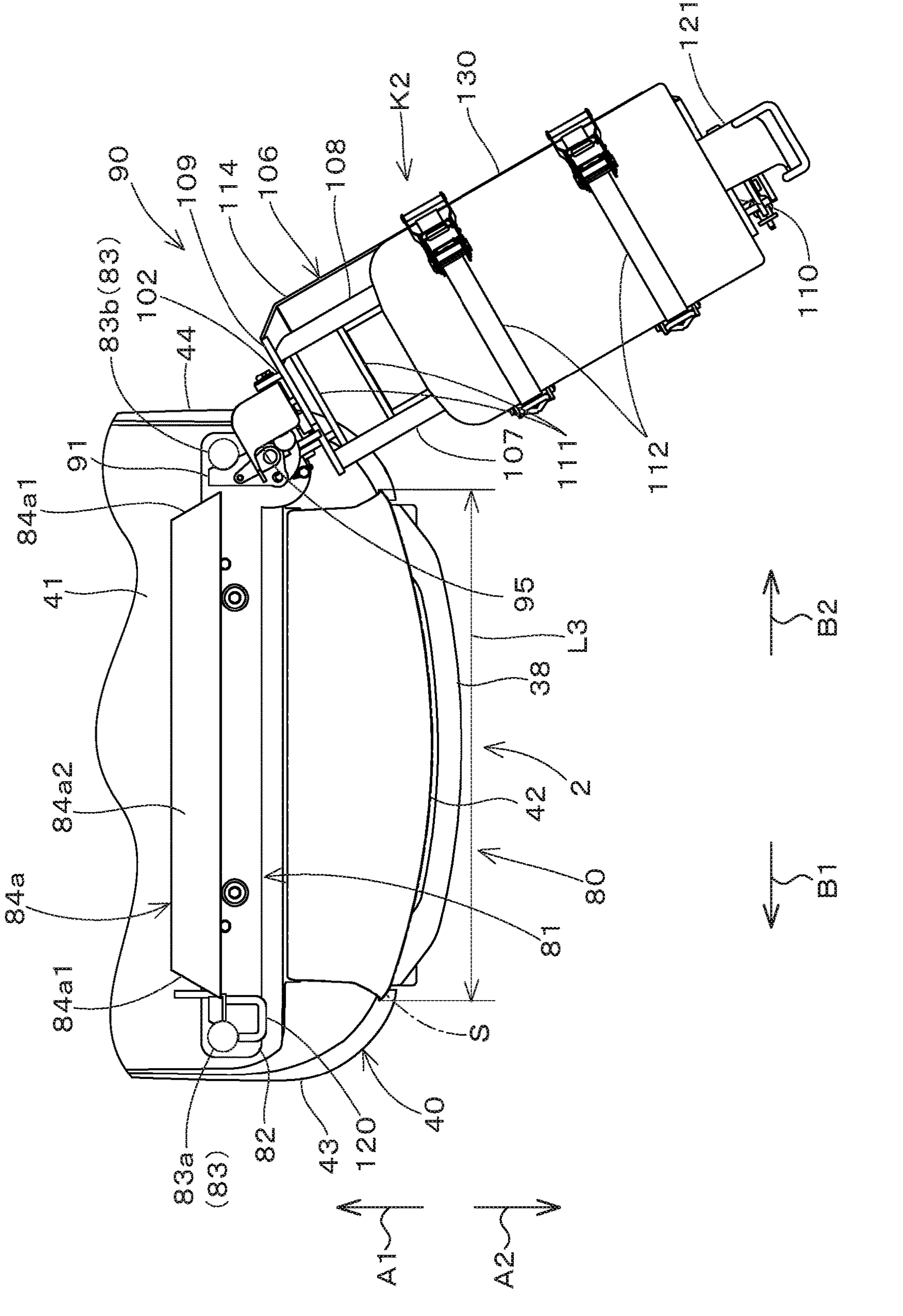
FIG. 8B is a plan view illustrating the hood and the support mechanism when the support mechanism is in the retracted position K2.

As shown in FIG. 8B, the retracted position K2 is a position in which interference with the hood 40 is avoided when the hood 40 (rear hood 42) opens and closes. Specifically, the retracted position K2 is a position in which the fuel cylinder 130 is retracted in the horizontal direction from the movement range S of the hood 40 when being opened and closed, and the fuel cylinder 130 is retracted toward the other (right) side in the machine-body width direction. Specifically, the support mechanism 90 causes the fuel cylinder 130 in the installation position K1 to retract from the installation position K1 to the retracted position K2 set at the same side as the side where a fuel inlet 50*b* of the fuel tank 50 is disposed. In such a case, the fuel cylinder 130 is supported while being inclined rightward and rearward in plan view. Thus, the effective utilization of the space above the hood 40 and the user-friendliness for opening and closing the hood 40 can both be achieved. Moreover, because the support mechanism 90 causes the fuel cylinder 130 in the installation position K1 to retract from the installation position K1 to the retracted position K2 set at the same side as the side where the fuel inlet 50*b* of the fuel tank 50 is disposed, the replacement process of the fuel cylinder 130 and the refueling process of the fuel tank 50 can be performed successively, so that the swivel base 2 or the swivel working machine 1 itself does not have to be swiveled or the operator does not have to transport the fuel cylinder 130 or a plastic fuel container in a filled state in accordance with the replacement process or the refueling process, thereby achieving enhanced work efficiency. The support mechanism 90 causes the installation section 106 (first pivot bracket 95) to rotate around the first pivot shaft 94, so as to switch from the installation position K1 to the retracted position K2. The switching operation of the support mechanism 90 from the installation position K1 to the retracted position K2 will be described below.

Figure 8C:
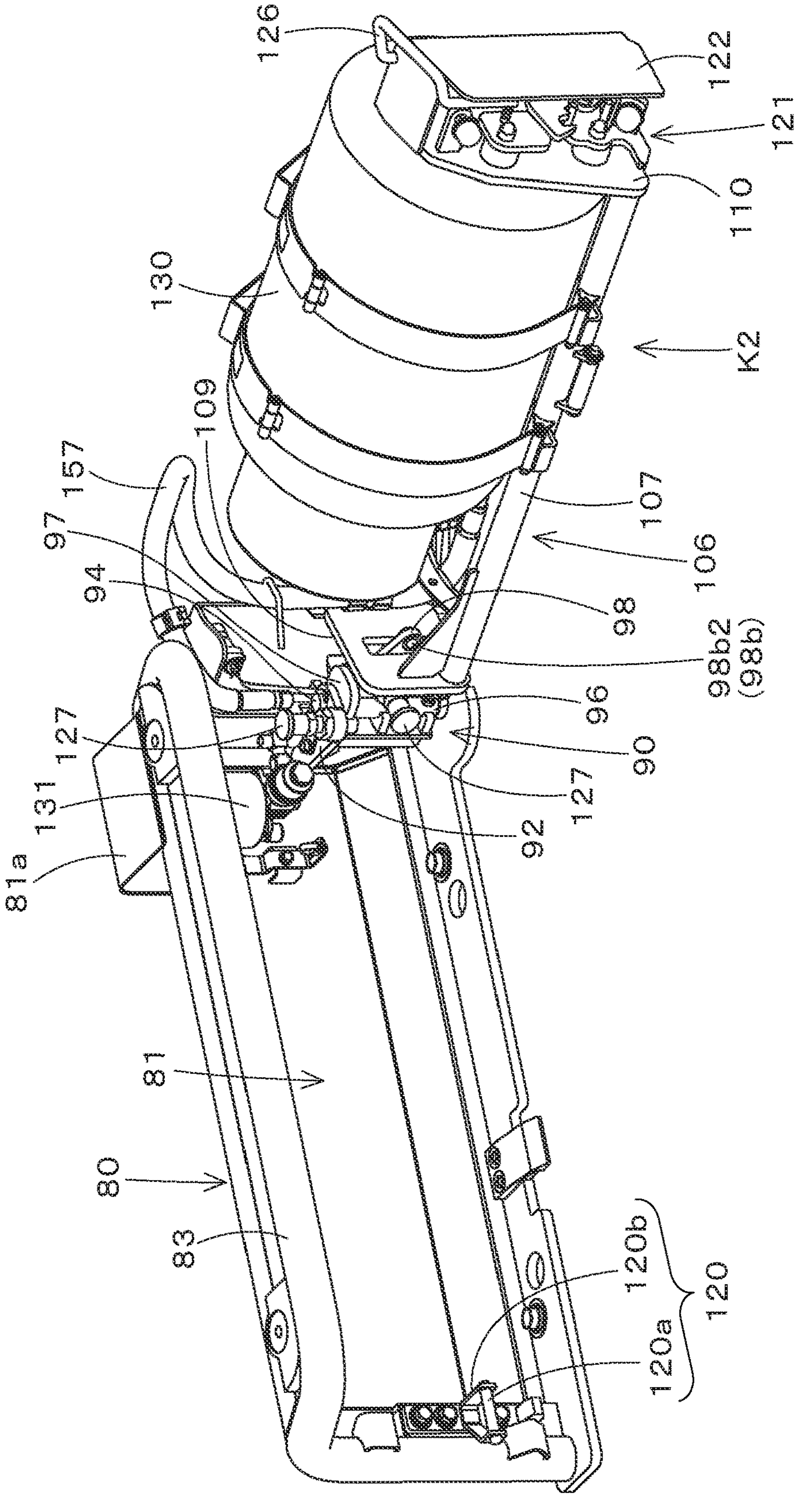
FIG. 8C illustrates a state where the support mechanism supports the fuel cylinder and the installation section in the retracted position K2.

When the operator pulls the rotation lever 124, the locking claw 125 becomes unlocked from the lock section 120. In the state where the locking claw 125 and the lock section 120 are unlocked from each other, the operator grabs the handle 126 and pulls the handle 126 rearward around the first pivot shaft 94. This causes the fuel cylinder 130 (installation section 106) to rotate in the horizontal (rearward) direction, as shown in FIG. 8A to FIG. 8C. In this case, the first pivot bracket 95 rotates around the first pivot shaft 94. During the rotation of the first pivot bracket 95, the lower end of the lower pivotal support piece 98 and the upper surface of the lower pivotal support 93 slide.

When the first pivot bracket 95 rotates around the first pivot shaft 94, the pin mechanism 127 inserts the pin 127*a* into the first lock hole 97*a*, whereby the pin mechanism 127 restricts the rotation of the first pivot bracket 95 around the first pivot shaft 94. When the pin mechanism 127 restricts the rotation of the first pivot bracket 95 around the first pivot shaft 94, the installation section 106 rotates downward around the second pivot shaft 101, and the lower end of the second pivot bracket 102 (second coupling plate 104) locks onto the cutout 93*b* of the lower pivotal support 93. Specifically, the lower end of the second coupling plate 104 locks onto the first end surface 93*b*1. Consequently, when the fuel cylinder 130 is to be removed from or installed in the installation section 106, a situation where the installation section 106 rotates and causes the fuel cylinder 130 to become displaced from the installation section 106 can be suppressed.

When the lower end of the second coupling plate 104 locks onto the cutout 93*b* of the lower pivotal support 93, the pin 127*a* of the pin mechanism 127 is inserted into the second lock hole 98*b*1 together with the locking operation, so that the pin mechanism 127 and the cutout 93*b* restrict the rotation of the installation section 106 around the second pivot shaft 101. Accordingly, the rotation of the first pivot bracket 95 around the first pivot shaft 94 is restricted by the pin mechanism 127 and the cutout **93*b*, the rotation of the installation section 106 around the second pivot shaft 101 is restricted by the pin mechanism 127, and the support mechanism 90 is switched to the retracted position K2**.

As shown in FIG. 8B, when the support mechanism 90 is in the retracted position K2, the space (above the rear hood 42) when the support mechanism 90 is in the installation position K1 is exposed. In other words, an area with a length larger than a length L3 of the rear hood 42 in the machine-body width direction is exposed, so that the rear hood 42 partially enters the aforementioned area when the support mechanism 90 is in the retracted position K2, whereby the rear hood 42 can be opened widely.

A switching operation from the retracted position K2 to the installation position K1 is performed in the reversed order from the above. Specifically, the operator pulls the knob **127*b* of the pin mechanism 127, pulls out the pin 127*a* from the second lock hole 98*b*1 to cancel the restriction of rotation of the installation section 106 around the second pivot shaft 101, and grabs the handle 126 to rotate the installation section 106 upward. By rotating the installation section 106 upward, the second coupling plate 104 and the cutout 93*b* become unlocked from each other. In the state where the second coupling plate 104 and the cutout 93*b* are unlocked from each other, the operator pulls the knob 127*b* of the pin mechanism 127 and pulls out the pin 127*a* from the first lock hole 97*a* to cancel the restriction of rotation of the first pivot bracket 95 around the first pivot shaft 94. Thus, the operator rotates the installation section 106 in the horizontal (forward) direction around the first pivot shaft 94. When the operator rotates the installation section 106 forward around the first pivot shaft 94, the locking claw 125 locks onto the lock section 120, and the support mechanism 90 is switched to the installation position K1**.

Figure 9A:
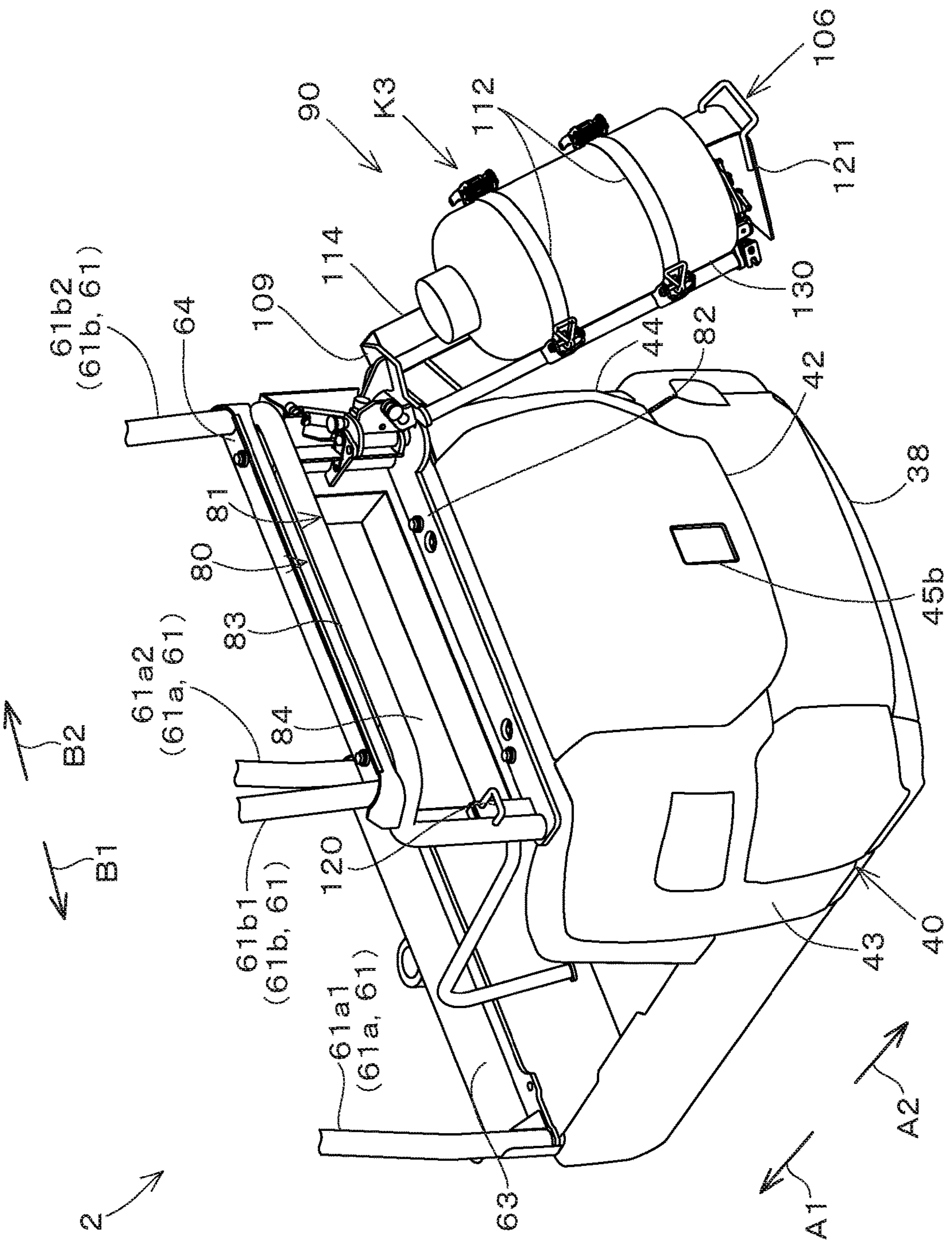
FIG. 9A is a left-rear perspective view illustrating the swivel base and the support mechanism when the support mechanism is in a lowered position K3.
Figure 9B:
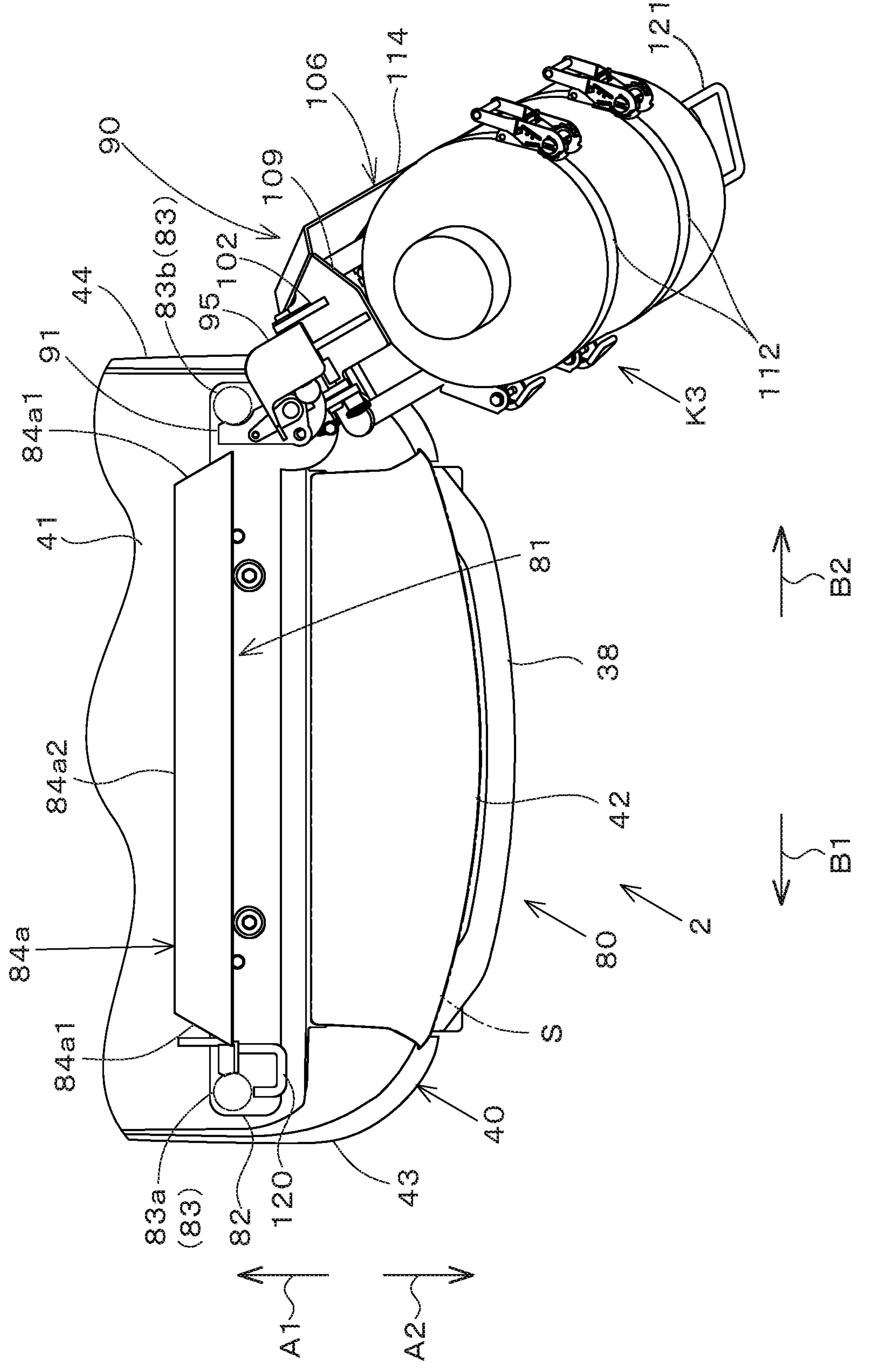
FIG. 9B is a plan view illustrating the hood and the support mechanism when the support mechanism is in the lowered position K3.

Furthermore, the support mechanism 90 is switchable from the retracted position K2 to the lowered position K3. As shown in FIG. 9A and FIG. 9B, the lowered position K3 is a position in which the fuel cylinder 130 (installation section 106) is disposed lower than the retracted position K2 and to which the installation section 106 is lowered. The support mechanism 90 can cause the installation section 106 to descend lower than the space above the hood 40. When the support mechanism 90 is in the lowered position K3, the fuel cylinder 130 installed in the installation section 106 is inclined rearward and downward from the forward-upward direction. Specifically, the fuel cylinder 130 is disposed such that the lower section thereof is positioned outward relative to the upper section thereof. Accordingly, since the installation section 106 in which the fuel cylinder 130 is installed is disposed lower than the hood 40, the operator can readily unload the fuel cylinder 130 from the installation section 106. Furthermore, the operator can readily install another fuel cylinder 130 filled with second fuel in the installation section 106. Moreover, when the support mechanism 90 is switched to the lowered position K3, the inclined fuel cylinder 130 can be raised from the installation section 106 so that the fuel cylinder 130 can be readily unloaded therefrom.

The switching of the support mechanism 90 from the retracted position K2 to the lowered position K3 is performed by rotating the fuel cylinder 130 downward around the second pivot shaft 101 from the retracted position K2. A switching operation of the support mechanism 90 from the retracted position K2 to the lowered position K3 will be described below.

When the operator pulls the knob **127*b* of the pin mechanism 127, the pin 127*a* is pulled out from the second lock hole 98*b*1, so that the restriction of rotation of the installation section 106 around the second pivot shaft 101 is canceled. In the state where the pin 127*a* is pulled out from the second lock hole 98*b*1, the operator grabs the handle 126 and moves the installation section 106 downward, so as to rotate the installation section 106 downward around the second pivot shaft 101. When the installation section 106 rotates downward around the second pivot shaft 101, the lower end of the second coupling plate 104 and the second end surface 93*b*2 of the cutout 93*b* become locked onto each other, and the pin 127*a* of the pin mechanism 127 is inserted into the second lock hole 98*b*2, so that the rotation of the installation section 106 around the second pivot shaft 101 becomes restricted, and the support mechanism 90 is switched to the lowered position K3**.

The switching from the lowered position K3 to the retracted position K2 is performed in the reversed order from the above. Specifically, the operator pulls the knob **127*b* of the pin mechanism 127, pulls out the pin 127*a* from the second lock hole 98*b*2 to cancel the restriction of rotation of the installation section 106 around the second pivot shaft 101, and grabs the handle 126 to rotate the installation section 106 upward around the second pivot shaft 101. When the installation section 106 rotates upward around the second pivot shaft 101, the pin 127*a* of the pin mechanism 127 is inserted into the second lock hole 98*b*1, so that the rotation of the installation section 106 around the second pivot shaft 101 is restricted, and the support mechanism 90 is switched to the retracted position K2**.

As mentioned above, the support mechanism 90 has the pivot shafts 160 that pivotally support the fuel cylinder 130 in a rotatable manner. Each pivot shaft 160 pivotally supports the fuel cylinder 130 in a rotatable manner to a position different from the installation position K1 above the hood 40. As described above, the pivot shafts 160 include the first pivot shaft 94 that pivotally supports the fuel cylinder 130 in a rotatable manner from the installation position K1 above the hood 40 to the retracted position K2 and the second pivot shaft 101 that pivotally supports the fuel cylinder 130 in a rotatable manner from the retracted position K2 to the lowered position K3 located therebelow.

Figure 10:
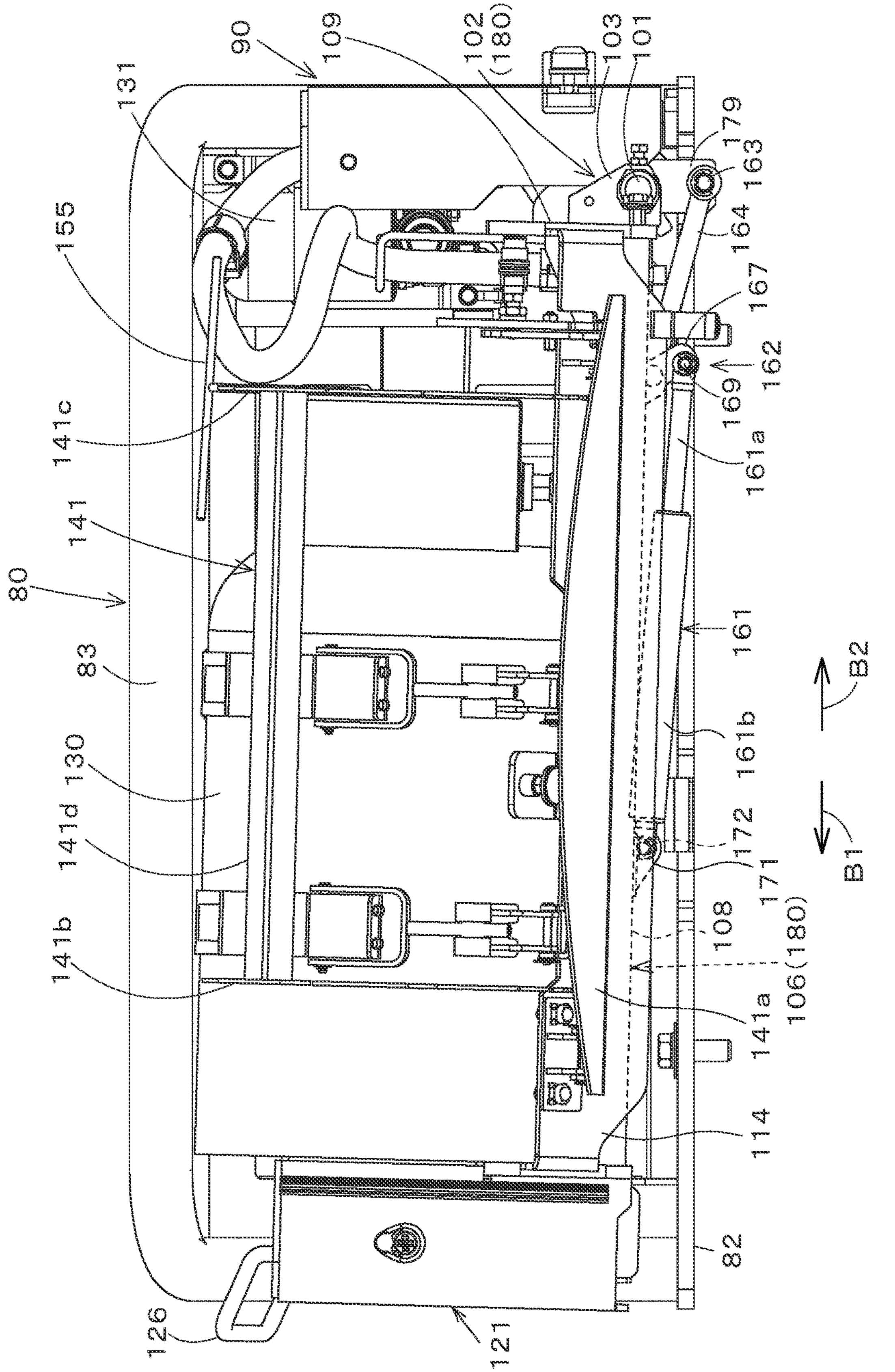
FIG. 10 is a rear view illustrating the arrangement of the fuel cylinder, a bias member, and an assist mechanism.
Figure 12A:
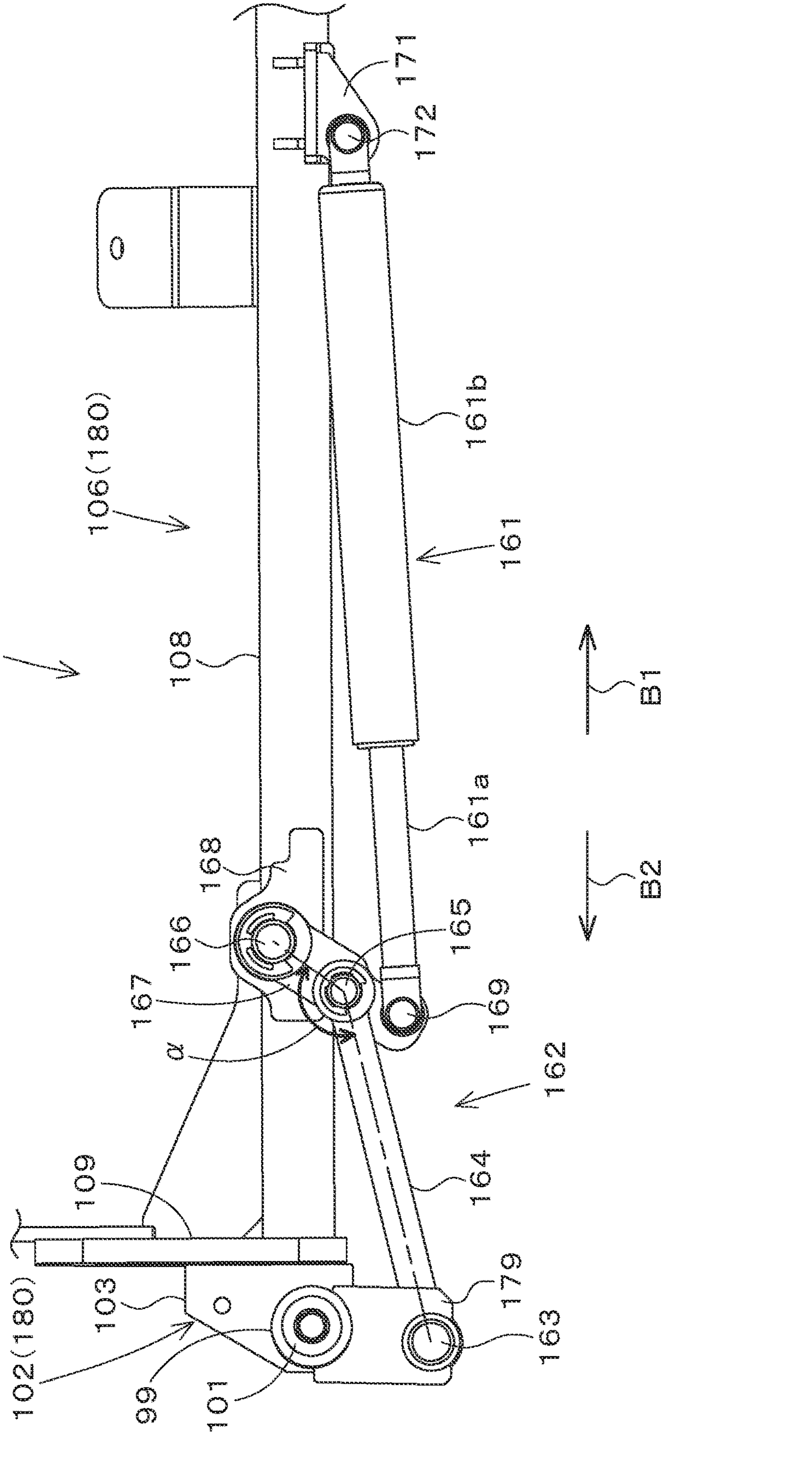
FIG. 12A illustrates the state of a gas spring and a toggle mechanism when the fuel cylinder is in the installation position and the retracted position.

As shown in FIG. 6A, FIG. 10, and FIG. 12A, the support mechanism 90 has a bias member 161 and an assist mechanism 162. The bias member 161 receives the weight of the fuel cylinder 130 and applies a resilient repulsive force in a direction that inhibits downward rotation of the support rotating body 180 (rotation around the second pivot shaft 101). The assist mechanism 162 increases the resilient repulsive force acting on the support rotating body 180.

The bias member 161 is, for example, a gas spring, a gas damper, or a hydraulic damper. The assist mechanism 162 is a link mechanism. The link mechanism serving as the assist mechanism 162 is connected to the support rotating body 180 that supports the fuel cylinder 130 in a rotatable manner in the up-down direction, the bias member 161, and a support member (e.g., a first shaft 163 and a connection piece 179, to be described later) whose relative position with respect to the second pivot shaft 101 that pivotally supports the support rotating body 180 in a rotatable manner in the up-down direction is fixed.

In this embodiment, the bias member 161 is a gas spring. The assist mechanism 162 is a toggle mechanism. Although the following description relates to a case where the bias member 161 is a gas spring and the assist mechanism 162 is a toggle mechanism, the bias member 161 and the assist mechanism 162 are not limited thereto.

As shown in FIG. 10, when the fuel cylinder 130 is in the installation position K1, the bias member (gas spring) 161 and the assist mechanism (toggle mechanism) 162 are located below the fuel cylinder 130. When the fuel cylinder 130 is in the installation position K1, the gas spring 161 is disposed substantially parallel to the fuel cylinder 130 below the fuel cylinder 130. The same applies to when the fuel cylinder 130 is in the retracted position K2. When the fuel cylinder 130 is in the installation position K1, the gas spring 161 and the toggle mechanism 162 are positioned below the fuel cylinder 130 and above the hood 40.

Figure 11:
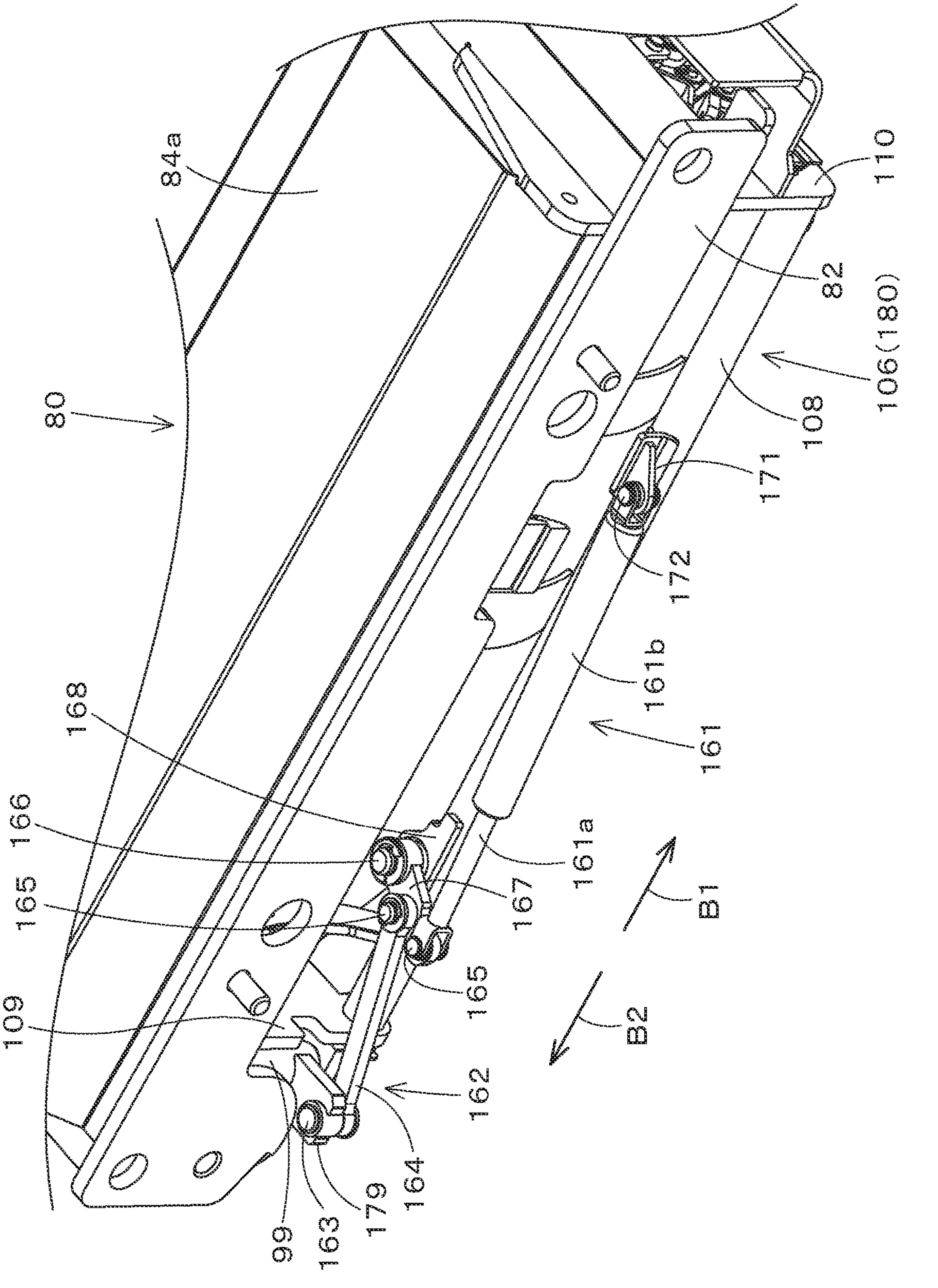
FIG. 11 is a lower perspective view illustrating the bias member and the assist mechanism.

As shown in FIG. 6A, FIG. 10, and FIG. 11, the gas spring 161 has one end (the end with a rod 161*a*) coupled to the toggle mechanism 162 and the other end (the end with a cylinder 162*b*) coupled to the support rotating body 180. The support rotating body 180 is a structural body that supports the fuel cylinder 130 and that rotates around the second pivot shaft 101. The support rotating body 180 includes the second pivot bracket 102 and the installation section 106. In this embodiment, the other end of the gas spring 161 is coupled to the installation section 106. Specifically, the other end of the gas spring 161 is coupled to the second installation rod 108 that serves as the rear section of the installation section 106. In detail, the other end of the gas spring 161 is pivotally supported by a first fixation piece 171 fixed to the second installation rod 108 via a first support shaft 172.

Figure 12B:
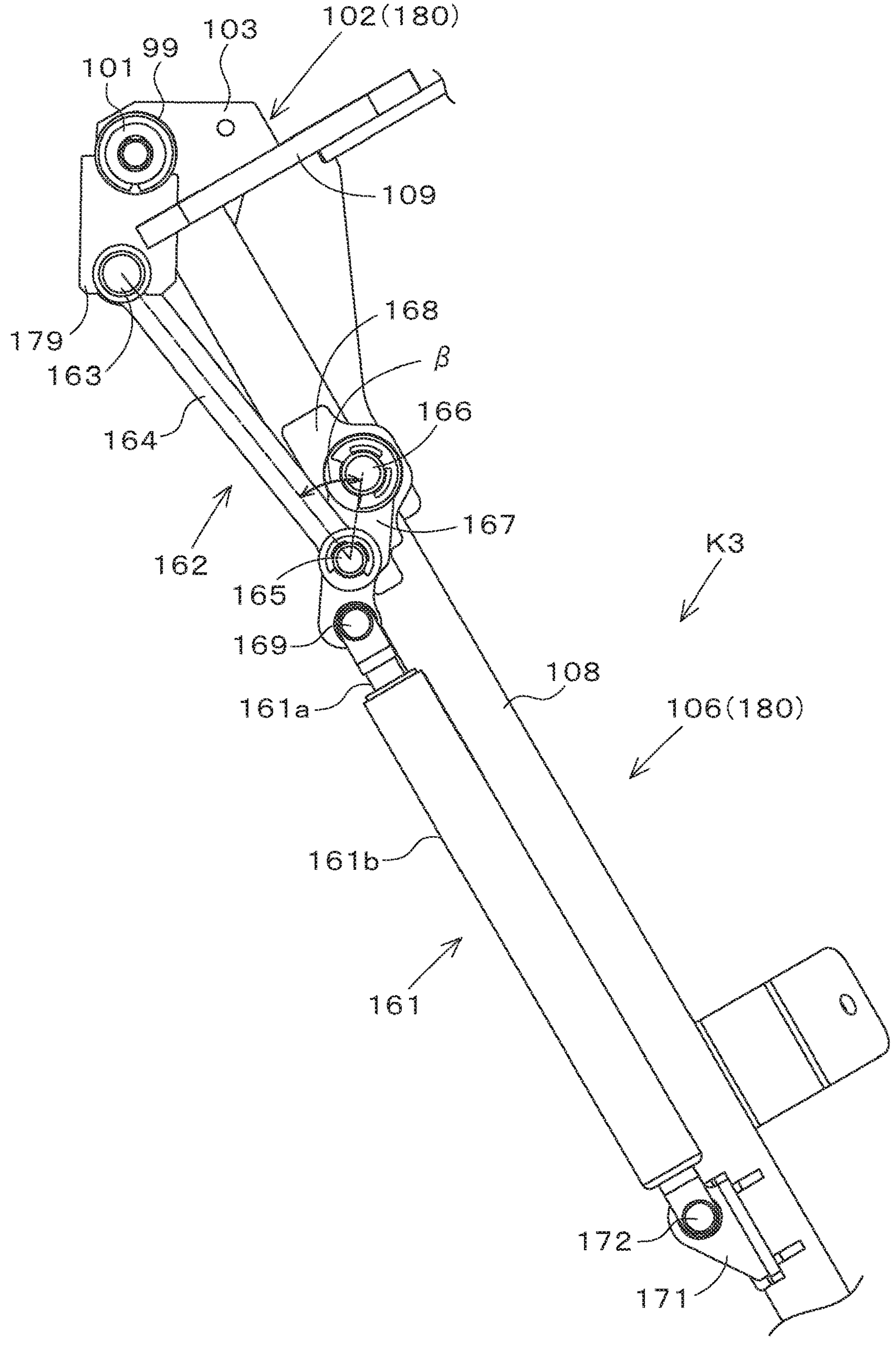
FIG. 12B illustrates the state of the gas spring and the toggle mechanism when the fuel cylinder is in the lowered position.

FIG. 12A and FIG. 12B are enlarged views of the gas spring 161 and the toggle mechanism 162 and the surrounding area thereof. FIG. 12A illustrates the state of the gas spring 161 and the toggle mechanism 162 when the fuel cylinder 130 is in the installation position K1 and the retracted position K2. FIG. 12B illustrates the state of the gas spring 161 and the toggle mechanism 162 when the fuel cylinder 130 is in the lowered position K3.

As shown in FIG. 12A and FIG. 12B, the toggle mechanism 162 has the first shaft 163, a first link member 164, a second shaft 165, a third shaft 166, and a second link member 167. The first shaft 163, the second shaft 165, and the third shaft 166 are disposed parallel to one another. The first shaft 163, the second shaft 165, and the third shaft 166 extend parallel to the second pivot shaft 101.

The first shaft 163 is supported by the connection piece 179 connected to the second tube 99 in which the second pivot shaft 101 is fitted. As shown in FIG. 12A and FIG. 12B, when the fuel cylinder 130 is rotated around the second pivot shaft 101 (rotated from the retracted position K2 to the lowered position K3), the positional relationship that the first shaft 163 has with the second pivot shaft 101 does not change. In other words, the relative position of the first shaft 163 with respect to the second pivot shaft 101 is fixed.

The first link member 164 has one end attached to the first shaft 163 in a rotatable manner and the other end attached to the second shaft 165. The second shaft 165 is disposed near one end (the distal end of the rod 161*a*) of the gas spring 161.

The third shaft 166 is attached to the support rotating body 180. In this embodiment, the third shaft 166 is attached to the second installation rod 108. In detail, the third shaft 166 is attached to a second fixation piece 168 fixed to the second installation rod 108.

The second link member 167 couples the second shaft 165 and the third shaft 166 to each other. Furthermore, one end of the gas spring 161 is coupled to the second link member 167. The second link member 167 is rotatable around the axis of the third shaft 166 in accordance with extension and retraction of the rod 161*a* of the gas spring 161.

The one end of the gas spring 161 is pivotally supported by one end of the second link member 167 via a second support shaft 169. The second shaft 165 is attached to an intermediate section between the one end and the other end of the second link member 167. The second shaft 165 is positioned between the second support shaft 169 and the third shaft 166.

As shown in FIG. 12A, when the fuel cylinder 130 is in the retracted position K2, the gas spring 161 is in an extended state. In this case, an angle α between the first link member 164 and the second link member 167 is an obtuse angle. The distance between the second shaft 165 and the first support shaft 172 and the distance between the third shaft 166 and the first support shaft 172 are both smaller than the distance between the second support shaft 169 and the first support shaft 172. The distance between the third shaft 166 and the first support shaft 172 is smaller than the distance between the second shaft 165 and the first support shaft 172.

Figure 9C:
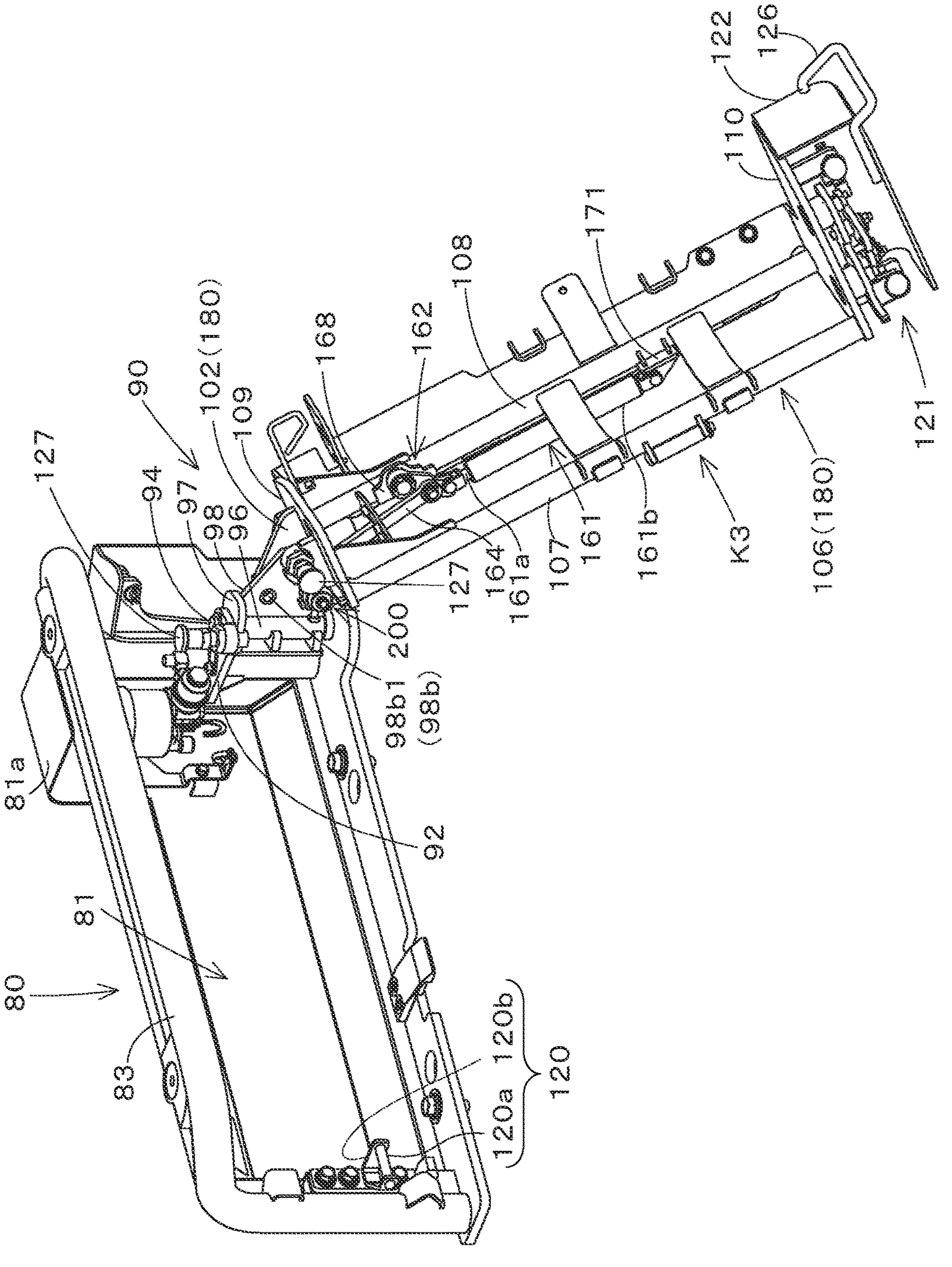
FIG. 9C illustrates a state where the support mechanism supports the installation section in the lowered position K3.

As shown in FIG. 9C and FIG. 12B, when the fuel cylinder 130 is in the lowered position K3, the gas spring 161 is in a retracted state. In this case, an angle β between the first link member 164 and the second link member 167 is smaller than the angle α. The angle β is an acute angle. The distance between the second shaft 165 and the first support shaft 172 and the distance between the third shaft 166 and the first support shaft 172 are both larger than the distance between the second support shaft 169 and the first support shaft 172. The distance between the third shaft 166 and the first support shaft 172 is larger than the distance between the second shaft 165 and the first support shaft 172.

As mentioned above, when the fuel cylinder 130 is changed from the retracted position K2 to the lowered position K3, the gas spring 161 retracts. In this case, the weight of the fuel cylinder 130 can be received in accordance with a resilient repulsive force of the gas spring 161. Therefore, the fuel cylinder 130 rotates relatively gently around the second pivot shaft 101 so as to be prevented from being lowered rapidly from the retracted position K2 to the lowered position K3.

When the fuel cylinder 130 is in the retracted position K2, the resilient repulsive force of the gas spring 161 is assisted by the toggle mechanism 162. In other words, the weight of the fuel cylinder 130 can be received by both the gas spring 161 and the toggle mechanism 162. Furthermore, since the angle c between the first link member 164 and the second link member 167 of the toggle mechanism 162 is an obtuse angle, an assist force from the toggle mechanism 162 has a large effect. Accordingly, when the fuel cylinder 130 changes from the retracted position K2 to the lowered position K3, the gas spring 161 is prevented from retracting rapidly, so that a rapid descent from the retracted position K2 to the lowered position K3 can be prevented more reliably. Therefore, the weight of the fuel cylinder 130 can be received with a small number of gas springs 161.

As shown in FIG. 6C, the support mechanism 90 has the support rotating body 180 that supports the fuel cylinder 130 and that rotates around either of the pivot shafts 160 (the first pivot shaft 94 or the second pivot shaft 101), a rotational-position defining mechanism 190 that includes the pin 127*a* that defines the rotational position of the support rotating body 180 around the pivot shaft 160, and an adjustment mechanism 200 that adjusts the position of the pivot shaft 160 relative to the pin 127*a*.

The support rotating body 180 includes a first rotating body 181 and a second rotating body 182. The first rotating body 181 is a structural body that rotates together with the fuel cylinder 130 around the first pivot shaft 94, and includes the installation section 106 and the first pivot bracket 95. The second rotating body 182 is a structural body that rotates together with the fuel cylinder 130 around the second pivot shaft 101, and includes the installation section 106 and the second pivot bracket 102.

In this embodiment, the rotational-position defining mechanism 190 defines the rotational position of the second rotating body 182 around the second pivot shaft 101. The rotational-position defining mechanism 190 has a locking hole 104*b*, a lock hole 98*b*, and a pin mechanism 127.

The locking hole 104*b* included in the rotational-position defining mechanism 190 is provided in the second rotating body 182. The locking hole 104*b* is the second locking hole 104*b* provided in the second coupling plate 104 of the second pivot bracket 102. The lock hole 98*b* included in the rotational-position defining mechanism 190 is the second lock hole 98*b* provided in the lower pivotal support piece 98 serving as a fixation body whose relative position with respect to the second pivot shaft 101 is fixed.

The pin mechanism 127 has a second pin 127*a* to be inserted into the second locking hole 104*b* and the second lock hole 98*b*. The second pin 127*a* is inserted into the second locking hole 104*b* and the second lock hole 98*b* so as to define (position) the rotational position of the second rotating body 182 around the second pivot shaft 101.

The adjustment mechanism 200 adjusts the position of the pivot shaft 160 relative to the pin 127*a* by positionally moving the pivot shaft 160 without moving the pin 127*a*. In this embodiment, the adjustment mechanism 200 adjusts the position of the second pivot shaft 101 relative to the second pin 127*a* by positionally moving the second pivot shaft 101 without moving the second pin 127*a*.

Figure 14:
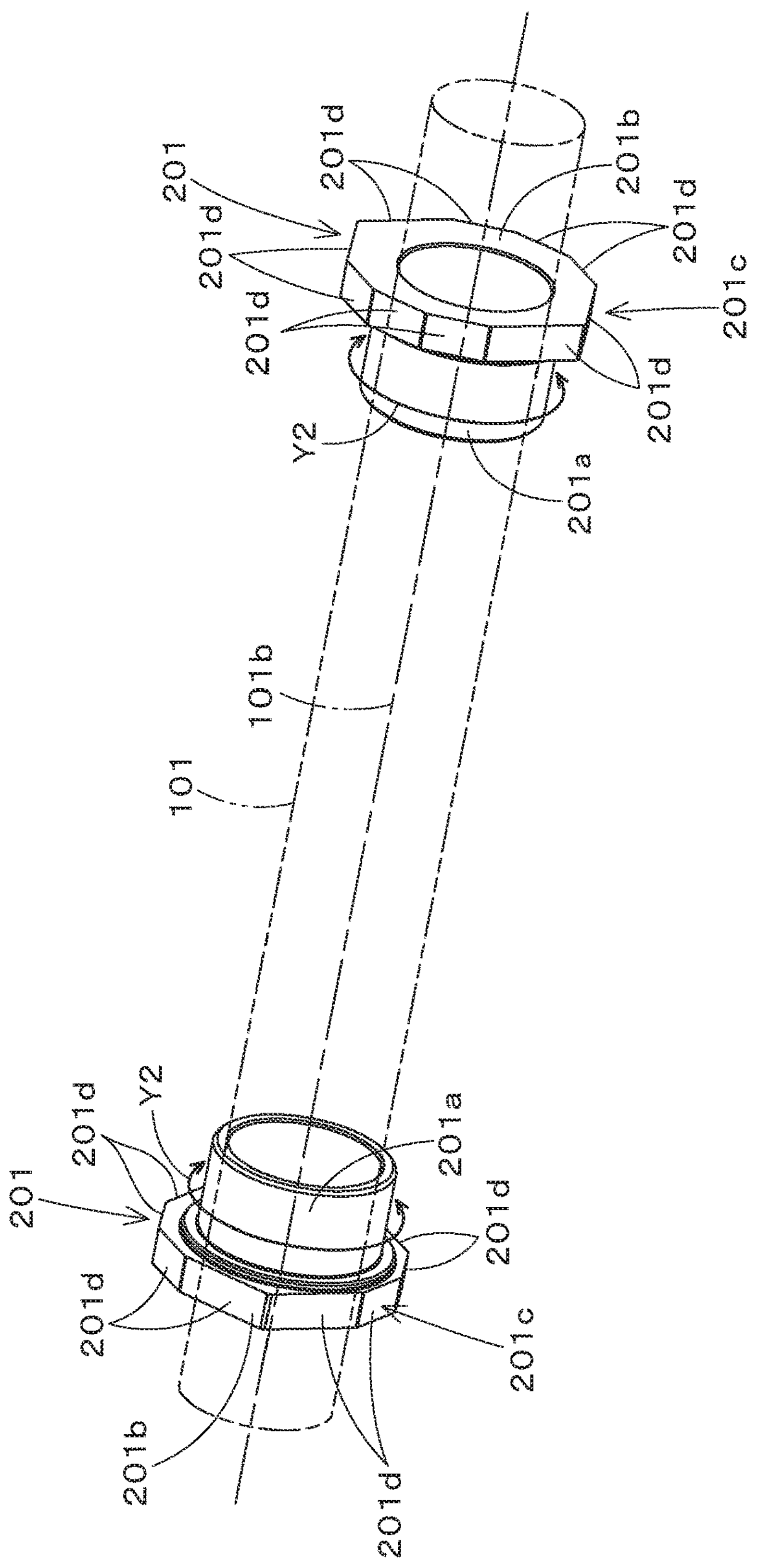
FIG. 14 illustrates the second pivot shaft and adjustment members.

As shown in FIG. 6C, the adjustment mechanism 200 is disposed near the second pivot shaft 101 and the second pin 127*a*. The adjustment mechanism 200 has adjustment members 201 attached in a rotatable manner around the axis of the second pivot shaft 101. As shown in FIG. 6C and FIG. 6E, the adjustment members 201 are respectively disposed at one end and the other end of the second pivot shaft 101. As shown in FIG. 14, each adjustment member 201 has a tubular section 201*a* fitted around the outer peripheral face of the second pivot shaft 101 and a flange section 201*b* protruding in a flanged manner from the outer peripheral surface of the tubular section 201*a*.

The tubular sections 201*a* are cylindrical. The tubular sections 201*a* are to be fitted respectively in the holes 103*a* and 104*a* (see FIG. 6D) provided in the second rotating body 182. The holes 103*a* and 104*a* are noncircular holes larger than the outer diameter of the tubular sections 201*a*. The hole 103*a* is provided in the first coupling plate 103 of the second pivot bracket 102 included in the second rotating body 182. The hole 104*a* is provided in the second coupling plate 104 of the second pivot bracket 102 included in the second rotating body 182. As shown in FIG. 6D, the second pivot shaft 101 is fitted in the holes 103*a* and 104*a*. The tubular sections 201*a* of the adjustment members 201 are respectively fitted around the one end and the other end of the second pivot shaft 101. Accordingly, one of the tubular sections 201*a* is fitted around the one end of the second pivot shaft 101 within the hole 103*a*, and the other tubular sections 201*a* is fitted around the other end of the second pivot shaft 101 within the hole 104*a*. In the state where the tubular sections 201*a* are disposed on the second pivot shaft 101 within the hole 103*a* and the hole 104*a*, the tubular sections 201*a* are rotatable around an axis 101*b* of the second pivot shaft 101 (see an arrow Y2 in FIG. 14 and FIG. 15A).

Figure 15A:
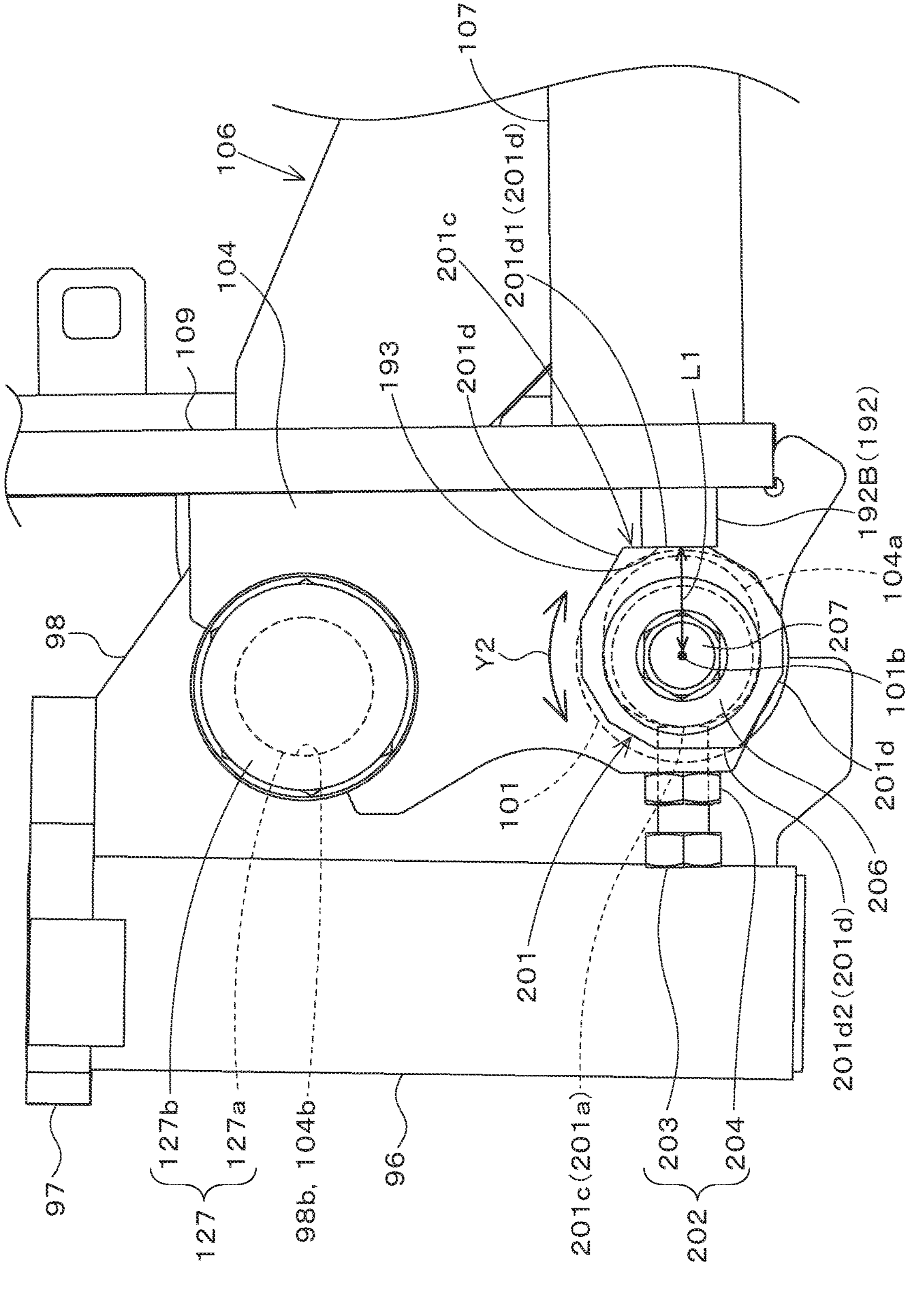
FIG. 15A illustrates an example of the positional relationship between the second pivot shaft and a pin (second pin).

The adjustment mechanism 200 has fixation members 202 that fix the rotational position of the adjustment members 201 around the axis of the second pivot shaft 101. As shown in FIG. 6D, each fixation member 202 includes a bolt 203 and a lock nut 204. The first coupling plate 103 and the second coupling plate 104 have threaded holes 205 that communicate with the holes 103*a* and 104*a*. The threaded holes 205 extend orthogonally to the axis of the second pivot shaft 101. As shown in FIG. 15A, in a state where the bolt 203 is screwed into the corresponding threaded hole 205 and the tip of the bolt 203 is in abutment with an outer peripheral surface 201*c* of the tubular section 201*a*, the lock nut 204 is tightened until coming into abutment with the first coupling plate 103 or the second coupling plate 104, whereby the rotational position of the corresponding adjustment member 201 around the axis 101*b* of the second pivot shaft 101 can be fixed.

As shown in FIG. 6D, the other end surface of the second pivot shaft 101 is provided with a threaded hole 101*a*. An annular stopper plate 206 is disposed at the other end of the second pivot shaft 101. By screwing a bolt 207 into the threaded hole 101*a*, the stopper plate 206 is brought into abutment with the other end surface of the second pivot shaft 101. The stopper plate 206 prevents the corresponding adjustment member 201 from falling off from the other end of the second pivot shaft 101.

The flange section 201*b* has the outer peripheral surface 201*c* whose distance from the axis 101*b* of the second pivot shaft 101 varies depending on the position in the circumferential direction. As shown in FIG. 14 and FIG. 15A, the outer peripheral surface 201*c* includes a plurality of flat surfaces 201*d* with different distances from the axis 101*b* of the second pivot shaft 101. In other words, the outer peripheral surface 201*c* of the flange section 201*b* is polygonal. In this embodiment, the number of flat surfaces 201*d* is 10. In other words, the flange section 201*b* is decagonal. Alternatively, the number of flat surfaces 201*d* may be smaller than or larger than 10. Moreover, the outer peripheral surface 201*c* may partially or entirely be a curved surface. However, the outer peripheral surface 201*c* preferably has at least a pair (preferably, a plurality of pairs) of flat surfaces 201*d* disposed parallel to each other with the axis 101*b* of the second pivot shaft 101 interposed therebetween. In this case, as shown in FIG. 15A, it is preferable that the flat surface on which the tip of the bolt 203 abuts and the flat surface on which an abutment surface 193, to be described later, abuts are parallel to each other with the axis 101*b* of the second pivot shaft 101 interposed therebetween.

Figure 13:
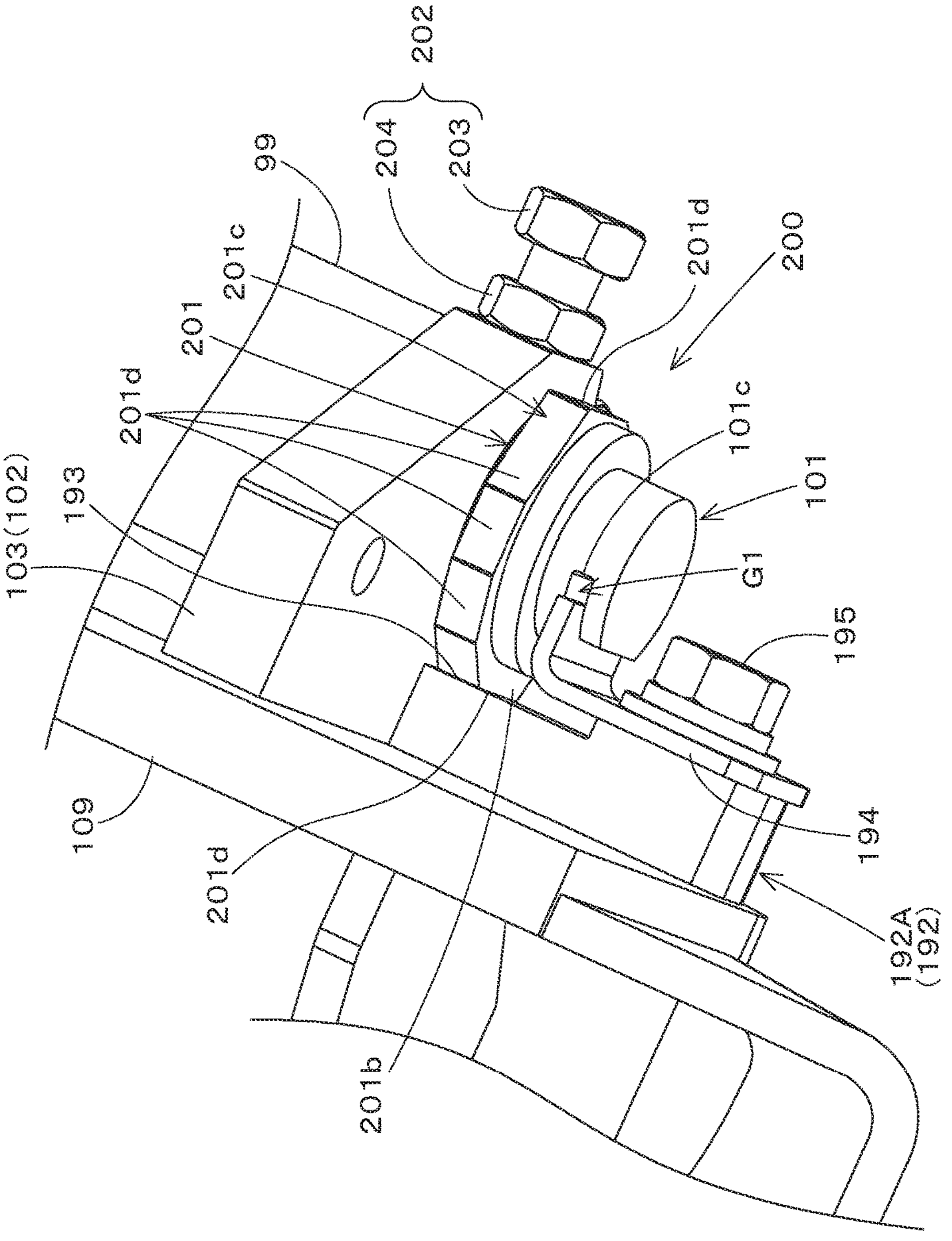
FIG. 13 illustrates an adjustment mechanism disposed at one end of the second pivot shaft.

As shown in FIG. 6C, FIG. 13, and FIG. 15A, the second rotating body 182 has the abutment surface 193 on which the outer peripheral surface 201*c* of the corresponding adjustment member 201 abuts. The abutment surface 193 is provided at a positioning piece 192 fixed to the right coupling wall 109 of the installation section 106. The positioning piece 192 protrudes from the right coupling wall 109 toward the second pivot shaft 101. The abutment surface 193 is a flat surface that is parallel to a wall surface of the right coupling wall 109.

The positioning piece 192 includes a first positioning piece 192A (see FIG. 6B and FIG. 13) disposed at one end of the second pivot shaft 101 and a second positioning piece 192B (see FIG. 6C) disposed at the other end of the second pivot shaft 101. As shown in FIG. 13, an anti-rotation piece 194 is fixed to the first positioning piece 192A by using a bolt 195. The anti-rotation piece 194 is fitted in a cutout 101*c* provided at the one end of the second pivot shaft 101. Accordingly, the second pivot shaft 101 is prevented from rotating around the axis. However, a gap G1 is provided between the anti-rotation piece 194 and the cutout 101*c*, such that movement (rotation and horizontal movement) of the second pivot shaft 101 is permitted within the range of the gap G1.

Figure 15B:
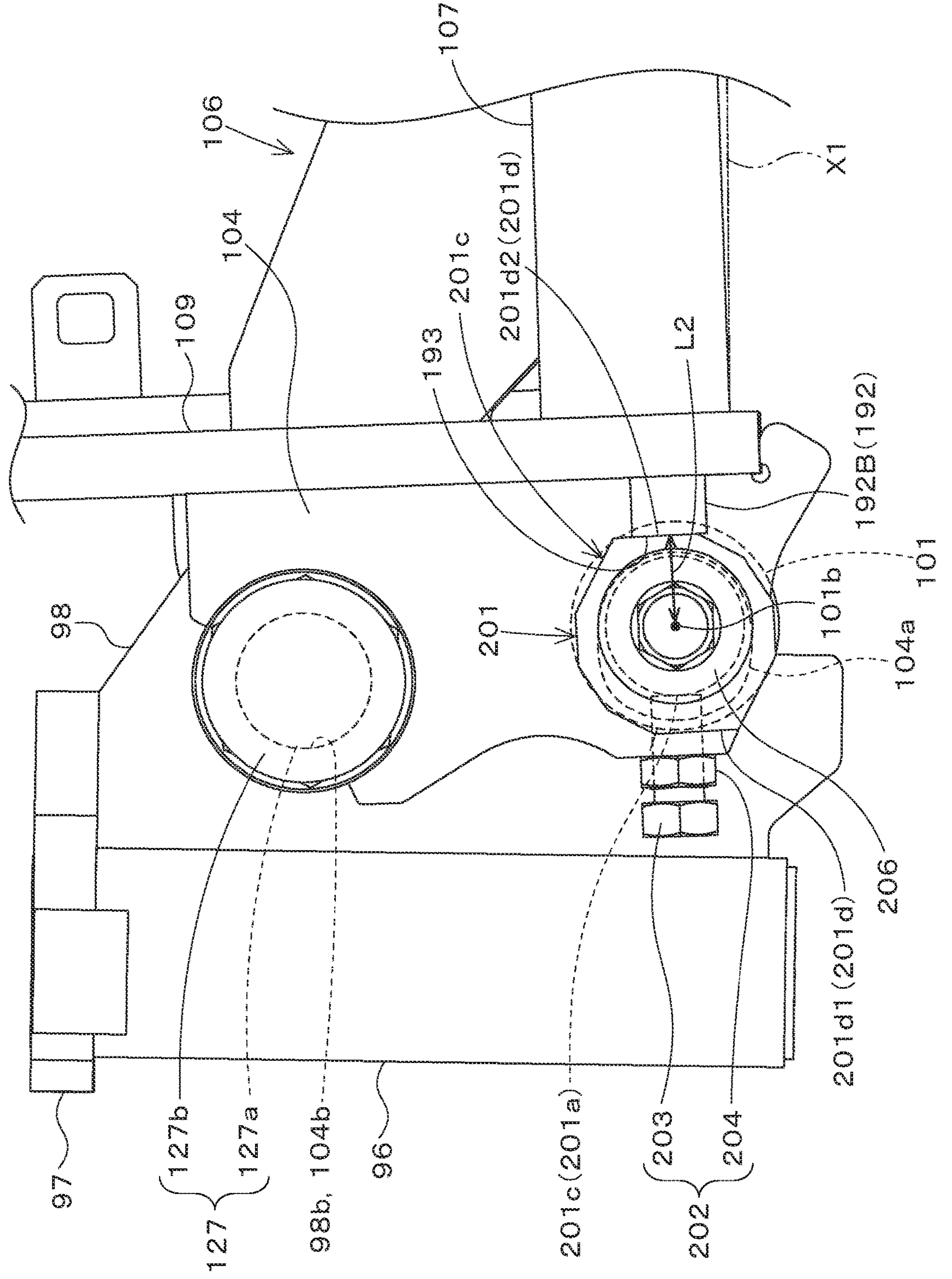
FIG. 15B illustrates another example of the positional relationship between the second pivot shaft and the pin (second pin).

By rotating around the axis of the second pivot shaft 101, the adjustment member 201 is capable of changing the position of the outer peripheral surface 201*c* that abuts on the abutment surface 193. In this embodiment, the adjustment member 201 rotates around the axis of the second pivot shaft 101 so as to be capable of changing the flat surface 201*d* that abuts on the abutment surface 193. FIG. 15A and FIG. 15B illustrate a state where the flat surface 201*d* that abuts on the abutment surface 193 has been changed in accordance with rotation of the adjustment member 201 around the axis of the second pivot shaft 101. In the case of FIG. 15A, a flat surface 201*d*1 that abuts on the abutment surface 193 has a distance L1 from the axis 101*b* of the second pivot shaft 101. In the case of FIG. 15B, a flat surface 201*d*2 that abuts on the abutment surface 193 has a distance L2 (L2<L1) from the axis 101*b* of the second pivot shaft 101. In other words, the flat surface 201*d*1 and the flat surface 201*d*2 have different distances from the axis 101*b* of the second pivot shaft 101.

As shown in FIG. 15A and FIG. 15B, the flat surface 201*d* that abuts on the abutment surface 193 is changed by rotating the adjustment member 201 around the axis of the second pivot shaft 101, whereby the distance from the axis of the second pivot shaft 101 to the abutment surface 193 can be changed. When the adjustment member 201 is to be rotated around the axis of the second pivot shaft 101, since the hole 104*a* is a noncircular hole that is larger than the outer diameter of the tubular section 201*a*, the position (horizontal position) of the tubular section 201*a* within the hole 104*a* can be changed. The position (horizontal position) of the tubular section 201*a* within the hole 104*a* is different between the case of FIG. 15A and the case of FIG. 15B.

When the adjustment member 201 is to be rotated around the axis of the second pivot shaft 101, the position of the tubular section 201*a* within the hole 104*a* is changed, so that the position of the second pivot shaft 101 can be changed together with the tubular section 201*a*. Accordingly, the position of the second pivot shaft 101 relative to the second pin 127*a* can be adjusted. Moreover, the position of the second pivot shaft 101 relative to the second locking hole 104*b* can also be adjusted. Furthermore, when the position (horizontal position) of the tubular section 201*a* is to be changed, the inclination of the flat surface 201*d*1 can also be changed. Therefore, even when the position (horizontal position) of the tubular section 201*a* is changed, the flat surface 201*d*1 and the abutment surface 193 can still be brought into abutment with each other.

As described above, with the support mechanism 90 according to this embodiment, the position of the second pivot shaft 101 relative to the second pin 127*a* can be adjusted by the adjustment mechanism 200. The advantages (effects) achieved as a result of providing the adjustment mechanism 200 will be described below.

By inserting the second pin 127*a* into the second locking hole 104*b* and the second lock hole 98*b*, the rotational position of the second rotating body 182 around the second pivot shaft 101 can be defined (positioned). However, if there are variations in the dimensions or the shape of a component, the rotational position to be defined may also vary. In detail, for example, if the second lock hole 98*b* is deviated from a design position due to dimensional variations in the lower pivotal support piece 98, when the rotational position is defined by inserting the second pin 127*a* into the second locking hole 104*b* and the second lock hole 98*b* in a state where the fuel cylinder 130 is in the retracted position K2, the installation section 106 may be tilted relative to a design position (horizontal position) X1 (see FIG. 15B).

As shown in FIG. 8C, the pin mechanism 127 including the second pin 127*a* and the locking mechanism 121 are disposed at the opposite sides of the installation section 106 with the fuel cylinder 130 interposed therebetween. Specifically, the second pin 127*a* and the locking mechanism 121 are disposed with a large distance therebetween. Thus, if the installation section 106 is slightly tilted, the position of the locking mechanism 121 may significantly change. As a result, a problem in which the locking mechanism 121 cannot lock onto the lock section 120 may occur.

With the support mechanism 90 according to this embodiment, the adjustment mechanism 200 adjusts the position of the second pivot shaft 101 relative to the second pin 127*a*, so that the tilted state of the installation section 106 shown in FIG. 15B can be corrected to a non-tilted state of the installation section 106 shown in FIG. 15A. Therefore, the problem in which the locking mechanism 121 cannot lock onto the lock section 120 is prevented from occurring.

As an alternative to the above embodiment in which the rotational-position defining mechanism 190 defines the rotational position of the second rotating body 182 around the second pivot shaft 101, the rotational-position defining mechanism 190 may define the rotational position of the first rotating body 181 around the first pivot shaft 94.

In this case, the rotational-position defining mechanism 190 has the first locking hole 92*b* provided in the upper pivotal support 92 included in the first rotating body 181, the first lock hole 97*a* provided in the upper pivotal support piece 97 serving as a fixation body whose relative position with respect to the first pivot shaft 94 is fixed, and the pin mechanism 127 including a first pin 127*a*. The first pin 127*a* is inserted into the first locking hole 92*b* and the first lock hole 97*a*, so that the rotational position of the first rotating body 181 around the first pivot shaft 94 is defined (positioned). Furthermore, the adjustment mechanism 200 is configured to adjust the position of the first pivot shaft 94 relative to the first pin 127*a*. The first rotating body 181 is provided with the abutment surface 193 on which the outer peripheral surface 201*c* of the corresponding adjustment member 201 abuts. The adjustment member 201 is rotatable around the axis of the first pivot shaft 94 and is capable of changing the position of the outer peripheral surface 201*c* that abuts on the abutment surface 193 in accordance with rotation of the first pivot shaft 94 around the axis. The tubular section 201*a* of the adjustment member 201 is fitted around the first pivot shaft 94 and is inserted into the hole 92*a* in which the first pivot shaft 94 is fitted. The hole 92*a* is a non-circular hole that is larger than the outer diameter of the tubular section 201*a*.

As mentioned above, the swivel working machine 1 according to an embodiment of the present invention includes the swivel base 2, the prime mover 4 installed in the swivel base 2, the working device 20 provided at the swivel base 2, and the support mechanism 90 having the support rotating body 180 that supports the fuel cylinder 130 containing fuel for the prime mover 4 in a rotatable manner in the up-down direction. The support mechanism 90 has the bias member 161 that receives the weight of the fuel cylinder 130 and applies a resilient repulsive force in a direction that inhibits downward rotation of the support rotating body 180, and also has the assist mechanism 162 that increases the resilient repulsive force acting on the support rotating body 180.

According to this configuration, the resilient repulsive force applied to the support rotating body 180 by the bias member 161 can be increased by the assist mechanism 162. Therefore, the number of bias members 161 that receive the weight of the fuel cylinder 130 when the fuel cylinder 130 rotates downward can be reduced. Accordingly, a large installation space can be ensured for the fuel cylinder 130, so that various fuel cylinders 130 available in the market can be installed. Moreover, the reduced number of bias members 161 contributes to cost reduction.

The support mechanism 90 includes the first pivot shaft 94 that pivotally supports the support rotating body 180 in a rotatable manner in the horizontal direction from the predetermined installation position K1 to the predetermined retracted position K2, and also includes the second pivot shaft 101 that pivotally supports the support rotating body 180 in a rotatable manner from the retracted position K2 to the lowered position K3 located therebelow. The bias member 161 applies a resilient repulsive force when the support rotating body 180 is to be rotated around the second pivot shaft 101.

According to this configuration, when the fuel cylinder 130 is rotated around the second pivot shaft 101, the resilient repulsive force of the bias member 161 can be increased by the assist mechanism 162. Therefore, the number of bias members 161 that receive the weight of the fuel cylinder 130 when the fuel cylinder 130 is rotated around the second pivot shaft 101 can be reduced.

Furthermore, the installation position K1 is a position in which at least a part of the fuel cylinder 130 overlaps the swivel base 2 in plan view, and the retracted position K2 is a position in which the fuel cylinder 130 does not overlap the swivel base 2 in plan view.

According to this configuration, the fuel cylinder 130 can be rotated from the position in which at least a part thereof overlaps the swivel base 2 to the position in which the fuel cylinder 130 does not overlap the swivel base 2 in plan view.

Moreover, the openable-closable hood 40 that forms the engine room E accommodating the prime mover 4 is provided. The installation position K1 is a position in which the fuel cylinder 130 is disposed above the hood 40 in a closed state, and the retracted position K2 is a position in which the support rotating body 180 does not interfere with the hood 40 in the closed position even when the support rotating body 180 is rotated in the up-down direction.

According to this configuration, the fuel cylinder 130 can be rotated from the installation position K1 where the fuel cylinder 130 is disposed above the hood 40 in the closed state to the retracted position K2 where the support rotating body 180 does not interfere with the hood 40 in the closed position even when the support rotating body 180 is rotated in the up-down direction.

Furthermore, the assist mechanism 162 is a link mechanism connected to the support rotating body 180, the bias member 161, and the support member (e.g., the first shaft 163) whose relative position with respect to the second pivot shaft 101 that pivotally supports the support rotating body 180 in a rotatable manner in the up-down direction is fixed. The bias member 161 has one end coupled to the link mechanism and the other end coupled to the support rotating body 180.

According to this configuration, the bias member 161 is coupled to the support rotating body 180 via the assist mechanism 162 serving as a link mechanism, so that the resilient repulsive force of the bias member 161 applied when the support rotating body 180 rotates is transmitted to the assist mechanism 162 and can be increased by the assist mechanism 162.

Furthermore, the link mechanism is the toggle mechanism 162.

According to this configuration, the resilient repulsive force of the bias member 161 can be greatly increased by the assist mechanism 162 serving as a toggle mechanism, so that the number of bias members 161 that receive the weight of the fuel cylinder 130 can be greatly reduced. Furthermore, the assist mechanism 162 can be made compact.

Moreover, the toggle mechanism 162 has the first shaft 163 whose relative position with respect to the second pivot shaft 101 is fixed, the first link member 164 whose one end is attached to the first shaft 163 in a rotatable manner, the second shaft 165 attached to the other end of the first link member 164, the third shaft 166 attached to the support rotating body 180, and the second link member 167 that couples the second shaft 165 and the third shaft 166 to each other and to which one end of the bias member 161 is coupled.

According to this configuration, the bias member 161 and the toggle mechanism 162 can be disposed in a compact fashion, and the resilient repulsive force of the bias member 161 can be greatly increased by the toggle mechanism 162. Moreover, the bias member 161 and the assist mechanism 162 are positioned below the fuel cylinder 130 when the fuel cylinder 130 is in the installation position K1.

According to this configuration, the bias member 161 and the assist mechanism 162 can be disposed between the fuel cylinder 130 and the hood 40. Therefore, a large accommodation space can be ensured for the fuel cylinder 130 in the width direction (machine-body width direction) of the swivel base 2. Furthermore, the bias member 161 is a gas spring 161, and the gas spring 161 is disposed substantially parallel to the fuel cylinder 130 below the fuel cylinder 130 when the fuel cylinder 130 is in the installation position K1.

According to this configuration, a long stroke can be ensured for the extension and retraction of the rod of the gas spring 161.

The swivel working machine 1 according to an embodiment of the present invention includes the swivel base 2, the prime mover 4 installed in the swivel base 2, the working device 20 provided at the swivel base 2, and the support mechanism 90 that supports the fuel cylinder 130 containing fuel for the prime mover 4 in a rotatable manner around the pivot shafts 160. The support mechanism 90 has the support rotating body 180 that supports the fuel cylinder 130 and that rotates around the pivot shafts 160, the rotational-position defining mechanism 190 including the pins **127*a* that define the rotational position of the support rotating body 180 around the pivot shafts 160, and the adjustment mechanism 200 that adjusts the positions of the pivot shafts 160 relative to the pins 127*a***.

According to this configuration, in the swivel working machine including the pins **127*a* for defining the rotational position of the fuel cylinder 130 around the pivot shafts 160, the positions of the pivot shafts 160 relative to the pins 127*a* can be adjusted by the adjustment mechanism 200. Accordingly, if the relative position between the pivot shafts 160 and the pins 127*a*** changes due to variations in component dimensions and a deviation occurs between the rotational position that should originally be defined and the rotational position to be actually defined, this deviation can be corrected.

The adjustment mechanism 200 has the adjustment members 201 attached in a rotatable manner around the axis of the corresponding pivot shaft 160. Each adjustment member 201 has the outer peripheral surface 201*c* whose distance from the axis of the pivot shaft 160 varies depending on the position in the circumferential direction, and the support rotating body 180 has the abutment surface 193 on which the outer peripheral surface of the adjustment member abuts. The position of the outer peripheral surface 201*c* that abuts on the abutment surface 193 is changeable in accordance with rotation of the adjustment member 201 around the aforementioned axis.

According to this configuration, the position of the pivot shaft 160 relative to the corresponding pin 127*a* can be adjusted by a simple operation involving rotating the adjustment member 201 around the axis of the pivot shaft 160.

Furthermore, the outer peripheral surface 201*c* includes the plurality of flat surfaces 201*d* with different distances from the axis of the pivot shaft 160. By rotating, the adjustment member 201 is capable of changing the flat surface 201*d* that abuts on the abutment surface 193.

According to this configuration, the flat surface 201*d* is brought into abutment with the abutment surface 193 so that the two surfaces come into contact with each other, whereby the pivot shaft 160 can be positioned accurately and reliably relative to the pin 127*a*.

Moreover, the adjustment member 201 has the tubular section 201*a* fitted around the outer peripheral face of the pivot shaft 160 and the flange section 201*b* having the outer peripheral surface 201*c*.

According to this configuration, the adjustment mechanism 200 can be disposed in a compact fashion near the pivot shaft 160. Therefore, a large installation space for the adjustment mechanism 200 is not required. Moreover, the support rotating body 180 has the holes 92*a* and 104*a* in which the pivot shaft 160 is fitted. The holes 92*a* and 104*a* are non-circular holes in which the tubular section 201*a* is fitted and that are larger than the outer diameter of the tubular section 201*a*.

According to this configuration, when the adjustment member 201 is to be rotated around the axis of the pivot shaft 160, the position of the tubular section 201*a* within the holes 92*a* and 104*a* can be changed. Accordingly, the position of the pivot shaft 160 can be changed together with the tubular section 201*a*, so that the position of the pivot shaft 160 relative to the pin 127*a* can be readily adjusted.

Furthermore, the adjustment mechanism 200 has the fixation member 202 that fixes the rotational position of the adjustment member 201 around the axis of the pivot shaft 160.

According to this configuration, the position of the pivot shaft 160 relative to the pin 127*a* adjusted (corrected) by the adjustment mechanism 200 can be fixed by the fixation member 202.

Moreover, the adjustment mechanism 200 is disposed near the pivot shaft 160 and the pin 127*a*.

According to this configuration, the adjustment process by the adjustment mechanism 200 can be performed near the pin 127*a*. Therefore, the adjustment process by the adjustment mechanism 200 and a detachment operation of the pin 127*a* can be performed with a minimal hand motion, thereby achieving excellent workability (operability). Moreover, because the adjustment process by the adjustment mechanism 200 can be performed near the pivot shaft 160 (near the rotation axis), the risk of getting one's hand caught in the support rotating body 180 when rotated can be reduced.

The rotational-position defining mechanism 190 has the locking holes 92*b* and 104*b* provided in the support rotating body 180 and the lock holes 97*a* and 98*b* provided in the fixation bodies 97 and 98 whose relative position with respect to the pivot shafts 160 is fixed. The pins 127*a* define the rotational position by being inserted into the locking holes 92*b* and 104*b* and the lock holes 97*a* and 98*b*, and the adjustment mechanism 200 adjusts the positions of the pivot shafts 160 relative to the lock holes 97*a* and 98*b*.

According to this configuration, the adjustment mechanism 200 can adjust the positions of the pivot shafts 160 relative to the lock holes 97*a* and 98*b*, so that when the positions of the pivot shafts 160 are deviated from the lock holes 97*a* and 98*b*, this deviation can be corrected.

Furthermore, the pivot shafts 160 include the first pivot shaft 94 that pivotally supports the support rotating body 180 in a rotatable manner in the horizontal direction from the predetermined installation position K1 to the predetermined retracted position K2, and the second pivot shaft 101 that pivotally supports the support rotating body 180 in a rotatable manner from the retracted position K2 to the lowered position K3 located therebelow. The rotational position of the support rotating body 180 around the second pivot shaft 101 is defined by the corresponding pin 127*a*, and the position of the second pivot shaft 101 relative to the pin 127*a* is adjusted by the adjustment mechanism 200.

According to this configuration, the position of the second pivot shaft 101 relative to the pin 127*a* can be adjusted by the adjustment mechanism 200, so that when the position of the second pivot shaft 101 is deviated from the pin 127*a*, this deviation can be corrected.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A swivel working machine comprising:
- a swivel base;
- a prime mover provided on the swivel base;
- a working device provided on the swivel base; and
- a support mechanism to support a fuel cylinder in a rotatable manner around a pivot shaft, the fuel cylinder containing fuel for the prime mover, wherein
- the support mechanism includes
- a support rotating body to support the fuel cylinder and rotate around the pivot shaft,
- a rotational-position defining mechanism including a pin to define a rotational position of the support rotating body around the pivot shaft, and
- an adjustment mechanism to adjust a position of the pivot shaft relative to the pin.

2. The swivel working machine according to claim 1, wherein
- the adjustment mechanism includes an adjustment member attached to the pivot shaft in a rotatable manner around an axis of the pivot shaft, the adjustment member having an outer peripheral surface whose distance from the axis of the pivot shaft varies in accordance with a position in a circumferential direction thereof,
- the support rotating body includes an abutment surface on which the outer peripheral surface of the adjustment member abuts, and a position of the outer peripheral surface that abuts on the abutment surface is changeable in accordance with rotation of the adjustment member around the axis.

3. The swivel working machine according to claim 2, wherein the outer peripheral surface includes a plurality of flat surfaces with different distances from the axis of the pivot shaft, and the adjustment member, by rotating, is capable of changing the flat surface to abut on the abutment surface.

4. The swivel working machine according to claim 2, wherein the adjustment member includes a tubular section fitted around an outer peripheral face of the pivot shaft and a flange section having the outer peripheral surface.

5. The swivel working machine according to claim 4, wherein the support rotating body includes a hole in which the pivot shaft is fitted, and the hole is a noncircular hole into which the tubular section is inserted and that is larger than an outer diameter of the tubular section.

6. The swivel working machine according to claim 2, wherein the adjustment mechanism includes a fixation member to fix a rotational position of the adjustment member around the axis of the pivot shaft.

7. The swivel working machine according to claim 1, wherein the adjustment mechanism is located near the pivot shaft and the pin.

8. The swivel working machine according to claim 1, wherein the rotational-position defining mechanism includes a locking hole provided in the support rotating body, and a lock hole provided in a fixation body whose relative position with respect to the pivot shaft is fixed, the pin defines the rotational position by being inserted into the locking hole and the lock hole, and the adjustment mechanism adjusts the position of the pivot shaft relative to the lock hole.

9. The swivel working machine according to claim 1, wherein the pivot shaft includes a first pivot shaft to pivotally support the support rotating body in a rotatable manner in a horizontal direction from a predetermined installation position to a predetermined retracted position, and a second pivot shaft to pivotally support the support rotating body in a rotatable manner from the retracted position to a lowered position located therebelow, the pin defines a rotational position of the support rotating body around the second pivot shaft, and the adjustment mechanism adjusts a position of the second pivot shaft relative to the pin.

10. The swivel working machine according to claim 1, wherein the support rotating body supports the fuel cylinder in a rotatable manner in an up-down direction, and the support mechanism includes a bias member to receive a weight of the fuel cylinder and apply a resilient repulsive force in a direction such as to inhibit downward rotation of the support rotating body, and an assist mechanism to increase the resilient repulsive force acting on the support rotating body.

11. A swivel working machine comprising:

a swivel base;

a prime mover provided on the swivel base;

a working device provided on the swivel base; and a support mechanism including a support rotating body to support a fuel cylinder in a rotatable manner in an up-down direction, the fuel cylinder containing fuel for the prime mover, wherein the support mechanism includes a bias member to receive a weight of the fuel cylinder and apply a resilient repulsive force in a direction such as to inhibit downward rotation of the support rotating body, and an assist mechanism to increase the resilient repulsive force acting on the support rotating body.

12. The swivel working machine according to claim 10, wherein the support mechanism includes a first pivot shaft to pivotally support the support rotating body in a rotatable manner in a horizontal direction from a predetermined installation position to a predetermined retracted position, and a second pivot shaft to pivotally support the support rotating body in a rotatable manner from the retracted position to a lowered position located therebelow, and the bias member applies the resilient repulsive force when the support rotating body is to be rotated around the second pivot shaft.

13. The swivel working machine according to claim 12, wherein the installation position is a position in which at least a part of the fuel cylinder overlaps the swivel base in plan view, and the retracted position is a position in which the fuel cylinder does not overlap the swivel base in plan view.

14. The swivel working machine according to claim 12, further comprising:

an openable-closable hood defining an engine room to accommodate the prime mover, wherein the installation position is a position in which the fuel cylinder is located above the hood in a closed state, and the retracted position is a position in which the support rotating body does not interfere with the hood in the closed state even when the support rotating body is rotated in the up-down direction.

15. The swivel working machine according to claim 10, wherein the assist mechanism is a link mechanism connected to the support rotating body, the bias member, and a support member whose relative position with respect to a second pivot shaft that pivotally supports the support rotating body in a rotatable manner in the up-down direction is fixed, and the bias member has one end coupled to the link mechanism and another end coupled to the support rotating body.

16. The swivel working machine according to claim 15, wherein the link mechanism is a toggle mechanism.

17. The swivel working machine according to claim 16, wherein the toggle mechanism includes a first shaft whose relative position with respect to the second pivot shaft is fixed, a first link member whose one end is attached to the first shaft in a rotatable manner, a second shaft attached to another end of the first link member, a third shaft attached to the support rotating body, and a second link member to couple the second shaft and the third shaft to each other, the one end of the bias member being coupled to the second link member.

18. The swivel working machine according to claim 12, wherein the bias member and the assist mechanism are positioned below the fuel cylinder when the fuel cylinder is in the installation position.

19. The swivel working machine according to claim 18, wherein the bias member is a gas spring, and the gas spring is located substantially parallel to the fuel cylinder below the fuel cylinder when the fuel cylinder is in the installation position.

* * * * *